US012300453B2

(12) United States Patent
Yoo et al.

(10) Patent No.: US 12,300,453 B2
(45) Date of Patent: May 13, 2025

(54) ARC PATH FORMATION UNIT AND DIRECT CURRENT RELAY COMPRISING SAME

(71) Applicant: LS ELECTRIC CO., LTD., Anyang-si (KR)

(72) Inventors: Jung Woo Yoo, Anyang-si (KR); Han Mi Ru Kim, Anyang-si (KR); Young Ho Lee, Anyang-si (KR)

(73) Assignee: LS ELECTRIC CO., LTD., Anyang-si (KR)

(*) Notice: Subject to any disclaimer, the term of this patent is extended or adjusted under 35 U.S.C. 154(b) by 324 days.

(21) Appl. No.: 17/923,748

(22) PCT Filed: Apr. 20, 2021

(86) PCT No.: PCT/KR2021/004926
§ 371 (c)(1),
(2) Date: May 2, 2023

(87) PCT Pub. No.: WO2021/225302
PCT Pub. Date: Nov. 11, 2021

(65) Prior Publication Data

US 2023/0260728 A1 Aug. 17, 2023

(30) Foreign Application Priority Data

May 6, 2020 (KR) ........................ 10-2020-0054002
Jun. 29, 2020 (KR) ........................ 10-2020-0079598

(51) Int. Cl.
*H01H 50/38* (2006.01)
*H01H 50/02* (2006.01)
(Continued)

(52) U.S. Cl.
CPC .......... *H01H 50/38* (2013.01); *H01H 50/045* (2013.01); *H01H 50/60* (2013.01); *H01H 50/023* (2013.01)

(58) Field of Classification Search
None
See application file for complete search history.

(56) References Cited

U.S. PATENT DOCUMENTS 4,367,448 A * 1/1983 Nishizako .............. H01H 9/443 335/201
6,700,466 B1 * 3/2004 Yamamoto ............ H01H 9/302 335/201
(Continued)

FOREIGN PATENT DOCUMENTS

JP 2013246873 A 12/2013
JP 2014110094 A 6/2014
(Continued)

OTHER PUBLICATIONS

Office Action for related Korean Application No. 10-2020-0054002; action dated Sep. 15, 2023; (3 pages).
(Continued)

*Primary Examiner* — Bernard Rojas
(74) *Attorney, Agent, or Firm* — K&L Gates LLP

(57) ABSTRACT

An arc path formation unit and a direct current relay comprising same are disclosed. An arc path formation unit according to an embodiment of the present disclosure comprises a plurality of magnet parts. The plurality of magnet parts can form a magnetic field in a space inside an arc chamber to form an electromagnetic force for moving generated arc. The magnetic field formed by each magnet part forms an electromagnetic force toward the outside of the arc chamber. Electromagnetic forces formed adjacently to fixed contacts are formed in opposite directions. Therefore, the generated arc can be quickly moved to the outside and extinguished without damage to each constituent element of a direct current relay caused by the generated arc.

36 Claims, 57 Drawing Sheets

(51) Int. Cl.
*H01H 50/04* (2006.01)
*H01H 50/60* (2006.01)

(56) References Cited

U.S. PATENT DOCUMENTS

| | | | | |
|---|---|---|---|---|
| 8,482,368 | B2 * | 7/2013 | Sasaki | H01H 51/2236<br>335/201 |
| 9,087,655 | B2 * | 7/2015 | Enomoto | H01H 50/546 |
| 9,330,872 | B2 * | 5/2016 | Kubono | H01H 50/546 |
| 2012/0175345 | A1 * | 7/2012 | Tachikawa | H01H 9/443<br>218/26 |

FOREIGN PATENT DOCUMENTS

| | | | |
|---|---|---|---|
| JP | 2015159131 | A | 9/2015 |
| JP | 2016072020 | A | 5/2016 |
| JP | 2019036431 | A | 3/2019 |
| KR | 1020140016936 | A | 2/2014 |

OTHER PUBLICATIONS

International Search Report for related International Application No. PCT/KR2021/004926; report dated Nov. 11, 2021; (5 pages).
Written Opinion for related International Application No. PCT/KR2021/004926; report dated Nov. 11, 2021; (4 pages).

* cited by examiner (a)

(b)

(a)

(b)

(a)

(b)

(a)

(b)

(a)

(b)

(a)

(b)

(a)

(b)

(a)

(a)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

ARC PATH FORMATION UNIT AND DIRECT CURRENT RELAY COMPRISING SAME

CROSS-REFERENCE TO RELATED APPLICATION

The present application is a National Stage of International Application No. PCT/KR2021/004926 filed on Apr. 20, 2021, which claims priority to and the benefit of Korean Utility Model Application No. 10-2020-0054002, filed May 6, 2020, and Korean Utility Model Application No. 10-2020-0079598, filed Jun. 29, 2020, the disclosures of which are incorporated herein by reference in its entirety.

FIELD

The present disclosure relates to an arc path formation unit and a direct current relay including the same, and more particularly, to an arc path formation unit having a structure capable of preventing damage to a direct current relay while forming an arc discharge path using an electromagnetic force, and a direct current relay including the same.

BACKGROUND

A direct current relay is a device that transmits a mechanical driving signal or a current signal using the principle of an electromagnet. The direct current relay is also called a magnetic switch and is generally classified as an electrical circuit switching device.

The direct current relay includes a fixed contact and a movable contact. The fixed contact is electrically connected to an external power supply and a load. The fixed contact and the movable contact may be brought into contact with or separated from each other.

By the contact and separation between the fixed contact and the movable contact, a current flow through the direct current relay is allowed or blocked. Such a movement is made by a driving unit that applies a driving force to the movable contact.

When the fixed contact and the movable contact are separated from each other, an arc is generated between the fixed contact and the movable contact. The arc is a flow of high-pressure and high-temperature current. Accordingly, the generated arc must be quickly discharged from the direct current relay through a predetermined path.

An arc discharge path is formed by magnets provided in the direct current relay. The magnets form magnetic fields in a space in which the fixed contact and the movable contact are in contact with each other. The arc discharge path may be formed by the formed magnetic field and an electromagnetic force generated by a flow of current.

Referring to FIG. 1, a space in which fixed contacts 1100 and a movable contact 1200 provided in a direct current relay 1000 according to the related art are in contact with each other is illustrated. As described above, permanent magnets 1300 are provided in the space.

The permanent magnets 1300 include a first permanent magnet 1310 disposed at an upper side and a second permanent magnet 1320 disposed at a lower side.

The first permanent magnet 1310 is provided in plural, and each surface facing the second permanent magnet 1320 is magnetized to a different polarity. A lower side of the first permanent magnet 1310 located on a left side of FIG. 1 is magnetized to an N pole, and a lower side of the first permanent magnet 1310 located on a right side of FIG. 1 is magnetized to an S pole.

Further, the second permanent magnet 1320 is also provided in plural, and each surface facing the first permanent magnet 1310 is magnetized to a different polarity. An upper side of the second permanent magnet 1320 located on the left side of FIG. 1 is magnetized to an S pole, and an upper side of the second permanent magnet 1320 located on the right side of FIG. 1 is magnetized to an N pole.

FIG. 1A illustrates a state in which current flows in through the left fixed contact 1100 and flows out through the right fixed contact 1100. According to the Fleming's left-hand rule, an electromagnetic force is formed as indicated by a hatched arrow.

Specifically, in the case of the fixed contact 1100 located on the left side, the electromagnetic force is formed toward the outside. Accordingly, the arc generated at the corresponding location can be discharged to the outside.

However, in the case of the fixed contact 1100 located on the right side, the electromagnetic force is formed to the inside, that is, toward a central portion of the movable contact 1200. Accordingly, the arc generated at the corresponding location cannot be immediately discharged to the outside.

Further, FIG. 1B illustrates a state in which current flows in through the right fixed contact 1100 and flows out through the left fixed contact 1100. According to the Fleming's left-hand rule, an electromagnetic force is formed as indicated by a hatched arrow.

Specifically, in the case of the fixed contact 1100 located on the right side, the electromagnetic force is formed toward the outside. Accordingly, the arc generated at the corresponding location can be discharged to the outside.

However, in the case of the fixed contact 1100 located on the left side, the electromagnetic force is formed to the inside, that is, toward the central portion of the movable contact 1200. Accordingly, the arc generated at the corresponding location cannot be immediately discharged to the outside.

Several members for driving the movable contact 1200 to be moved in a vertical direction are provided in a central portion of the direct current relay 1000, that is, in a space between the fixed contacts 1100. As an example, a shaft, a spring member inserted through the shaft, and the like are provided at the location.

Accordingly, when the arc generated as illustrated in FIG. 1 is moved toward the central portion, or the arc moved to the central portion cannot be immediately moved to the outside, there is a risk that the several members provided at the location may be damaged by energy of the arc.

In addition, as illustrated in FIG. 1, a direction of the electromagnetic force formed inside the direct current relay 1000 according to the related art depends on a direction of current flowing through the fixed contacts 1100. That is, the location of the electromagnetic force, which is formed in a direction toward the inside, among the electromagnetic forces generated in each fixed contact 1100 is different depending on the direction of the current.

That is, a user must consider the direction of the current whenever using the direct current relay. This may cause inconvenience to the use of the direct current relay. In addition, regardless of the user's intention, a situation in which a direction of current applied to the direct current relay is changed due to an inexperienced operation or the like cannot be excluded.

In this case, the members provided in the central portion of the direct current relay may be damaged by the generated arc. Accordingly, there is a concern of reducing the durable lifetime of the direct current relay and also generating safety accidents.

Korean Registration application Ser. No. 10/169,6952 discloses a direct current relay. Specifically, a direct current relay having a structure capable of preventing movement of a movable contact by using a plurality of permanent magnets is disclosed.

However, the direct current relay having the above structure can prevent the movement of the movable contact by using the plurality of permanent magnets, but there is a limitation in that any method for controlling a direction of an arc discharge path is not considered.

Korean Registration application Ser. No. 10/121,6824 discloses a direct current relay. Specifically, a direct current relay having a structure capable of preventing arbitrary separation between a movable contact and a fixed contact using a damping magnet is disclosed.

However, the direct current relay having the above structure merely proposes a method for maintaining a contact state between the movable contact and the fixed contact. That is, there is a limitation in that a method for forming a discharge path for an arc generated when the movable contact and the fixed contact are separated from each other is not introduced.

(Patent Document 1) Korean Registration Application No. 10-1696952 (Jan. 16, 2017)

(Patent Document 2) Korean Registration Application No. 10-1216824 (Dec. 28, 2012)

SUMMARY

The present disclosure is directed to providing an arc path formation unit having a structure capable of solving the above-described problems and a direct current relay including the same.

First, the present disclosure is directed to providing an arc path formation unit having a structure in which a generated arc does not extend toward a central portion, and a direct current relay including the same.

Further, the present disclosure is directed to providing an arc path formation unit having a structure capable of forming an arc discharge path toward the outside regardless of a direction of current applied to a fixed contact, and a direct current relay including the same.

Further, the present disclosure is directed to providing an arc path formation unit having a structure capable of minimizing damage to members located at a central portion due to a generated arc, and a direct current relay including the same.

Further, the present disclosure is directed to providing an arc path formation unit having a structure capable of sufficiently extinguishing a generated arc while the generated arc moves, and a direct current relay including the same.

Further, the present disclosure is directed to providing an arc path formation unit having a structure capable of increasing the strength of magnetic fields for forming an arc discharge path, and a direct current relay including the same.

Further, the present disclosure is directed to providing an arc path formation unit having a structure capable of changing an arc discharge path without excessively changing the structure, and a direct current relay including the same.

Further, the present disclosure is directed to providing an arc path formation unit having a structure capable of quickly extinguishing and discharging an arc generated as flowing current is interrupted, and a direct current relay including the same.

Further, the present disclosure is directed to providing an arc path formation unit having a structure capable of increasing the magnitude of force for inducing a generated arc, and a direct current relay including the same.

Further, the present disclosure is directed to providing an arc path formation unit having a structure capable of preventing damage to a constituent element for electric connection due to a generated arc, and a direct current relay including the same.

Further, the present disclosure is directed to providing an arc path formation unit having a structure capable of allowing arcs generated at a plurality of locations to propagate without meeting each other, and a direct current relay including the same.

Further, the present disclosure is directed to providing an arc path formation unit having a structure capable of achieving the above-described objects without an excessive design change, and a direct current relay including the same.

In order to achieve those objects, one embodiment of the present disclosure provides an arc path formation unit including a magnet frame having a space formed therein and including a plurality of surfaces surrounding the space, and a magnet part accommodated in the space and configured to form a magnetic field in the space, wherein the plurality of surfaces include a first surface formed to extend in one direction, a second surface disposed to face the first surface and formed to extend in the one direction, and a third surface and a fourth surface that are continuous with the first surface and the second surface, respectively, extend in the other direction, and are disposed to face each other, and the magnet part includes a first magnet part located adjacent to the first surface, a second magnet part located adjacent to the second surface and disposed to face the first magnet part, a third magnet part and a fourth magnet part that are located adjacent to the third surface and disposed in parallel in the other direction in which the third surface extends, and a fifth magnet part and a sixth magnet part that are located adjacent to the fourth surface and disposed in parallel in the other direction in which the fourth surface extends, wherein one surfaces of the first magnet part and the second magnet part facing each other are each magnetized to one of an S pole and an N pole, and one surfaces of the third magnet part and the fourth magnet part facing each other and one surfaces of the fifth magnet part and the sixth magnet part facing each other are each magnetized to the other one of the S pole and the N pole.

Further, the space of the arc path formation unit may accommodate a fixed contactor formed to extend in the one direction and a movable contactor configured to be brought into contact with or separated from the fixed contactor, wherein the fixed contactor may include a first fixed contactor and a second fixed contactor that are located to be spaced apart from each other, and the first magnet part and the second magnet part may be disposed such that a virtual line connecting the first magnet part and the second magnet part intersects a virtual line connecting the first fixed contactor and the second fixed contactor.

Further, the space of the arc path formation unit may accommodate a fixed contactor formed to extend in the one direction and a movable contactor configured to be brought into contact with or separated from the fixed contactor, and the one surfaces of the third magnet part and the fourth magnet part facing each other may be disposed to face each other with a virtual straight line extending from the fixed contactor therebetween.

Further, the space of the arc path formation unit may accommodate a fixed contactor formed to extend in the one direction and a movable contactor configured to be brought into contact with or separated from the fixed contactor, and the one surfaces of the fifth magnet part and the sixth magnet part facing each other may be disposed to face each other with a virtual straight line extending from the fixed contactor therebetween.

Further, one embodiment of the present disclosure provides a direct current relay including a fixed contactor formed to extend in one direction, a movable contactor configured to be brought into contact with or separated from the fixed contactor, and an arc path formation unit having a space portion, in which the fixed contactor and the movable contactor are accommodated, formed therein and configured to form a magnetic field that induces an arc, which is generated as the fixed contactor and the movable contactor are separated from each other, in the space portion, wherein the arc path formation unit includes a magnet frame having the space portion formed therein and including a plurality of surfaces surrounding the space portion, and a magnet part accommodated in the space portion and configured to form the magnetic field, wherein the plurality of surfaces include a first surface formed to extend in the one direction, a second surface disposed to face the first surface with the space portion therebetween and formed to extend in the one direction, and a third surface and a fourth surface that are continuous with the first surface and the second surface, respectively, extend in the other direction, and are disposed to face each other with the space portion therebetween, and the magnet part includes a first magnet part located adjacent to the first surface and extending in the one direction, a second magnet part located adjacent to the second surface, extending in the one direction, and disposed to face the first magnet part, a third magnet part located adjacent to the third surface, extending in the other direction, and located to be biased to the first surface, a fourth magnet part located adjacent to the third surface, extending in the other direction, and located to be biased to the second surface, a fifth magnet part located adjacent to the fourth surface, extending in the other direction, and located to be biased to the first surface, and a sixth magnet part located adjacent to the fourth surface, extending in the other direction, and located to be biased to the second surface, wherein one surfaces of the first magnet part and the second magnet part facing each other are each magnetized to one of an S pole and an N pole, and one surfaces of the third magnet part and the fourth magnet part facing each other and one surfaces of the fifth magnet part and the sixth magnet part facing each other are each magnetized to the other one of the S pole and the N pole.

Further, another embodiment of the present disclosure provides an arc path formation unit including a magnet frame having a space formed therein and including a plurality of surfaces surrounding the space, and a magnet part accommodated in the space and configured to form a magnetic field in the space, wherein the plurality of surfaces include a first surface formed to extend in one direction, a second surface disposed to face the first surface and formed to extend in the one direction, and a third surface and a fourth surface that are continuous with the first surface and the second surface, respectively, extend in the other direction, and are disposed to face each other, and the magnet part includes a first magnet part located adjacent to the first surface, a second magnet part located adjacent to the second surface and disposed to face the first magnet part, a third magnet part located adjacent to the third surface, and located to be biased to any one surface of the first surface and the second surface, and a fourth magnet part located adjacent to the fourth surface, and located to be biased to the other surface of the first surface and the second surface, wherein one surfaces of the first magnet part and the second magnet part facing each other are each magnetized to one of an S pole and an N pole, and one surface of the third magnet part facing the other surface and one surface of the fourth magnet part facing the any one surface are each magnetized to the other one of the S pole and the N pole.

Further, the space of the arc path formation unit may accommodate a fixed contactor formed to extend in the one direction and a movable contactor configured to be brought into contact with or separated from the fixed contactor, and the one surface of the third magnet part may be located between a virtual straight line extending from the fixed contactor and the any one surface.

Further, the space may accommodate a fixed contactor formed to extend in the one direction and a movable contactor configured to be brought into contact with or separated from the fixed contactor, and the one surface of the fourth magnet part may be located between a virtual straight line extending from the fixed contactor and the other surface.

Further, another embodiment of the present disclosure provides a direct current relay including a fixed contactor formed to extend in one direction, a movable contactor configured to be brought into contact with or separated from the fixed contactor, and an arc path formation unit having a space portion, in which the fixed contactor and the movable contactor are accommodated, formed therein and configured to form a magnetic field that induces an arc, which is generated as the fixed contactor and the movable contactor are separated from each other, in the space portion, wherein the arc path formation unit includes a magnet frame having the space portion formed therein and including a plurality of surfaces surrounding the space portion, and a magnet part accommodated in the space portion and configured to form the magnetic field, wherein the plurality of surfaces include a first surface formed to extend in the one direction, a second surface disposed to face the first surface and formed to extend in the one direction, and a third surface and a fourth surface that are continuous with the first surface and the second surface, respectively, extend in the other direction, and are disposed to face each other, and the magnet part includes a first magnet part located adjacent to the first surface and extending in the one direction, a second magnet part located adjacent to the second surface, extending in the one direction, and disposed to face the first magnet part with the fixed contactor therebetween, a third magnet part located adjacent to the third surface, extending in the other direction, and located to be biased to any one surface of the first surface and the second surface, and a fourth magnet part located adjacent to the fourth surface, extending in the other direction, and located to be biased to the other surface of the first surface and the second surface, wherein one surfaces of the first magnet part and the second magnet part facing each other are each magnetized to one of an S pole and an N pole, and one surface of the third magnet part facing the other surface and one surface of the fourth magnet part facing the any one surface are each magnetized to the other one of the S pole and the N pole.

Further, a modified example of another embodiment of the present disclosure provides an arc path formation unit including a magnet frame having a space formed therein and including a plurality of surfaces surrounding the space, and a magnet part accommodated in the space and configured to form a magnetic field in the space, wherein the plurality of surfaces include a first surface formed to extend in one direction, a second surface disposed to face the first surface and formed to extend in the one direction, and a third surface and a fourth surface that are continuous with the first surface and the second surface, respectively, extend in the other direction, and are disposed to face each other, and the magnet part includes a first magnet part located adjacent to the first surface, a second magnet part located adjacent to the second surface and disposed to face the first magnet part, and a third magnet part located adjacent to one of the third surface and the fourth surface, and located to be biased to any one surface of the first surface and the second surface, wherein one surfaces of the first magnet part and the second magnet part facing each other and one surface of the third magnet part facing the any one surface are magnetized to the same polarity.

Further, the first magnet part and the second magnet part of the arc path formation unit may be formed to extend in the one direction, and the third magnet part may be formed to extend in the other direction.

Further, still another embodiment of the present disclosure provides an arc path formation unit including a magnet frame having a space formed therein and including a plurality of surfaces surrounding the space, and a magnet part accommodated in the space and configured to form a magnetic field in the space, wherein the plurality of surfaces include a first surface formed to extend in one direction, a second surface disposed to face the first surface and formed to extend in the one direction, and a third surface and a fourth surface that are continuous with the first surface and the second surface, respectively, extend in the other direction, and are disposed to face each other, and the magnet part includes a first magnet part located adjacent to the first surface, a second magnet part located adjacent to the second surface and disposed to face the first magnet part, a third magnet part and a fourth magnet part located adjacent to any one surface of the third surface and the fourth surface and disposed in parallel, and a fifth magnet part located adjacent to the other surface of the third surface and the fourth surface, disposed to face the third magnet part and the fourth magnet part, and located to be biased to any one surface of the first surface and the second surface, wherein one surfaces of the first magnet part and the second magnet part facing each other are each magnetized to one of an S pole and an N pole, one surfaces of the third magnet part and the fourth magnet part facing each other are each magnetized to the other one of the N pole and the S pole, and one surface of the fifth magnet part facing the any one surface of the first surface and the second surface is magnetized to the one of the N pole and the S pole.

Further, the third magnet part, the fourth magnet part, and the fifth magnet part of the arc path formation unit may be formed to extend in the other direction, and the fifth magnet part may be disposed to overlap one of the third magnet part and the fourth magnet part in the other direction.

Further, the space of the arc path formation unit may accommodate a fixed contactor formed to extend in the one direction and a movable contactor configured to be brought into contact with or separated from the fixed contactor, and the one surfaces of the third magnet part and the fourth magnet part facing each other may be disposed to face each other with a virtual straight line extending from the fixed contactor therebetween.

Further, the space of the arc path formation unit may accommodate a fixed contactor extending in the one direction and a movable contactor configured to be brought into contact with or separated from the fixed contactor, and the other surface of the fifth magnet part facing the other surface of the first surface and the second surface may be located between a virtual straight line extending from the fixed contactor and the any one surface of the first surface and the second surface.

Further, still another embodiment of the present disclosure provides a direct current relay including a fixed contactor formed to extend in one direction, a movable contactor configured to be brought into contact with or separated from the fixed contactor, and an arc path formation unit having a space portion, in which the fixed contactor and the movable contactor are accommodated, formed therein and configured to form a magnetic field that induces an arc, which is generated as the fixed contactor and the movable contactor are separated from each other, in the space portion, wherein the arc path formation unit includes a magnet frame having the space portion formed therein and including a plurality of surfaces surrounding the space portion, and a magnet part accommodated in the space portion and configured to form the magnetic field, wherein the plurality of surfaces include a first surface formed to extend in the one direction, a second surface disposed to face the first surface and formed to extend in the one direction, and a third surface and a fourth surface that are continuous with the first surface and the second surface, respectively, extend in the other direction, and are disposed to face each other, and the magnet part includes a first magnet part located adjacent to the first surface and formed to extend in the one direction, a second magnet part located adjacent to the second surface, formed to extend in the one direction, and disposed to face the first magnet part, a third magnet part and a fourth magnet part located adjacent to any one surface of the third surface and the fourth surface, disposed in parallel to each other, and each formed to extend in the other direction, and a fifth magnet part located adjacent to the other surface of the third surface and the fourth surface, disposed to face the third magnet part and the fourth magnet part, located to be biased to any one surface of the first surface and the second surface, and formed to extend in the other direction, wherein one surfaces of the first magnet part and the second magnet part facing each other are each magnetized to one of an S pole and an N pole, one surfaces of the third magnet part and the fourth magnet part facing each other are each magnetized to the other one of the N pole and the S pole, and one surface of the fifth magnet part facing the any one surface of the first surface and the second surface is magnetized to the one of the N pole and the S pole.

Further, a modified example of still another embodiment of the present disclosure provides an arc path formation unit including a magnet frame having a space formed therein and including a plurality of surfaces surrounding the space, and a magnet part accommodated in the space and configured to form a magnetic field in the space, wherein the plurality of surfaces include a first surface formed to extend in one direction, a second surface disposed to face the first surface and formed to extend in the one direction, and a third surface and a fourth surface that are continuous with the first surface and the second surface, respectively, extend in the other direction, and are disposed to face each other, and the magnet part includes a first magnet part located adjacent to the first surface, a second magnet part located adjacent to the second surface and disposed to face the first magnet part, and a third magnet part and a fourth magnet part located adjacent to any one surface of the third surface and the fourth surface and disposed in parallel to each other, wherein one surfaces of the first magnet part and the second magnet part facing each other are each magnetized to one of an S pole and an N pole, and one surfaces of the third magnet part and the fourth magnet part facing each other are each magnetized to the other one of the N pole and the S pole.

Further, the space of the arc path formation unit may accommodate a fixed contactor formed to extend in the one direction and a movable contactor configured to be brought into contact with or separated from the fixed contactor, and the one surfaces of the third magnet part and the fourth magnet part facing each other may be disposed to face each other with a virtual straight line extending from the fixed contactor therebetween.

Further, the first magnet part and the second magnet part of the arc path formation unit may be formed to extend in the one direction, and each of the third magnet part and the fourth magnet part may be formed to extend in the other direction by a length by which each of the third magnet part and the fourth magnet part is shorter than each of the first magnet part and the second magnet part.

Further, a modified example of still another embodiment of the present disclosure provides a direct current relay including a fixed contactor formed to extend in one direction, a movable contactor configured to be brought into contact with or separated from the fixed contactor, and an arc path formation unit having a space portion, in which the fixed contactor and the movable contactor are accommodated, formed therein and configured to form a magnetic field that induces an arc, which is generated as the fixed contactor and the movable contactor are separated from each other, in the space portion, wherein the arc path formation unit includes a magnet frame having the space portion formed therein and including a plurality of surfaces surrounding the space portion, and a magnet part accommodated in the space portion and configured to form the magnetic field, wherein the plurality of surfaces include a first surface formed to extend in the one direction, a second surface disposed to face the first surface and formed to extend in the one direction, and a third surface and a fourth surface that are continuous with the first surface and the second surface, respectively, extend in the other direction, and are disposed to face each other, and the magnet part includes a first magnet part located adjacent to the first surface and extending in the one direction, a second magnet part located adjacent to the second surface, extending in the one direction, and disposed to face the first magnet part with the fixed contactor therebetween, a third magnet part located adjacent to the third surface, extending in the other direction, and located to be biased to any one surface of the first surface and the second surface, and a fourth magnet part located adjacent to the fourth surface, extending in the other direction, and located to be biased to the other surface of the first surface and the second surface, wherein one surfaces of the first magnet part and the second magnet part facing each other are each magnetized to one of an S pole and an N pole, and one surface of the third magnet part facing the other surface and one surface of the fourth magnet part facing the any one surface are each magnetized to the other one of the S pole and the N pole.

Further, yet another embodiment of the present disclosure provides an arc path formation unit including a magnet frame having a space portion, in which a fixed contactor and a movable contactor are accommodated, formed therein, and a plurality of magnet parts located in the space portion of the magnet frame and configured to form a magnetic field in the space portion, wherein a length of the space portion in one direction is formed to be greater than a length thereof in the other direction, the magnet frame includes a first surface and a second surface extending in the one direction, disposed to face each other, and configured to surround a portion of the space portion, and a third surface and a fourth surface which extend in the other direction, are continuous with the first surface and the second surface, respectively, are disposed to face each other, and are configured to surround a remaining portion of the space portion, and the plurality of magnet parts include a first magnet part located adjacent to any one surface of the third surface and the fourth surface, and a second magnet part located adjacent to the other surface of the third surface and the fourth surface, and disposed to face the first magnet part with the space portion therebetween.

Further, the plurality of magnet parts of the arc path formation unit may include a third magnet part located adjacent to any one surface of the first surface and the second surface, and located to be biased to the any one surface of the third surface and the fourth surface, and a fourth magnet part located adjacent to the other surface of the first surface and the second surface, and located to be biased to the other surface of the third surface and the fourth surface.

Further, a surface of the first magnet part of the arc path formation unit facing the space portion and a surface of the second magnet part facing the space portion may be magnetized to the same polarity, and a surface of the third magnet part facing the other surface of the third surface and the fourth surface and a surface of the fourth magnet part facing the any one surface of the third surface and the fourth surface may each be magnetized to a polarity different from the polarity.

Further, the fixed contactor of the arc path formation unit may include a first fixed contactor and a second fixed contactor disposed to be spaced apart from each other in the one direction, the third magnet part may be located to overlap one of the first fixed contactor and the second fixed contactor in the other direction, and the fourth magnet part may be disposed to overlap the other one of the first fixed contactor and the second fixed contactor in the other direction.

Further, the plurality of magnet parts of the arc path formation unit may include a third magnet part located adjacent to any one surface of the first surface and the second surface, and located to be biased to the any one surface of the third surface and the fourth surface, a fourth magnet part located adjacent to the other surface of the first surface and the second surface, and located to be biased to the any one surface of the third surface and the fourth surface, and a fifth magnet part located adjacent to the any one surface of the first surface and the second surface, and located to be biased to the other surface of the third surface and the fourth surface.

Further, a surface of the first magnet part of the arc path formation unit facing the space portion and a surface of the second magnet part facing the space portion may be magnetized to the same polarity, and a surface of the third magnet part facing the other surface of the third surface and the fourth surface and surfaces of the fourth magnet part and the fifth magnet part facing each other may each be magnetized to a polarity different from the polarity.

Further. the fixed contactor of the arc path formation unit may include a first fixed contactor and a second fixed contactor disposed to be spaced apart from each other in the one direction, the third magnet part may be located to overlap the fourth magnet part and one of the first fixed contactor and the second fixed contactor in the other direction, and the fifth magnet part may be disposed to overlap the other one of the first fixed contactor and the second fixed contactor in the other direction.

Further, the plurality of magnet parts of the arc path formation unit may include a third magnet part located adjacent to any one surface of the first surface and the second surface, and located to be biased to the any one surface of the third surface and the fourth surface, a fourth magnet part located adjacent to the any one surface of the first surface and the second surface, and located to be biased to the other surface of the third surface and the fourth surface, a fifth magnet part located adjacent to the other surface of the first surface and the second surface, and located to be biased to the any one surface of the third surface and the fourth surface, and a sixth magnet part located adjacent to the other surface of the first surface and the second surface, and located to be biased to the other surface of the third surface and the fourth surface.

Further, a surface of the first magnet part of the arc path formation unit facing the space portion and a surface of the second magnet part facing the space portion may be magnetized to the same polarity, and one surfaces of the third magnet part and the fourth magnet part facing each other and one surfaces of the fifth magnet part and the sixth magnet part facing each other may each be magnetized to a polarity different from the polarity.

Further, the fixed contactor of the arc path formation unit may include a first fixed contactor and a second fixed contactor disposed to be spaced apart from each other in the one direction, the third magnet part may be located to overlap the fifth magnet part and one of the first fixed contactor and the second fixed contactor in the other direction, and the fourth magnet part may be located to overlap the sixth magnet part and the other one of the first fixed contactor and the second fixed contactor in the other direction.

Further, yet another embodiment of the present disclosure provides a direct current relay including a plurality of fixed contactors located to be spaced apart from each other in one direction, a movable contactor configured to be brought into contact with or separated from the fixed contactor, a magnet frame having a space portion, in which the fixed contactor and the movable contactor are accommodated, formed therein, and a plurality of magnet parts located in the space portion of the magnet frame and configured to form a magnetic field in the space portion, wherein a length of the space portion in the one direction is formed to be greater than a length thereof in the other direction, the magnet frame includes a first surface and a second surface extending in the one direction, disposed to face each other, and configured to surround a portion of the space portion, and a third surface and a fourth surface which extend in the other direction, are continuous with the first surface and the second surface, respectively, are disposed to face each other, and are configured to surround a remaining portion of the space portion, and the plurality of magnet parts include a first magnet part located adjacent to any one surface of the third surface and the fourth surface, and a second magnet part located adjacent to the other surface of the third surface and the fourth surface, and disposed to face the first magnet part with the space portion therebetween.

Further, the plurality of magnet parts of the direct current relay may include a third magnet part located adjacent to any one surface of the first surface and the second surface, and located to be biased to the any one surface of the third surface and the fourth surface, and a fourth magnet part located adjacent to the other surface of the first surface and the second surface, and located to be biased to the other surface of the third surface and the fourth surface, wherein the third magnet part may be disposed to overlap any one of the plurality of fixed contactors in the other direction, and the fourth magnet part may be disposed to overlap the other one of the plurality of fixed contactors in the other direction.

Further, a surface of the first magnet part of the direct current relay facing the space portion and a surface of the second magnet part facing the space portion may be magnetized to the same polarity, and a surface of the third magnet part facing the other surface of the third surface and the fourth surface and a surface of the fourth magnet part facing the any one surface of the third surface and the fourth surface may each be magnetized to a polarity different from the polarity.

Further, the plurality of magnet parts of the direct current relay may include a third magnet part located adjacent to any one surface of the first surface and the second surface, and located to be biased to the any one surface of the third surface and the fourth surface, a fourth magnet part located adjacent to the other surface of the first surface and the second surface, and located to be biased to the any one surface of the third surface and the fourth surface, and a fifth magnet part located adjacent to the any one surface of the first surface and the second surface, and located to be biased to the other surface of the third surface and the fourth surface, wherein the third magnet part may be disposed to overlap the fourth magnet part and any one of the plurality of fixed contactors in the other direction, and the fifth magnet part may be disposed to overlap the other one of the plurality of fixed contactors in the other direction.

Further, a surface of the first magnet part of the direct current relay facing the space portion and a surface of the second magnet part facing the space portion may be magnetized to the same polarity, and a surface of the third magnet part facing the other surface of the third surface and the fourth surface and surfaces of the fourth magnet part and the fifth magnet part facing each other may each be magnetized to a polarity different from the polarity.

Further, the plurality of magnet parts of the direct current relay may include a third magnet part located adjacent to any one surface of the first surface and the second surface, and located to be biased to the any one surface of the third surface and the fourth surface, a fourth magnet part located adjacent to the any one surface of the first surface and the second surface, and located to be biased to the other surface of the third surface and the fourth surface, a fifth magnet part located adjacent to the other surface of the first surface and the second surface, and located to be biased to the any one surface of the third surface and the fourth surface, and a sixth magnet part located adjacent to the other surface of the first surface and the second surface, and located to be biased to the other surface of the third surface and the fourth surface, wherein the third magnet part may be disposed to overlap the fifth magnet part and any one of the plurality of fixed contactors in the other direction, and the fourth magnet part may be disposed to overlap the sixth magnet part and the other one of the plurality of fixed contactors in the other direction.

Further, a surface of the first magnet part of the direct current relay facing the space portion and a surface of the second magnet part facing the space portion may be magnetized to the same polarity, and one surfaces of the third magnet part and the fourth magnet part facing each other and one surfaces of the fifth magnet part and the sixth magnet part facing each other may each be magnetized to a polarity different from the polarity.

According to embodiments of the present disclosure, the following effects can be achieved.

First, an arc path formation unit forms a magnetic field inside an arc chamber. The magnetic field forms an electromagnetic force together with current flowing through a fixed contactor and a movable contactor. The electromagnetic force is formed in a direction away from a center of the arc chamber.

Specifically, a first magnet part and a second magnet part are provided on a first surface and a second surface, respectively. Surfaces of the first magnet part and the second magnet part facing each other are magnetized to the same polarity.

A single or a plurality of magnet parts are provided on at least one of a third surface and a fourth surface. In this case, among surfaces of the magnet part provided on the third surface or the fourth surface, the surface facing the first magnet part is magnetized to the same polarity as the surface of the first magnet part.

Similarly, among surfaces of the magnet part provided on the third surface or the fourth surface, the surface facing the second magnet part is magnetized to the same polarity as the surface of the second magnet part.

Accordingly, a direction of a magnetic field formed between the first and second magnet parts and the magnet part provided on the third surface or the fourth surface is formed away from a central portion of the arc chamber.

Accordingly, a generated arc is moved away from the center of the arc chamber in the same direction as the direction of the electromagnetic force. Thus, the generated arc is not moved to the central portion of the arc chamber.

That is, the electromagnetic force formed in the vicinity of each fixed contactor is formed in a direction away from the central portion regardless of a direction of current.

Accordingly, a user does not need to connect a power supply to a direct current relay in consideration of a direction in which an arc is moved. Accordingly, user convenience can be increased.

In addition, the generated arc extends toward a wider space, i.e., the outside of the fixed contactor, rather than a center of a magnet frame that is a narrow space, i.e., between the fixed contactors.

Accordingly, the arc can be extinguished sufficiently while moving on a long path.

Further, each magnet part can form an electromagnetic force in various directions just by changing an arrangement method and polarity thereof. In this case, the magnet frame in which each magnet part is provided does not require a change in structure and shape.

Accordingly, it is possible to easily change an arc discharge direction without excessively changing the entire structure of the arc path formation unit. Accordingly, user convenience can be increased.

Further, the arc path formation unit includes the magnet parts. Each of the magnet parts forms a magnetic field inside the arc path formation unit. The formed magnetic field forms an electromagnetic force together with the current flowing through the fixed contactor and the movable contactor accommodated in the arc path formation unit.

In this case, a generated arc is formed in a direction away from each fixed contactor. An arc generated as the fixed contactor and the movable contactor are separated from each other can be induced by the electromagnetic force.

Accordingly, the generated arc can be quickly extinguished and discharged to the outside of the arc path formation unit and the direct current relay.

Further, a plurality of magnet parts can be provided. The plurality of magnet parts are formed so as to enhance the strength of the electromagnetic force formed in the vicinity of each fixed contactor. That is, the arc path formed in the vicinity of the same fixed contactor are formed in the same direction by different magnet parts.

Accordingly, the strength of the magnetic field formed in the vicinity of each fixed contactor and the strength of the electromagnetic force, which is depending on the strength of the magnetic field, can also be enhanced. As a result, the strength of the electromagnetic force inducing the generated arc can be enhanced so that the generated arc can be effectively extinguished and discharged.

Further, directions of the magnetic field formed by the magnet parts and the electromagnetic force formed by the current flowing through the fixed contactor and the movable contactor are formed in a direction away from the central portion.

Furthermore, as described above, since the strength of each of the magnetic field and the electromagnetic force is enhanced by the magnet parts, the generated arc can be extinguished and moved quickly in a direction away from the central portion.

Accordingly, it is possible to prevent damage to various constituent elements provided in the vicinity of the central portion for the operation of the direct current relay.

Further, in various embodiments, a plurality of fixed contactors can be provided. The magnet parts provided in the arc path formation unit form magnetic fields in different directions in the vicinity of each fixed contactor. Thus, paths of the arc generated in the vicinity of each fixed contactor proceed in different directions.

Accordingly, the arcs generated in the vicinity of each fixed contactor do not meet each other. Thus, a malfunction or a safety accident that may occur due to a collision of arcs generated at different locations can be prevented.

Further, in order to achieve the above-described objects and effects, the arc path formation unit includes a magnet part provided in a space portion. The magnet part is located on an inner side of each surface of a magnet frame surrounding the space portion. That is, a separate design change for arranging the magnet part outside the space portion is not required.

Accordingly, without an excessive design change, the arc path formation unit according to various embodiments of the present disclosure can be provided in the direct current relay. Accordingly, time and costs for applying the arc path formation unit according to various embodiments of the present disclosure can be reduced.

DETAILED DESCRIPTION

Figure 1:
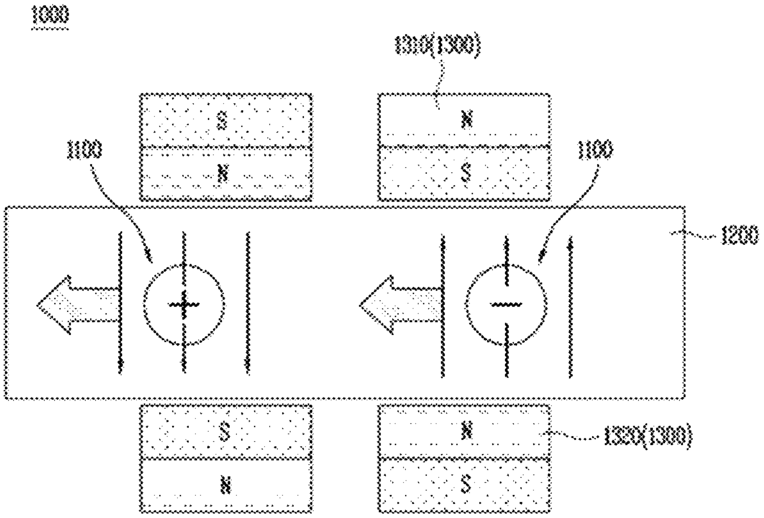
PRIOR ART FIG. 1
FIG. 1 is a conceptual view illustrating a process in which movement paths of an arc are formed in a direct current relay according to the related art.
Figure 1:
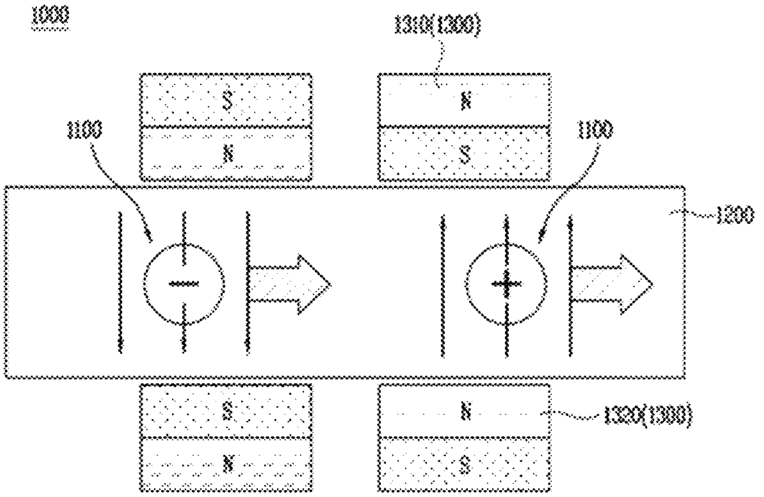
PRIOR ART FIG. 1

Hereinafter, an arc path formation unit 500, 600, or 700 and a direct current relay 1 including the same according to an embodiment of the present disclosure will be described in detail with reference to the accompanying drawings.

In the following description, descriptions of some constituent elements may be omitted to clarify the features of the present disclosure.

1. Definition of Terms

It will be understood that when a constituent element is referred to as being "connected" or "coupled" to another constituent element, it can be directly connected or coupled to the another constituent element or intervening constituent elements may be present.

In contrast, when a constituent element is referred to as being "directly connected" or "directly coupled" to another constituent element, there are no intervening constituent elements present.

A singular representation used herein includes a plural representation unless it represents a definitely different meaning from the context.

The term "magnetize" used in the following description means a phenomenon in which an object exhibits magnetism in a magnetic field.

The term "polarities" used in the following description means different properties belonging to an anode and a cathode of an electrode. In one embodiment, the polarities may be classified into an N pole or an S pole.

The term "electric connection" used in the following description means a state in which two or more members are electrically connected.

The term "arc path A.P" used in the following description means a path through which a generated arc is moved or extinguished.

The symbol "⊙" shown in the following drawings means that current flows in a direction from a movable contactor 43 toward a fixed contactor 22 (i.e., in an upward direction), that is, in a direction in which the current flows from the ground.

The symbol "⊗" shown in the following drawings means that current flows in a direction from the fixed contactor 22 toward the movable contactor 43 (i.e., in a downward direction), that is, a direction in which the current flows into the ground.

The term "magnet part" used in the following description means any type of object that is formed of a magnetic material and capable of forming a magnetic field. In one embodiment, the magnet part may be provided as a permanent magnet, an electromagnet, or the like.

The magnet part may form a magnetic field by itself or together with another magnetic material.

In the following description, magnetic fields affecting different magnet parts are referred to as "main magnetic fields M.M.F," and a magnetic field formed by each magnet part itself is referred to as a "sub magnetic field S.M.F"

The magnet part may extend in one direction. Both end portions of the magnet part in the one direction may be magnetized to different polarities (i.e., the magnet part has different polarities in a longitudinal direction). In addition, both side surfaces of the magnet part in the other direction different from the one direction may be magnetized to different polarities (i.e., the magnet part has different polarities in a width direction).

Figure 2:
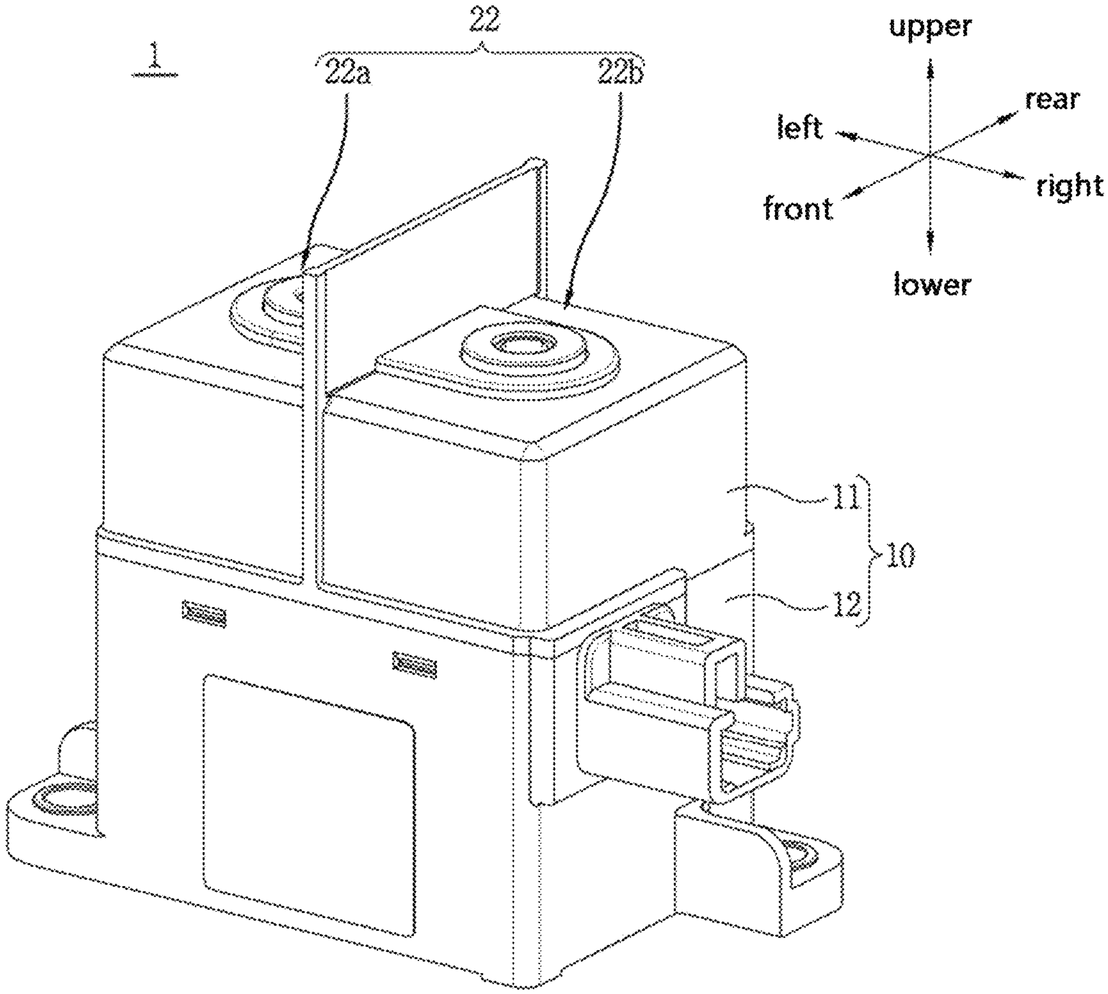
FIG. 2 is a perspective view of a direct current relay according to an embodiment of the present disclosure.

The terms "left side," "right side," "upper side," "lower side," "front side," and "rear side" used in the following description will be understood based on a coordinate system illustrated in FIG. 2.

Figure 3:
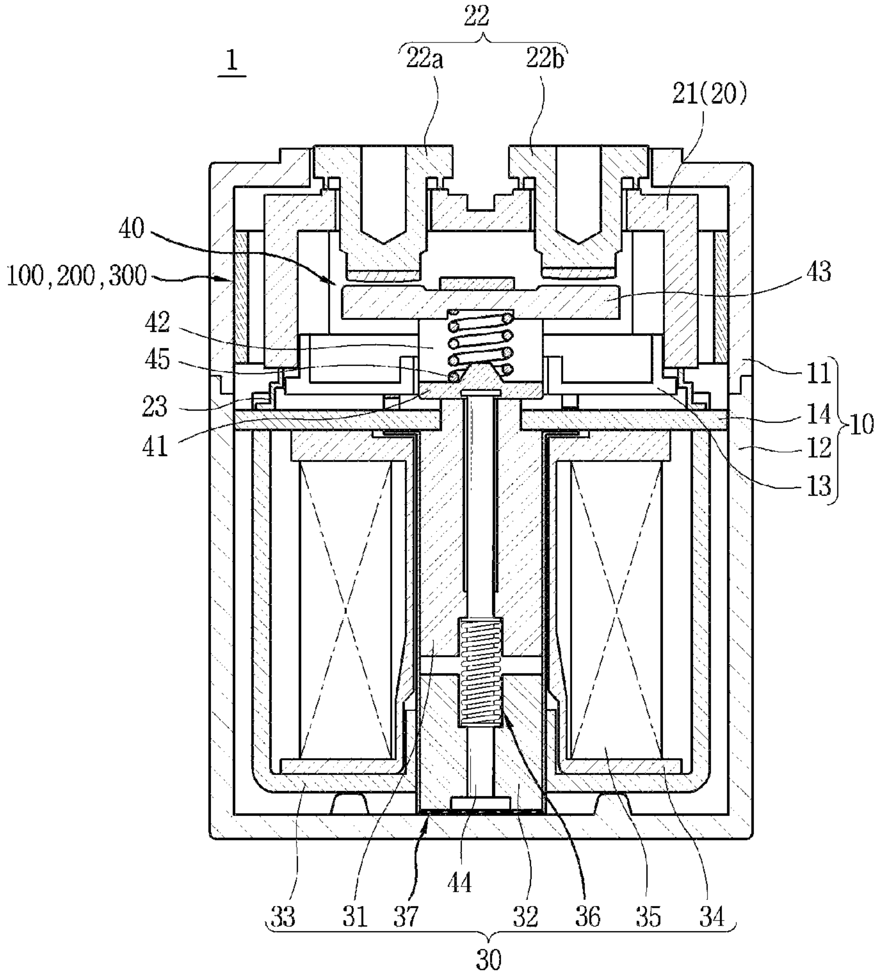
FIG. 3 is a cross-sectional view of the direct current relay of FIG. 2.

2. Description of Configuration of Direct Current Relay 1 According to Embodiment of Present Disclosure Referring to FIGS. 2 to 4, a direct current relay 1 according to the embodiment of the present disclosure includes a frame part 10, an opening/closing part 20, a core part 30, and a movable contactor part 40.

Further, referring to FIGS. 5, 7, 8, 11 to 14, 19, 22 to 27, and 40 to 45, the direct current relay 1 according to the embodiment of the present disclosure includes an arc path formation unit 100, 200, 300, 500, 600, or 700.

The arc path formation unit 100, 200, 300, 500, 600, or 700 may form a discharge path of a generated arc.

Hereinafter, each configuration of the direct current relay 1 according to the embodiment of the present disclosure will be described with reference to the accompanying drawings, and the arc path formation units 100, 200, 300, 500, 600, and 700 will be described as separate clauses.

The description is made on the assumption that the arc path formation units 100, 200, 300, 500, 600, and 700 according to various embodiments described below are each provided in the direct current relay 1.

However, it will be understood that the arc path formation units 100, 200, 300, 500, 600, and 700 are applicable to a device in a form that can be electrically connected to and disconnected from the outside by the contact and separation between a fixed contact and a movable contact, such as a magnetic contactor, a magnetic switch, or the like.

(1) Description of Frame Part 10

The frame part 10 forms an outer side of the direct current relay 1. A predetermined space is formed in the frame part 10. Various devices for the direct current relay 1 to perform functions for applying or cutting off current transmitted from the outside may be accommodated in the space.

That is, the frame part 10 serves as a kind of housing.

The frame part 10 may be formed of an insulating material such as synthetic resin. This is for preventing an arbitrary electrical connection between the inside and outside of the frame part 10.

The frame part 10 includes an upper frame 11, a lower frame 12, an insulating plate 13, and a supporting plate 14.

The upper frame 11 forms an upper side of the frame part 10. A predetermined space is formed inside the upper frame 11.

The opening/closing part 20 and the movable contactor part 40 may be accommodated in an inner space of the upper frame 11. The arc path formation units 500, 600, and 700 may also be accommodated in the inner space of the upper frame 11.

The upper frame 11 may be coupled to the lower frame 12. The insulating plate 13 and the supporting plate 14 may be provided in a space between the upper frame 11 and the lower frame 12.

The fixed contactor 22 of the opening/closing part 20 is located on one side of the upper frame 11, e.g., on an upper side of the upper frame 11 in the illustrated embodiment. The fixed contactor 22 may be partially exposed to the upper side of the upper frame 11 to be electrically connected to an external power supply or a load.

To this end, a through hole through which the fixed contactor 22 is coupled may be formed at the upper side of the upper frame 11.

The lower frame 12 forms a lower side of the frame part 10. A predetermined space is formed inside the lower frame 12. The core part 30 may be accommodated in the inner space of the lower frame 12.

The lower frame 12 may be coupled to the upper frame 11. The insulating plate 13 and the supporting plate 14 may be provided in the space between the lower frame 12 and the upper frame 11.

The insulating plate 13 and the supporting plate 14 electrically and physically isolate the inner space of the upper frame 11 and the inner space of the lower frame 12 from each other.

The insulating plate 13 is located between the upper frame 11 and the lower frame 12. The insulating plate 13 allows the upper frame 11 and the lower frame 12 to be electrically separated from each other. To this end, the insulating plate 13 may be formed of an insulating material such as synthetic resin.

Arbitrary electrical connection between the opening/closing part 20, the movable contactor part 40, and the arc path formation unit 500, 600, or 700 that are accommodated in the upper frame 11 and the core part 30 accommodated in the lower frame 12 can be prevented by the insulating plate 13.

A through hole (not shown) is formed in a central portion of the insulating plate 13. A shaft 44 of the movable contactor part 40 is coupled through the through hole (not shown) to be movable in a vertical direction.

The supporting plate 14 is located on a lower side of the insulating plate 13. The insulating plate 13 may be supported by the supporting plate 14.

The supporting plate 14 is located between the upper frame 11 and the lower frame 12.

The supporting plate 14 may allow the upper frame 11 and the lower frame 12 to be physically separated from each other. In addition, the supporting plate 14 supports the insulating plate 13.

The supporting plate 14 may be formed of a magnetic material. Accordingly, the supporting plate 14 may form a magnetic circuit together with a yoke 330 of the core part 30. A driving force allowing a movable core 32 of the core part 30 to move toward a fixed core 31 may be formed by the magnetic circuit.

A through hole (not shown) is formed in a central portion of the supporting plate 14. The shaft 44 is coupled through the through hole (not shown) to be movable in the vertical direction.

Accordingly, when the movable core 32 is moved in a direction toward or away from the fixed core 31, the shaft 44 and the movable contactor 43 connected to the shaft 44 may also be moved in the same direction.

(2) Description of Opening/Closing Part 20

The opening/closing part 20 may allow or block the flow of current according to an operation of the core part 30. Specifically, the opening/closing part 20 may allow or block the flow of current as the fixed contactor 22 and the movable contactor 43 are brought into contact with or separated from each other.

The opening/closing part 20 is accommodated in the inner space of the upper frame 11. The opening/closing part 20 may be electrically and physically separated from the core part 30 by the insulating plate 13 and the supporting plate 14.

The opening/closing part 20 includes an arc chamber 21, the fixed contactor 22, and a sealing member 23.

Further, the arc path formation unit 500, 600, or 700 may be provided outside the arc chamber 21. The arc path formation unit 500, 600, or 700 may form a magnetic field for forming an arc path A.P of an arc generated inside the arc chamber 21. A detailed description thereof will be given below.

The arc chamber 21 extinguishes an arc at an inner space thereof, wherein the arc is generated as the fixed contactor 22 and the movable contactor 43 are separated from each other. Accordingly, the arc chamber 21 may also be referred to as an “arc extinguishing part.”

The arc chamber 21 sealingly accommodates the fixed contactor 22 and the movable contactor 43. That is, the fixed contactor 22 and the movable contactor 43 are accommodated in the arc chamber 21. Accordingly, the arc generated as the fixed contactor 22 and the movable contactor 43 are separated from each other does not arbitrarily leak to the outside.

An extinguishing gas may be filled in the arc chamber 21. The extinguishing gas may extinguish the generated arc and the extinguished arc may be discharged to the outside of the direct current relay 1 through a predetermined path. To this end, a communication hole (not shown) may be formed in a wall surrounding the inner space of the arc chamber 21.

The arc chamber 21 may be formed of an insulating material. In addition, the arc chamber 21 may be formed of a material having high pressure resistance and high heat resistance. This is because the generated arc is a flow of high-temperature and high-pressure electrons. In one embodiment, the arc chamber 21 may be formed of a ceramic material.

A plurality of through holes may be formed in an upper side of the arc chamber 21. The fixed contactor 22 is coupled through each of the through holes.

In the illustrated embodiment, two fixed contactor 22 including a first fixed contactor 22*a* and a second fixed contactor 22*b* are provided. Accordingly, two through hole formed in the upper side of the arc chamber 21 may also be provided.

When the fixed contactors 22 are coupled through the through holes, the through holes are sealed. That is, the fixed contactor 22 is sealingly coupled to the through hole. Accordingly, the generated arc cannot be discharged to the outside through the through hole.

A lower side of the arc chamber 21 may be open. The lower side of the arc chamber 21 may be in contact with the insulating plate 13 and the sealing member 23. That is, the lower side of the arc chamber 21 is sealed by the insulating plate 13 and the sealing member 23.

Accordingly, the arc chamber 21 can be electrically and physically separated from an outer space of the upper frame 11.

The arc extinguished in the arc chamber 21 is discharged to the outside of the direct current relay 1 through a predetermined path. In one embodiment, the extinguished arc may be discharged to the outside of the arc chamber 21 through the communication hole (not shown).

The fixed contactor 22 may be brought into contact with or separated from the movable contactor 43, so that the inside and outside of the direct current relay 1 are electrically connected or disconnected.

Specifically, when the fixed contactor 22 is brought into contact with the movable contactor 43, the inside and outside of the direct current relay 1 may be electrically connected. On the other hand, when the fixed contactor 22 is separated from the movable contactor 43, the inside and outside of the direct current relay 1 may be electrically disconnected.

As the name implies, the fixed contactor 22 does not move. That is, the fixed contactor 22 may be fixedly coupled to the upper frame 11 and the arc chamber 21. Accordingly, the contact and separation between the fixed contactor 22 and the movable contactor 43 can be achieved by the movement of the movable contactor 43.

One end portion of the fixed contactor 22, for example, an upper end portion of the fixed contactor 22 in the illustrated embodiment, is exposed to the outside of the upper frame 11. A power supply and a load may each be electrically connected to the one end portion.

The fixed contactor 22 may be provided in plural. In the illustrated embodiment, a total of two fixed contactors 22 are provided, including the first fixed contactor 22*a* on a left side and the second fixed contactor 22*b* on a right side.

The first fixed contactor 22*a* is located to be biased to one side from a center of the movable contactor 43 in the longitudinal direction, i.e., to a left side in the illustrated embodiment. In addition, the second fixed contactor 22*b* is located to be biased to another side from the center of the movable contactor 43 in the longitudinal direction, i.e., to a right side in the illustrated embodiment.

A power supply may be electrically connected to any one of the first fixed contactor 22*a* and the second fixed contactor 22*b*. In addition, a load may be electrically connected to the other one of the first fixed contactor 22*a* and the second fixed contactor 22*b*.

The direct current relay 1 according to the embodiment of the present disclosure may form the arc path A.P regardless of a direction of the power supply or load connected to the fixed contactor 22. This can be achieved by the arc path formation units 500, 600, and 700, and a detailed description thereof will be described below.

The other end portion of the fixed contactor 22, i.e., a lower end portion of the fixed contactor 22 in the illustrated embodiment extends toward the movable contactor 43.

When the movable contactor 43 is moved in a direction toward the fixed contactor 22, i.e., upward in the illustrated embodiment, the lower end portion of the fixed contactor 22 is brought into contact with the movable contactor 43. Accordingly, the outside and inside of the direct current relay 1 can be electrically connected.

The lower end portion of the fixed contactor 22 may be located inside the arc chamber 21.

When control power is cut off, the movable contactor 43 is separated from the fixed contactor 22 by an elastic force of a return spring 36.

At this time, as the fixed contactor 22 and the movable contactor 43 are separated from each other, an arc is generated between the fixed contactor 22 and the movable contactor 43. The generated arc may be extinguished by the extinguishing gas inside the arc chamber 21, and may be discharged to the outside along a path formed by the arc path formation unit 500, 600, or 700.

The sealing member 23 may block the inner space of the arc chamber 21 from arbitrarily communicating with the inner space of the upper frame 11. The sealing member 23 seals the lower side of the arc chamber 21 together with the insulating plate 13 and the supporting plate 14.

Specifically, an upper side of the sealing member 23 is coupled to the lower side of the arc chamber 21. In addition, a radially inner side of the sealing member 23 is coupled to an outer circumference of the insulating plate 13, and a lower side of the sealing member 23 is coupled to the supporting plate 14.

Accordingly, the arc generated in the arc chamber 21 and the arc extinguished by the extinguishing gas do not arbitrarily flow out to the inner space of the upper frame 11.

Further, the sealing member 23 may be configured to block an inner space of a cylinder 37 from arbitrarily communicating with the inner space of the frame part 10.

(3) Description of Core Part 30

The core part 30 moves the movable contactor part 40 upward as control power is applied. In addition, when the application of the control power is released, the core part 30 moves the movable contactor part 40 downward again.

The core part 30 may be electrically connected to an external control power supply (not shown) to receive the control power.

The core part 30 is located below the opening/closing part 20. In addition, the core part 30 is accommodated in the lower frame 12. The core part 30 and the opening/closing part 20 may be electrically and physically separated from each other by the insulating plate 13 and the supporting plate 14.

The movable contactor part 40 is located between the core part 30 and the opening/closing part 20. The movable contactor part 40 may be moved by a driving force applied by the core part 30. Accordingly, the movable contactor 43 and the fixed contactor 22 can be brought into contact with each other so that current can flow through the direct current relay 1.

The core part 30 includes the fixed core 31, the movable core 32, the yoke 330, a bobbin 34, coils 35, the return spring 36, and the cylinder 37.

The fixed core 31 is magnetized by a magnetic field generated in the coils 35 to generate an electromagnetic attractive force. The movable core 32 is moved toward the fixed core 31 (in an upward direction in FIG. 3) by the electromagnetic attractive force.

The fixed core 31 is not moved. That is, the fixed core 31 is fixedly coupled to the supporting plate 14 and the cylinder 37.

The fixed core 31 may be provided in any form capable of being magnetized by the magnetic field so as to generate an electromagnetic force. In one embodiment, the fixed core 31 may be provided as a permanent magnet or an electromagnet.

The fixed core 31 is partially accommodated in an upper space inside the cylinder 37. In addition, an outer circumference of the fixed core 31 may come into contact with an inner circumference of the cylinder 37.

The fixed core 31 is located between the supporting plate 14 and the movable core 32.

A through hole (not shown) is formed in a central portion of the fixed core 31. The shaft 44 is coupled through the through hole (not shown) to be movable up and down.

The fixed core 31 is located to be spaced apart from the movable core 32 by a predetermined distance. Accordingly, a distance by which the movable core 32 can move toward the fixed core 31 may be limited to the predetermined distance. Accordingly, the predetermined distance may be defined as a "moving distance of the movable core 32."

One end portion of the return spring 36, i.e., an upper end portion of the return spring 36 in the illustrated embodiment may be brought into contact with a lower side of the fixed core 31. When the movable core 32 is moved upward as the fixed core 31 is magnetized, the return spring 36 is compressed and stores a restoring force.

Accordingly, when the application of the control power is released and the magnetization of the fixed core 31 is terminated, the movable core 32 may be returned to the lower side by the restoring force.

When the control power is applied, the movable core 32 is moved toward the fixed core 31 by the electromagnetic attractive force generated by the fixed core 31.

As the movable core 32 is moved, the shaft 44 coupled to the movable core 32 is moved toward the fixed core 31, i.e., upward in the illustrated embodiment. In addition, as the shaft 44 is moved, the movable contactor part 40 coupled to the shaft 44 is moved upward.

Accordingly, the fixed contactor 22 and the movable contactor 43 may be brought into contact with each other so that the direct current relay 1 can be electrically connected to the external power supply and the load.

The movable core 32 may be provided in any form capable of receiving an attractive force by an electromagnetic force. In one embodiment, the movable core 32 may be formed of a magnetic material or provided as a permanent magnet, an electromagnet, or the like.

The movable core 32 is accommodated in the cylinder 37. In addition, the movable core 32 may be moved in the cylinder 37 in the longitudinal direction of the cylinder 37, for example, in the vertical direction in the illustrated embodiment.

Specifically, the movable core 32 may be moved in a direction toward the fixed core 31 and away from the fixed core 31.

The movable core 32 is coupled to the shaft 44. The movable core 32 may be moved integrally with the shaft 44. When the movable core 32 is moved upward or downward, the shaft 44 is also moved upward or downward. Accordingly, the movable contactor 43 is also moved upward or downward.

The movable core 32 is located below the fixed core 31. The movable core 32 is spaced apart from the fixed core 31 by a predetermined distance. As described above, the predetermined distance is a distance by which the movable core 32 can be moved in the vertical direction.

The movable core 32 is formed to extend in the longitudinal direction. A hollow portion extending in the longitudinal direction is formed to be recessed in the movable core 32 by a predetermined distance. The return spring 36 and the lower side of the shaft 44 coupled through the return spring 36 are partially accommodated in the hollow portion.

A through hole may be formed through a lower side of the hollow portion in the longitudinal direction. The hollow portion and the through hole communicate with each other. A lower end portion of the shaft 44 inserted into the hollow portion may proceed toward the through hole.

A space portion is formed to be recessed in a lower end portion of the movable core 32 by a predetermined distance. The space portion communicates with the through hole. A lower head portion of the shaft 44 is located in the space portion.

The yoke 330 forms a magnetic circuit as control power is applied. The magnetic circuit formed by the yoke 330 may be configured to control a direction of a magnetic field formed by the coils 35.

Accordingly, when the control power is applied, the coils 35 may form a magnetic field in a direction in which the movable core 32 is moved toward the fixed core 31. The yoke 330 may be formed of a conductive material capable of allowing electrical connection.

The yoke 330 is accommodated in the lower frame 12. The yoke 330 surrounds the coils 35. The coils 35 may be accommodated in the yoke 330 so as to be spaced apart from an inner circumferential surface of the yoke 330 by a predetermined distance.

The bobbin 34 is accommodated in the yoke 330. That is, the yoke 330, the coils 35, and the bobbin 34 on which the coils 35 are wound may be sequentially disposed in a direction from an outer circumference of the lower frame 12 toward a radially inner side of the lower frame 12.

An upper side of the yoke 330 may come into contact with the supporting plate 14. In addition, the outer circumference of the yoke 330 may come into contact with an inner circumference of the lower frame 12 or may be located to be spaced apart from the inner circumference of the lower frame 12 by a predetermined distance.

The coils 35 are wound around the bobbin 34. The bobbin 34 is accommodated in the yoke 330.

The bobbin 34 may include upper and lower portions formed in a flat plate shape, and a cylindrical column portion formed to extend in the longitudinal direction to connect the upper and lower portions. That is, the bobbin 34 has a bobbin shape.

The upper portion of the bobbin 34 comes into contact with a lower side of the supporting plate 14. The coils 35 are wound around the column portion of the bobbin 34. A wound thickness of the coils 35 may be configured to be equal to or smaller than a diameter of each of the upper and lower portions of the bobbin 34.

A hollow portion is formed through the column portion of the bobbin 34 extending in the longitudinal direction. The cylinder 37 may be accommodated in the hollow portion. The column portion of the bobbin 34 may be disposed to have the same central axis as the fixed core 31, the movable core 32, and the shaft 44.

The coils 35 generate a magnetic field due to the applied control power. The fixed core 31 may be magnetized by the magnetic field generated by the coils 35 and thus an electromagnetic attractive force may be applied to the movable core 32.

The coils 35 are wound around the bobbin 34. Specifically, the coils 35 are wound around the column portion of the bobbin 34 and stacked on a radial outer side of the column portion. The coils 35 are accommodated in the yoke 330.

When control power is applied, the coils 35 generate a magnetic field. In this case, a strength or direction of the magnetic field generated by the coils 35 may be controlled by the yoke 330. The fixed core 31 is magnetized by the magnetic field generated by the coils 35.

When the fixed core 31 is magnetized, the movable core 32 receives an electromagnetic force, i.e., an attractive force in a direction toward the fixed core 31. Accordingly, the movable core 32 is moved in a direction toward the fixed core 31, i.e., upward in the illustrated embodiment.

The return spring 36 provides a restoring force for the movable core 32 to return to its original location when the application of the control power is released after the movable core 32 is moved toward the fixed core 31.

As the movable core 32 is moved toward the fixed core 31, the return spring 36 stores the restoring force while being compressed. At this time, the stored restoring force may preferably be smaller than the electromagnetic attractive force, which is exerted on the movable core 32 as the fixed core 31 is magnetized. This is to prevent the movable core 32 from being arbitrarily returned to its original location by the return spring 36 while the control power is applied.

When the application of the control power is released, the movable core 32 receives only the restoring force by the return spring 36. Of course, gravity due to an empty weight of the movable core 32 may also be applied to the movable core 32. Accordingly, the movable core 32 can be moved in a direction away from the fixed core 31 to be returned to the original location.

The return spring 36 may be provided in any form that is deformed to store the restoring force and returned to its original state to transmit the restoring force to the outside. In one embodiment, the return spring 36 may be provided as a coil spring.

The shaft 44 is coupled through the return spring 36. The shaft 44 may move in the vertical direction regardless of the deformation of the return spring 36 in the coupled state with the return spring 36.

The return spring 36 is accommodated in the hollow portion formed to be recessed in an upper side of the movable core 32. In addition, one end portion of the return spring 36 facing the fixed core 31, i.e., an upper end portion of the return spring 36 in the illustrated embodiment is accommodated in a hollow portion formed to be recessed in the lower side of the fixed core 31.

The cylinder 37 accommodates the fixed core 31, the movable core 32, the return spring 36, and the shaft 44. The movable core 32 and the shaft 44 may be moved in the upward and downward directions in the cylinder 37.

The cylinder 37 is located in the hollow portion formed in the column portion of the bobbin 34. An upper end portion of the cylinder 37 comes into contact with a lower side surface of the supporting plate 14.

A side surface of the cylinder 37 comes into contact with an inner circumferential surface of the column portion of the bobbin 34. An upper opening of the cylinder 37 may be sealed by the fixed core 31. A lower side surface of the cylinder 37 may come into contact with an inner surface of the lower frame 12.

(4) Description of Movable Contactor Part 40

The movable contactor part 40 includes the movable contactor 43 and components for moving the movable contactor 43. The direct current relay 1 may be electrically connected to an external power supply or a load by the movable contactor part 40.

The movable contactor part 40 is accommodated in the inner space of the upper frame 11. In addition, the movable contactor part 40 is accommodated in the arc chamber 21 to be movable up and down.

The fixed contactor 22 is located above the movable contactor part 40. The movable contactor part 40 is accommodated in the arc chamber 21 to be movable in a direction toward the fixed contactor 22 and a direction away from the fixed contactor 22.

The core part 30 is located below the movable contactor part 40. The movement of the movable contactor part 40 can be achieved by the movement of the movable core 32.

The movable contactor part 40 includes a housing 41, a cover 42, the movable contactor 43, the shaft 44, and an elastic portion 45.

The housing 41 accommodates the movable contactor 43 and the elastic portion 45 elastically supporting the movable contactor 43.

In the illustrated embodiment, the housing 41 is formed such that one side and another side opposite to the one side are open. The movable contactor 43 may be inserted through the open portions.

Unopened side surfaces of the housing 41 may be configured to surround the accommodated movable contactor 43.

The cover 42 is provided on an upper side of the housing 41. The cover 42 covers an upper surface of the movable contactor 43 accommodated in the housing 41.

The housing 41 and the cover 42 may preferably be formed of an insulating material to prevent unexpected electrical connection. In one embodiment, the housing 41 and the cover 42 may be formed of a synthetic resin or the like.

A lower side of the housing 41 is connected to the shaft 44. When the movable core 32 connected to the shaft 44 is moved upward or downward, the housing 41 and the movable contactor 43 accommodated in the housing 41 may also be moved upward or downward.

The housing 41 and the cover 42 may be coupled by arbitrary members. In one embodiment, the housing 41 and the cover 42 may be coupled by coupling members (not shown) such as a bolt and a nut.

The movable contactor 43 comes into contact with the fixed contactor 22 as control power is applied, so that the direct current relay 1 can be electrically connected to an external power supply and a load. In addition, when the application of the control power is released, the movable contactor 43 is separated from the fixed contactor 22, and thus the direct current relay 1 is electrically disconnected from the external power supply and the load.

The movable contactor 43 is located adjacent to the fixed contactor 22.

An upper side of the movable contactor 43 is partially covered by the cover 42. In one embodiment, a portion of the upper surface of the movable contactor 43 may be brought into contact with a lower side surface of the cover 42.

A lower side of the movable contactor 43 is elastically supported by the elastic portion 45. In order to prevent the movable contactor 43 from being arbitrarily moved downward, the elastic portion 45 may elastically support the movable contactor 43 in a compressed state by a predetermined distance.

The movable contactor 43 is formed to extend in the longitudinal direction, i.e., in a left-right direction in the illustrated embodiment. That is, a length of the movable contactor 43 is formed to be longer than a width thereof. Accordingly, both end portions of the movable contactor 43 in the longitudinal direction, which are accommodated in the housing 41, are exposed to the outside of the housing 41.

Contact protrusions may be formed to protrude upward from the both end portions by predetermined distances. The fixed contactor 22 is in contact with the contact protrusions.

The contact protrusions may be formed at locations corresponding to the fixed contactors 220*a* and 220*b*, respectively. Accordingly, the moving distance of the movable contactor 43 can be reduced and contact reliability between the fixed contactor 22 and the movable contactor 43 can be improved.

The width of the movable contactor 43 may be the same as a spaced distance between the side surfaces of the housing 41. That is, when the movable contactor 43 is accommodated in the housing 41, both side surfaces of the movable contactor 43 in a width direction may be brought into contact with inner surfaces of the side surfaces of the housing 41.

Accordingly, the state in which the movable contactor 43 is accommodated in the housing 41 can be stably maintained.

The shaft 44 transmits a driving force, which is generated in response to the operation of the core part 30, to the movable contactor part 40. Specifically, the shaft 44 is connected to the movable core 32 and the movable contactor 43. When the movable core 32 is moved upward or downward, the movable contactor 43 may also be moved upward or downward by the shaft 44.

The shaft 44 is formed to extend in the longitudinal direction, i.e., in the vertical direction in the illustrated embodiment.

The lower end portion of the shaft 44 is inserted into and coupled to the movable core 32. When the movable core 32 is moved in the vertical direction, the shaft 44 may also be moved in the vertical direction together with the movable core 32.

A body portion of the shaft 44 is coupled through the fixed core 31 to be movable up and down. The return spring 36 is coupled through the body portion of the shaft 44.

An upper end portion of the shaft 44 is coupled to the housing 41. When the movable core 32 is moved, the shaft 44 and the housing 41 may also be moved together with the movable core 32.

The upper and lower end portions of the shaft 44 may be formed to have a larger diameter than the body portion of the shaft. Accordingly, the coupled state of the shaft 44 to the housing 41 and the movable core 32 can be stably maintained.

The elastic portion 45 elastically supports the movable contactor 43. When the movable contactor 43 is brought into contact with the fixed contactor 22, the movable contactor 43 may tend to be separated from the fixed contactor 22 due to an electromagnetic repulsive force.

At this time, the elastic portion 45 elastically supports the movable contactor 43 to prevent the movable contactor 43 from being arbitrarily separated from the fixed contactor 22.

The elastic portion 45 may be provided in any form capable of storing a restoring force by being deformed and providing the stored restoring force to another member. In one embodiment, the elastic portion 45 may be provided as a coil spring.

One end portion of the elastic portion 45 facing the movable contactor 43 comes into contact with the lower side of the movable contactor 43. In addition, the other end portion opposite to the one end portion comes into contact with the upper side of the housing 41.

The elastic portion 45 may elastically support the movable contactor 43 in a state of storing the restoring force by being compressed by a predetermined distance. Accordingly, even when the electromagnetic repulsive force is generated between the movable contactor 43 and the fixed contactor 22, the movable contactor 43 is not arbitrarily moved.

A protrusion (not shown) inserted into the elastic portion 45 may be formed to protrude from the lower side of the movable contactor 43 to enable stable coupling of the elastic portion 45. Similarly, a protrusion (not shown) inserted into the elastic portion 45 may also be formed to protrude from the upper side of the housing 41.

3. Description of Arc Path Formation Units 100, 200, and 300 According to Embodiment of Present Disclosure Referring to FIGS. 5 to 18, the arc path formation units 100, 200, and 300 according to various embodiments of the present disclosure are illustrated. Each of the arc path formation units 100, 200, and 300 forms magnetic fields inside the arc chamber 21. The magnetic field formed by each of the arc path formation units 100, 200, and 300 according to the embodiment of the present disclosure is illustrated as a one-dot chain line in each drawing. Due to current flowing through the direct current relay 1 and the formed magnetic field, an electromagnetic force is formed in the arc chamber 21.

An arc generated as the fixed contactor 22 and the movable contactor 43 are separated from each other is moved to the outside of the arc chamber 21 by the formed electromagnetic force. Specifically, the generated arc is moved in a direction of the formed electromagnetic force. Accordingly, it can be said that each of the arc path formation units 100, 200, and 300 forms an arc path A.P, which is a path through which the generated arc flows.

Each of the arc path formation units 100, 200, and 300 is located in a space formed in the upper frame 11. The arc path formation unit 100, 200, or 300 is disposed to surround the arc chamber 21. In other words, the arc chamber 21 is located inside the arc path formation unit 100, 200, or 300.

The fixed contactor 22 and the movable contactor 43 are located inside the arc path formation unit 100, 200, or 300. The arc generated as the fixed contactor 22 and the movable contactor 43 are separated from each other may be induced by an electromagnetic force formed by the arc path formation unit 100, 200, or 300.

Each of the arc path formation units 100, 200, and 300 according to various embodiments of the present disclosure includes magnet parts. The magnet parts form magnetic fields inside the arc path formation unit 100 in which the fixed contactor 22 and the movable contactor 43 are accommodated. At this time, the magnetic field may be formed by the magnet part itself, or the magnetic fields may also be formed by between the magnet parts.

The magnetic fields formed by the magnet part form an electromagnetic force together with current flowing through the fixed contactor 22 and the movable contactor 43. The formed electromagnetic force induces an arc that is generated when the fixed contactor 22 and the movable contactor 43 are separated from each other.

In this case, the arc path formation units 100, 200, and 300 form the electromagnetic force in a direction away from the central portions C of the space portions 115, 215, and 315, respectively. Accordingly, an arc path A.P is also formed in the direction away from a central portion C of the space portion.

As a result, each constituent element provided in the direct current relay 1 is not damaged by the generated arc. Furthermore, the generated arc may be quickly discharged to the outside of the arc chamber 21.

Hereinafter, the configuration of each of the arc path formation units 100, 200, and 300 and the arc path A.P formed by each of the arc path formation units 100, 200, and 300 will be described in detail with reference to the accompanying drawings.

Each of the arc path formation units 100, 200, and 300 according to various embodiments described below may include the magnet part having a polarity in a width direction, which is located on a left side or right side of the magnet part.

Further, the arc path formation unit 100, 200, or 300 may include the magnet part having a polarity in a longitudinal direction, which is located on at least one side of a front side and a rear side of the magnet part.

As will be described below, the rear side may be defined as a direction adjacent to a first surface 111, 211, or 311, and the front side may be defined as a direction adjacent to a second surface 112, 212, or 312.

Further, the left side may be defined as a direction adjacent to a third surface 113, 213, or 313, and the right side may be defined as a direction adjacent to a fourth surface 114, 214, or 314.

Each of the arc path formation units 100, 200, and 300 according to various embodiments of the present disclosure includes a plurality of magnet parts. The plurality of magnet parts form magnetic fields inside the arc path formation unit 100, 200, or 300 in which the fixed contactor 22 and the movable contactor 43 are accommodated. At this time, the magnetic field may be formed by the magnet part itself, or the magnetic fields may also be formed by between the plurality of magnet parts.

The magnetic fields formed by the plurality of magnet parts form an electromagnetic force together with current flowing through the fixed contactor 22 and the movable contactor 43. The formed electromagnetic force induces an arc that is generated when the fixed contactor 22 and the movable contactor 43 are separated from each other.

In this case, the arc path formation units 100, 200, and 300 form the electromagnetic force in a direction away from the central portions C of the space portions 115, 215, and 315, respectively. Accordingly, the arc path A.P is also formed in the direction away from the central portion C of the space portion 115, 215, or 315.

As a result, each constituent element provided in the direct current relay 1 is not damaged by the generated arc. Furthermore, the generated arc may be quickly discharged to the outside of the arc chamber 21.

(1) Description of Arc Path Formation Unit 100 According to First Embodiment of Present Disclosure Hereinafter, an arc path formation unit according to a first embodiment of the present disclosure will be described in detail, with reference to FIGS. 5 and 6.

Figure 5:
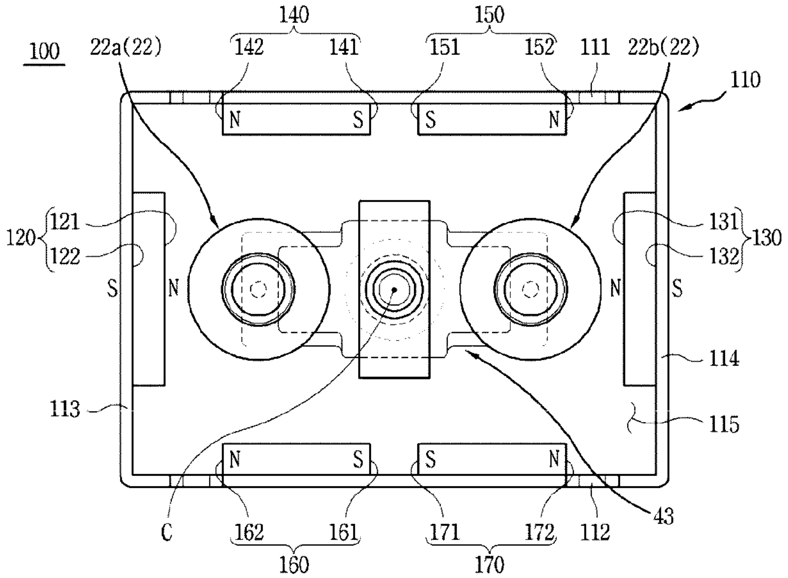
FIG. 5 is a conceptual view illustrating an arc path formation unit according to a first embodiment of the present disclosure.
Figure 5:
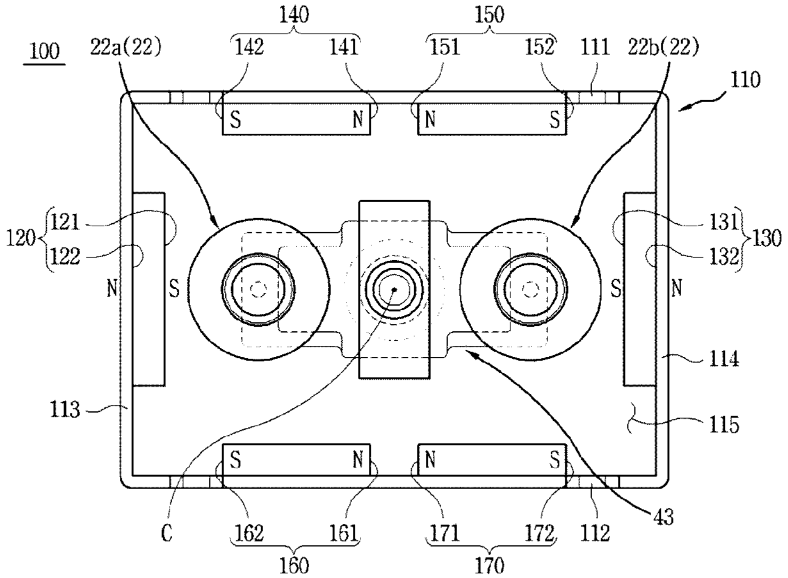

Referring to FIG. 5, an arc path formation unit 100 according to the illustrated embodiment includes a magnet frame 110, a first magnet part 120, a second magnet part 130, a third magnet part 140, a fourth magnet part 150, a fifth magnet part 160, and a sixth magnet part 170.

The magnet frame 110 forms a frame of the arc path formation unit 100. The first to sixth magnet parts 120, 130, 140, 150, 160, and 170 are disposed in the magnet frame 110. In one embodiment, the first to sixth magnet parts 120, 130, 140, 150, 160, and 170 may be coupled to the magnet frame 110.

The magnet frame 110 has a rectangular cross section formed to extend in the longitudinal direction, i.e., in the left-right direction in the illustrated embodiment. The shape of the magnet frame 110 may be changed depending on shapes of the upper frame 11 and the arc chamber 21.

The magnet frame 110 includes a first surface 111, a second surface 112, a third surface 113, a fourth surface 114, and a space portion 115.

The first surface 111, the second surface 112, the third surface 113, and the fourth surface 114 form an outer circumferential surface of the magnet frame 110. That is, the first surface 111, the second surface 112, the third surface 113, and the fourth surface 114 may serve as walls of the magnet frame 110.

An outer side of each of the first surface 111, the second surface 112, the third surface 113, and the fourth surface 114 may be in contact with or fixedly coupled to an inner surface of the upper frame 11. In addition, the first to sixth magnet parts 120, 130, 140, 150, 160, and 170 may be located on inner sides of the first surface 111, the second surface 112, the third surface 113, and the fourth surface 114.

In the illustrated embodiment, the first surface 111 forms a rear side surface. The second surface 112 forms a front side surface and faces the first surface 111. In addition, the third surface 113 forms a left side surface. The fourth surface 114 forms a right side surface and faces the third surface 113.

That is, the first surface 111 and the second surface 112 face each other with the space portion 115 therebetween. In addition, the third surface 113 and the fourth surface 114 face each other with the space portion 115 therebetween.

The first surface 111 is continuous with the third surface 113 and the fourth surface 114. The first surface 111 may be coupled to the third surface 113 and the fourth surface 114 at predetermined angles. In one embodiment, the predetermined angle may be a right angle.

The second surface 112 is continuous with the third surface 113 and the fourth surface 114. The second surface 112 may be coupled to the third surface 113 and the fourth surface 114 at predetermined angles. In one embodiment, the predetermined angle may be a right angle.

Each of corners at which the first to fourth surfaces 111 to 114 are connected to each other may be chamfered.

In one embodiment, the first to sixth magnet parts 120, 130, 140, 150, 160, and 170 may be coupled to the respective surfaces 111, 112, 113, and 114. Coupling members (not shown) may be provided to couple the first to sixth magnet parts 120, 130, 140, 150, 160, and 170 to the respective surfaces 111, 112, 113, and 114.

Although not shown in the drawings, an arc discharge hole (not shown) may be formed through one or more of the first surface 111, the second surface 112, the third surface 113, and the fourth surface 114. The arc discharge hole (not shown) may serve as a path through which an arc generated in the space portion 115 is discharged.

A space surrounded by the first to fourth surfaces 111 to 114 may be defined as the space portion 115.

The fixed contactor 22 and the movable contactor 43 are accommodated in the space portion 115. In addition, the arc chamber 21 is accommodated in the space portion 115.

In the space portion 115, the movable contactor 43 may be moved in a direction toward the fixed contactor 22 (i.e., the downward direction) or a direction away from the fixed contactor 22 (i.e., the upward direction).

In addition, an arc path A.P of an arc generated in the arc chamber 21 is formed in the space portion 115. This is achieved by the magnetic fields formed by the first to sixth magnet parts 120, 130, 140, 150, 160, and 170.

A central portion of the space portion 115 may be defined as the central portion C. A straight line distance from each of corners at which the first to fourth surfaces 111 to 114 are connected to each other to the central portion C may be formed to be equal to each other.

The central portion C may be located between the first fixed contactor 22*a* and the second fixed contactor 22*b*. In addition, a central portion of the movable contactor part 40 is located vertically below the central portion C. That is, a central portion of each of the housing 41, the cover 42, the movable contactor 43, the shaft 44, the elastic portion 45, and the like is located vertically below the central portion C.

Accordingly, when the generated arc is moved toward the central portion C, the above components may be damaged. In order to prevent this, the arc path formation unit 100 according to the present embodiment includes the first to sixth magnet parts 120, 130, 140, 150, 160, and 170.

The first to sixth magnet parts 120, 130, 140, 150, 160, and 170 may be each provided in any form capable of forming magnetic fields inside the space portion 115 by being magnetized. The first to sixth magnet parts 120, 130, 140, 150, 160, and 170 may be located adjacent to the respective first to fourth surfaces 111 to 114.

In the illustrated embodiment, the first magnet part 120 is located adjacent to the third surface 113. The second magnet part 130 is located adjacent to the fourth surface 114. The first magnet part 120 and the second magnet part 130 are disposed to face each other with the space portion 115 therebetween.

Further, in the illustrated embodiment, the third magnet part 140 and the fourth magnet part 150 are located adjacent to the first surface 111. The third magnet part 140 is located to be biased to the third surface 113. The fourth magnet part 150 is located to be biased to the fourth surface 114.

The third magnet part 140 and the fourth magnet part 150 are disposed in parallel to each other in an extending direction thereof. In one embodiment, the third magnet part 140 and the fourth magnet part 150 may be in contact with each other.

The fifth magnet part 160 and the sixth magnet part 170 are located on the second surface 112. The fifth magnet part 160 is located to be biased to the third surface 113. The sixth magnet part 170 is located to be biased to the fourth surface 114.

The fifth magnet part 160 and the sixth magnet part 170 are disposed in parallel to each other in an extending direction thereof. In one embodiment, the fifth magnet part 160 and the sixth magnet part 170 may be in contact with each other.

The third magnet part 140 and the fifth magnet part 160 are disposed to face each other with the space portion 115 or the first fixed contactor 22*a* therebetween. The third magnet part 140, the first fixed contactor 22*a*, and the fifth magnet part 160 may be disposed to overlap in a front-rear direction.

The fourth magnet part 150 and the sixth magnet part 170 are disposed to face each other with the space portion 115 or the second fixed contactor 22*b* therebetween. The fourth magnet part 150, the second fixed contactor 22*b*, and the sixth magnet part 170 may be disposed to overlap in the front-rear direction.

The first magnet part 120 and the second magnet part 130 are formed to extend in one direction. In the illustrated embodiment, the first magnet part 120 and the second magnet part 130 are formed to extend in the front-rear direction.

The third to sixth magnet parts 140, 150, 160, and 170 are formed to extend in the other direction. In the illustrated embodiment, the third to sixth magnet parts 140, 150, 160, and 170 are formed to extend in a left-right direction.

Each of the first to sixth magnet parts 120, 130, 140, 150, 160, and 170 includes a plurality of surfaces.

Specifically, the first magnet part 120 includes a first facing surface 121 facing the space portion 115 or the fixed contactor 22 and a first opposing surface 122 opposite to the space portion 115 or the fixed contactor 22.

The second magnet part 130 includes a second facing surface 131 facing the space portion 115 or the fixed contactor 22 and a second opposing surface 132 opposite to the space portion 115 or the fixed contactor 22.

The third magnet part 140 includes a third facing surface 141 facing the fourth magnet part 150 and a third opposing surface 142 opposite to the fourth magnet part 150.

The fourth magnet part 150 includes a fourth facing surface 151 facing the third magnet part 140 and a fourth opposing surface 152 opposite to the third magnet part 140.

The fifth magnet part 160 includes a fifth facing surface 161 facing the sixth magnet part 170 and a fifth opposing surface 162 opposite to the sixth magnet part 170.

The sixth magnet part 170 includes a sixth facing surface 171 facing the fifth magnet part 160 and a sixth opposing surface 172 opposite to the fifth magnet part 160.

Each surface of the first to sixth magnet parts 120, 130, 140, 150, 160, and 170 may be magnetized according to a predetermined rule.

Specifically, the first and second facing surfaces 121 and 131 and the third to sixth opposing surfaces 142, 152, 162, and 172 are magnetized to the same polarity.

Similarly, the first and second opposing surfaces 122 and 132 and the third to sixth facing surfaces 141, 151, 161, and 171 are magnetized to the same polarity.

Hereinafter, the arc path A.P formed by the arc path formation unit 100 according to the present embodiment will be described in detail with reference to FIG. 6.

Figure 6:
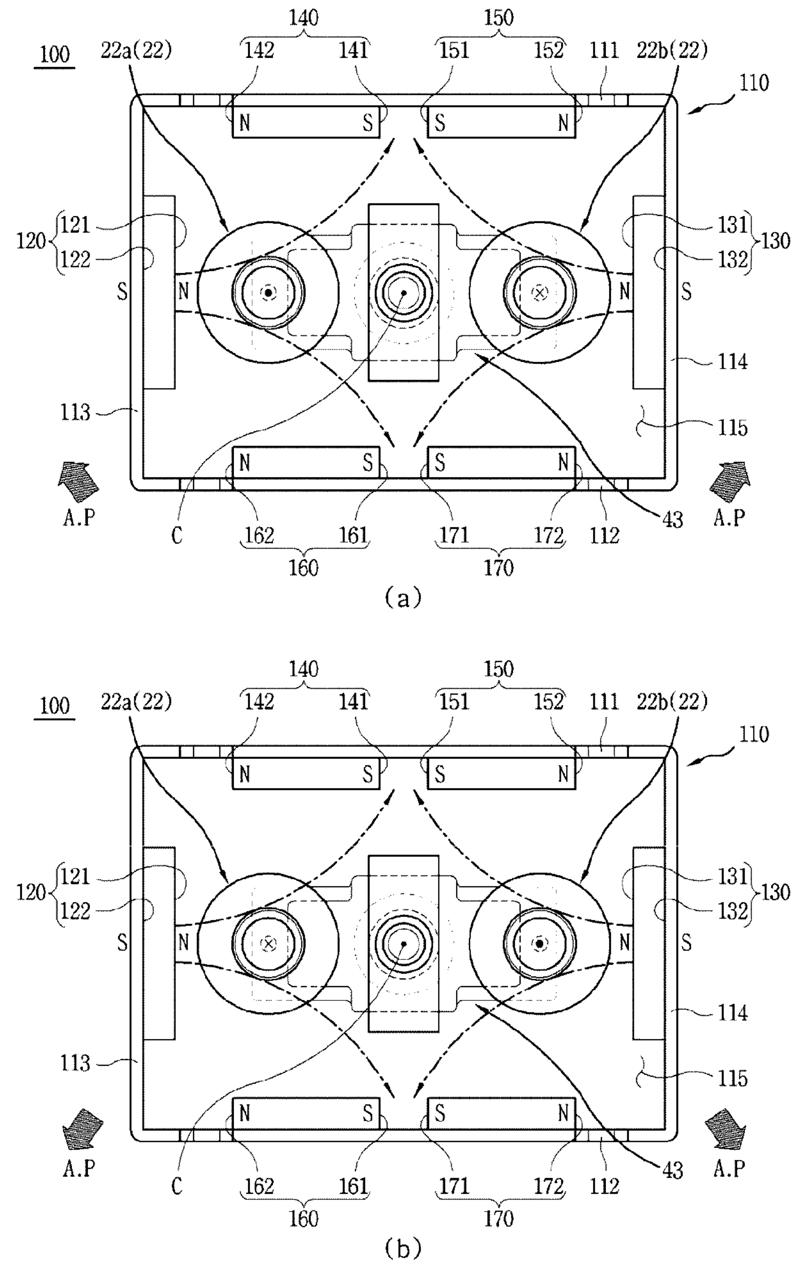
FIG. 6 is a conceptual view illustrating magnetic field and arc paths formed by the arc path formation unit according to the embodiment of FIG. 5.

Referring to FIG. 6, the first and second facing surfaces 121 and 131 and the third to sixth opposing surfaces 142, 152, 162, and 172 are magnetized to N poles. In addition, according to the predetermined rule, the first and second opposing surfaces 122 and 132 and the third to sixth facing surfaces 141, 151, 161, and 171 are magnetized to S poles.

Accordingly, magnetic fields that repel each other are formed between the first magnet part 120 and the second magnet part 130.

Further, a magnetic field in a direction toward the third and fourth facing surfaces 141 and 151 from the first facing surface 121 is formed between the first magnet part 120 and the third and fourth magnet parts 140 and 150.

A magnetic field in a direction toward the fifth and sixth facing surfaces 161 and 171 from the first facing surface 121 is formed between the first magnet part 120 and the fifth and sixth magnet parts 160 and 170.

Further, a magnetic field in a direction toward the third and fourth facing surfaces 141 and 151 from the second facing surface 131 is formed between the second magnet part 130 and the third and fourth magnet parts 140 and 150.

A magnetic field in a direction toward the fifth and sixth facing surfaces 161 and 171 from the second facing surface 131 is formed between the second magnet part 130 and the fifth and sixth magnet parts 160 and 170.

In the embodiment illustrated in FIG. 6A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward a rear left side. Accordingly, an arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, an arc path A.P in the vicinity of the second fixed contactor 22*b* is also formed toward the rear right side.

In the embodiment illustrated in FIG. 6B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the front left side. Accordingly, an arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, an arc path A.P in the vicinity of the second fixed contactor 22*b* is also formed toward the front right side.

Although not shown in the drawings, when the polarity of each surface of the first to sixth magnet parts 120, 130, 140, 150, 160, and 170 is changed, the direction of the magnetic field formed in the first to sixth magnet parts 120, 130, 140, 150, 160, and 170 is reversed. Accordingly, the generated electromagnetic force and the arc path A.P are also formed so that the front-rear direction thereof is reversed.

That is, in the electric connection situation shown in FIG. 6A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIG. 6B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path formation unit 100 according to the present embodiment, the electromagnetic force and the arc path A.P may be formed in a direction away from the central portion C regardless of the polarity of each of the first to sixth magnet parts 120, 130, 140, 150, 160, and 170 or the direction of the current flowing through the direct current relay 1.

Accordingly, damage to each constituent element of the direct current relay 1 disposed adjacent to the central portion C can be prevented. Furthermore, since the generated arc can be quickly discharged to the outside, operational reliability of the direct current relay 1 can be improved.

(2) Description of Arc Path Formation Unit 200 According to Second Embodiment of Present Disclosure Hereinafter, an arc path formation unit 200 according to second embodiment of the present disclosure will be described in detail with reference to FIGS. 7 to 10.

Figure 7:
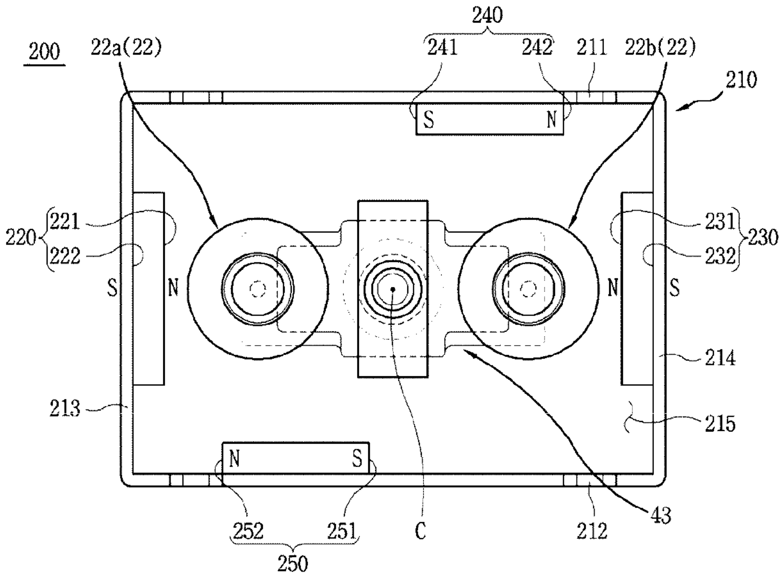
FIGS. 7 and 8 are conceptual views illustrating an arc path formation unit according to a second embodiment of the present disclosure.
Figure 7:
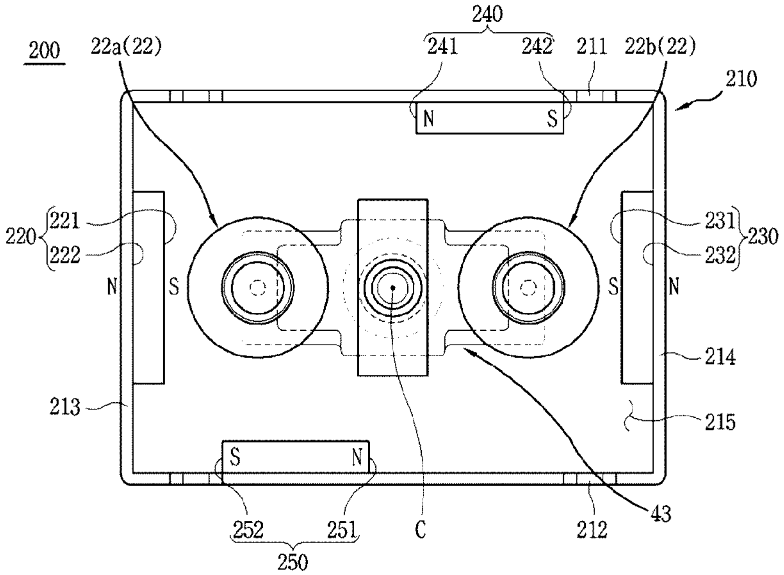
Figure 8:
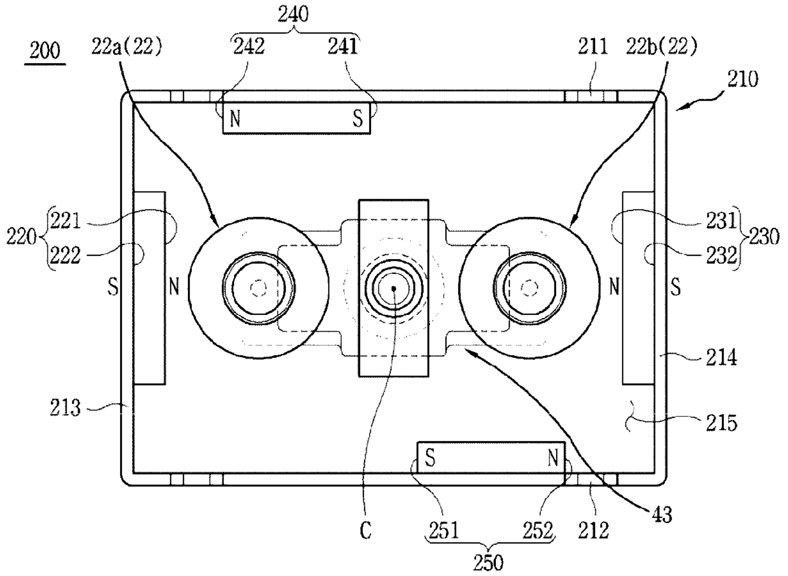
Figure 8:
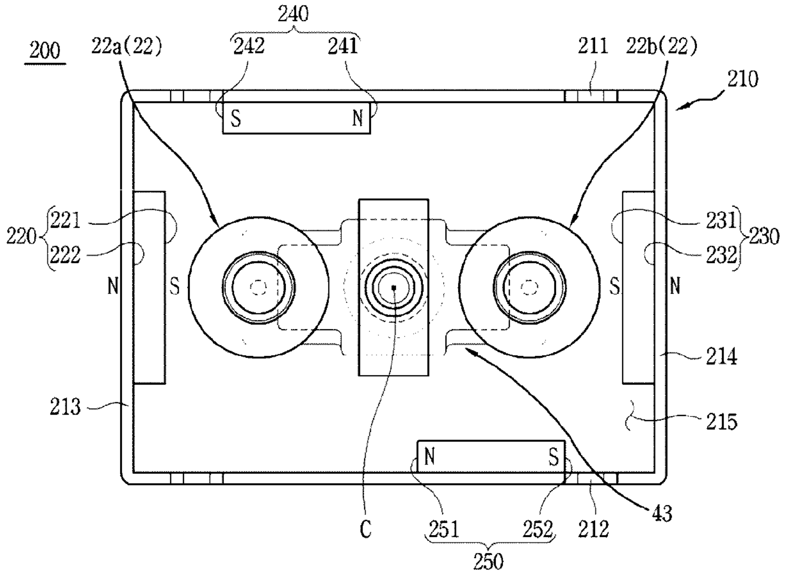

Referring to FIGS. 7 and 8, the arc path formation unit 200 according to the illustrated embodiment includes a magnet frame 210, a first magnet part 220, a second magnet part 230, a third magnet part 240, and a fourth magnet part 250.

The magnet frame 210 according to the present embodiment has the same structure and function as the magnet frame 110 according to the above-described embodiment. However, there is a difference in the arrangement method of the first to fourth magnet parts 220, 230, 240, and 250 disposed in the magnet frame 210 according to the present embodiment.

Accordingly, a description of the magnet frame 210 will be replaced with the description of the magnet frame 110 according to the above-described embodiment.

The first to fourth magnet parts 220, 230, 240, and 250 may each be provided in any form capable of forming a magnetic field by being magnetized. The first to fourth magnet parts 220, 230, 240, and 250 may be located adjacent to first to fourth surfaces 211 to 214, respectively.

In the illustrated embodiment, the first magnet part 220 is located adjacent to the third surface 213. The second magnet part 230 is located adjacent to the fourth surface 214. The first magnet part 220 and the second magnet part 230 are disposed to face each other with a space portion 215 therebetween.

In the illustrated embodiment, the third magnet part 240 is located adjacent to the first surface 211. The third magnet part 240 is located to be biased to any one surface of the third surface 213 and the fourth surface 214. The third magnet part 240 is disposed to overlap any one of the first fixed contactor 22*a* and the second fixed contactor 22*b* in the front-rear direction.

In the embodiment illustrated in FIG. 7, the third magnet part 240 is located to be biased to the fourth surface 214. In the embodiment, the third magnet part 240 overlaps the second fixed contactor 22*b* in the front-rear direction.

Further, in the embodiment illustrated in FIG. 8, the third magnet part 240 is located adjacent to the third surface 213. In the embodiment, the third magnet part 240 overlaps the first fixed contactor 22*a* in the front-rear direction.

In the illustrated embodiment, the fourth magnet part 250 is located adjacent to the second surface 212. The fourth magnet part 250 is located to be biased to the other surface of the third surface 213 and the fourth surface 214. The fourth magnet part 250 is disposed to overlap the other one of the first fixed contactor 22*a* and the second fixed contactor 22*b* in the front-rear direction.

In the embodiment illustrated in FIG. 7, the fourth magnet part 250 is located to be biased to the third surface 213. In the embodiment, the fourth magnet part 250 overlaps the first fixed contactor 22*a* in the front-rear direction.

Further, in the embodiment illustrated in FIG. 8, the fourth magnet part 250 is located to be biased to the fourth surface 214. In the embodiment, the fourth magnet part 250 overlaps the second fixed contactor 22*b* in the front-rear direction.

The first magnet part 220 and the second magnet part 230 are formed to extend in one direction. In the illustrated embodiment, the first magnet part 220 and the second magnet part 230 are formed to extend in the front-rear direction.

The third magnet part 240 and the fourth magnet part 250 are formed to extend in the other direction. In the illustrated embodiment, the third magnet part 240 and the fourth magnet part 250 are formed to extend in the left-right direction.

Each of the first to fourth magnet parts 220, 230, 240, and 250 includes a plurality of surfaces.

Specifically, the first magnet part 220 includes a first facing surface 221 facing the space portion 215 or the fixed contactor 22 and a first opposing surface 222 opposite to the space portion 215 or the fixed contactor 22.

The second magnet part 230 includes a second facing surface 231 facing the space portion 215 or the fixed contactor 22 and a second opposing surface 232 opposite to the space portion 215 or the fixed contactor 22.

The third magnet part 240 includes a third facing surface 241 opposite to the any one surface to which the third magnet part 240 is located to be biased and a third opposing surface 242 facing the any one surface.

The fourth magnet part 250 includes a fourth facing surface 251 opposite to the other surface to which the fourth magnet part 250 is located to be biased and a fourth opposing surface 252 facing the other surface.

Each surface of the first to fourth magnet parts 220, 230, 240, and 250 may be magnetized according to a predetermined rule.

Specifically, the first and second facing surfaces 221 and 231 and the third and fourth opposing surfaces 242 and 252 are magnetized to the same polarity.

Similarly, the first and second opposing surfaces 222 and 232 and the third and fourth facing surfaces 241 and 251 are magnetized to the same polarity.

Hereinafter, an arc path A.P formed by the arc path formation unit 200 according to the present embodiment will be described in detail with reference to FIGS. 9 and 10.

Figure 9:
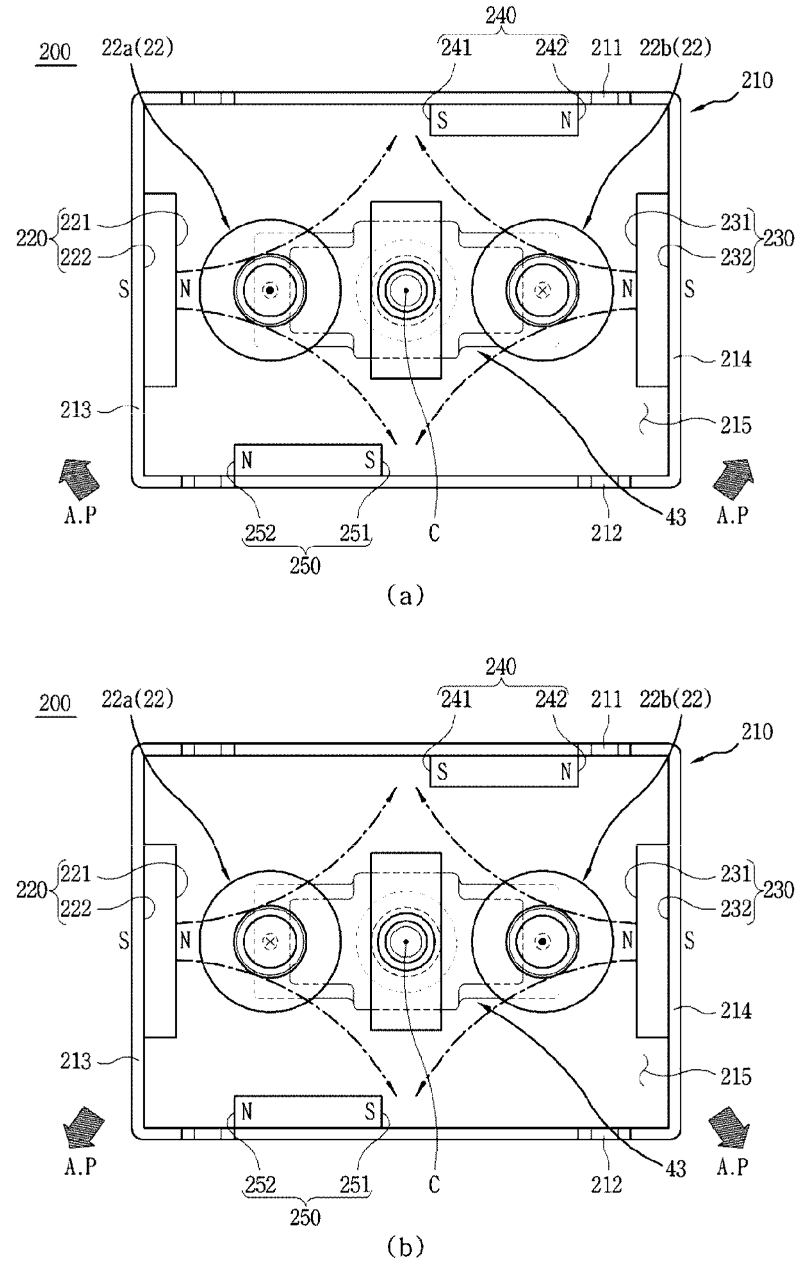
FIGS. 9 and 10 are conceptual views illustrating magnetic field and arc paths formed by the arc path formation unit according to the embodiment of FIGS. 7 and 8.
Figure 10:
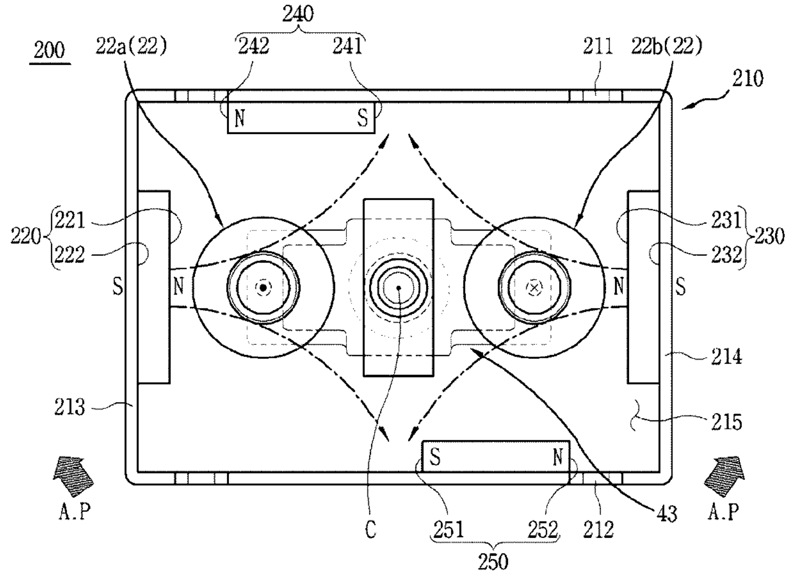
Figure 10:
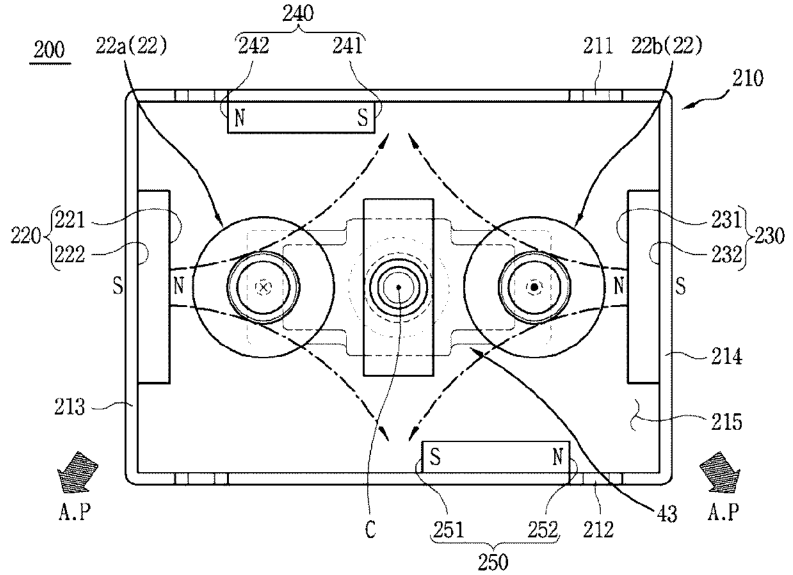

Referring to FIGS. 9 and 10, the first and second facing surfaces 221 and 231 and the third and fourth opposing surfaces 242 and 252 are magnetized to N poles. In addition, according to the predetermined rule, the first and second opposing surfaces 222 and 232 and the third and fourth facing surfaces 241 and 251 are magnetized to S poles.

Accordingly, magnetic fields that repel each other are formed between the first magnet part 220 and the second magnet part 230.

A magnetic field in a direction toward the third and fourth facing surfaces 241 and 251 from the first facing surface 221 is formed between the first magnet part 220 and the third and fourth magnet parts 240 and 250.

Further, a magnetic field in a direction toward the third and fourth facing surfaces 241 and 251 from the second facing surface 231 is formed between the second magnet part 230 and the third and fourth magnet parts 240 and 250.

In the embodiment illustrated in FIGS. 9A and 10A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the rear left side. Accordingly, an arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, an arc path A.P in the vicinity of the second fixed contactor 22*b* is also formed toward the rear right side.

In the embodiment illustrated in FIGS. 9B and 10B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the front left side. Accordingly, an arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, an arc path A.P in the vicinity of the second fixed contactor 22*b* is also formed toward the front right side.

Although not shown in the drawings, when the polarity of each surface of the first to fourth magnet parts 220, 230, 240, and 250 is changed, the direction of the magnetic field formed in the first to fourth magnet parts 220, 230, 240, and 250 is reversed. Accordingly, the generated electromagnetic force and the arc path A.P are also formed so that the front-rear direction thereof is reversed.

That is, in the electric connection situation shown in FIGS. 9A and 10A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIGS. 9B and 10B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path formation unit 200 according to the present embodiment, the electromagnetic force and the arc path A.P may be formed in a direction away from the central portion C regardless of the polarity of each of the first to fourth magnet parts 220, 230, 240, and 250 or the direction of the current flowing through the direct current relay 1.

Accordingly, damage to each constituent element of the direct current relay 1 disposed adjacent to the central portion C can be prevented. Furthermore, since the generated arc can be quickly discharged to the outside, operational reliability of the direct current relay 1 can be improved.

(3) Description of Arc Path Formation Unit 300 According to Third Embodiment of Present Disclosure Hereinafter, an arc path formation unit 300 according to third embodiment of the present disclosure will be described in detail with reference to FIGS. 11 to 18.

Referring to FIGS. 11 to 14, the arc path formation unit 300 according to the illustrated embodiment includes a magnet frame 310, a first magnet part 320, a second magnet part 330, a third magnet part 340, a fourth magnet part 350, and a fifth magnet part 360.

The magnet frame 310 according to the present embodiment has the same structure and function as the magnet frame 110 according to the above-described embodiment. However, there is a difference in the arrangement method of the first to fifth magnet parts 320, 330, 340, 350, and 360 disposed in the magnet frame 310 according to the present embodiment.

Accordingly, a description of the magnet frame 310 will be replaced with the description of the magnet frame 110 according to the above-described embodiment.

The first to fifth magnet parts 320, 330, 340, 350, and 360 may each be provided in any form capable of forming a magnetic field by being magnetized. The first to fifth magnet parts 320, 330, 340, 350, and 360 may be disposed adjacent to respective first to fourth surfaces 311 to 314.

In the illustrated embodiment, the first magnet part 320 is located adjacent to the third surface 313. The second magnet part 330 is located adjacent to the fourth surface 314.

The first magnet part 320 and the second magnet part 330 are disposed to face each other with a space portion 315 therebetween.

The third magnet part 340 is located adjacent to any one surface of the first surface 311 and the second surface 312. In the embodiment illustrated in FIGS. 11 and 12, the third magnet part 340 is located adjacent to the first surface 311. In the embodiment illustrated in FIGS. 13 and 14, the third magnet part 340 is located adjacent to the second surface 312.

The third magnet part 340 is located to be biased to any one surface of the third surface 313 and the fourth surface 314. The third magnet part 340 is disposed to overlap any one of the first fixed contactor **22*a* and the second fixed contactor 22*b*** in the front-rear direction.

Figure 11:
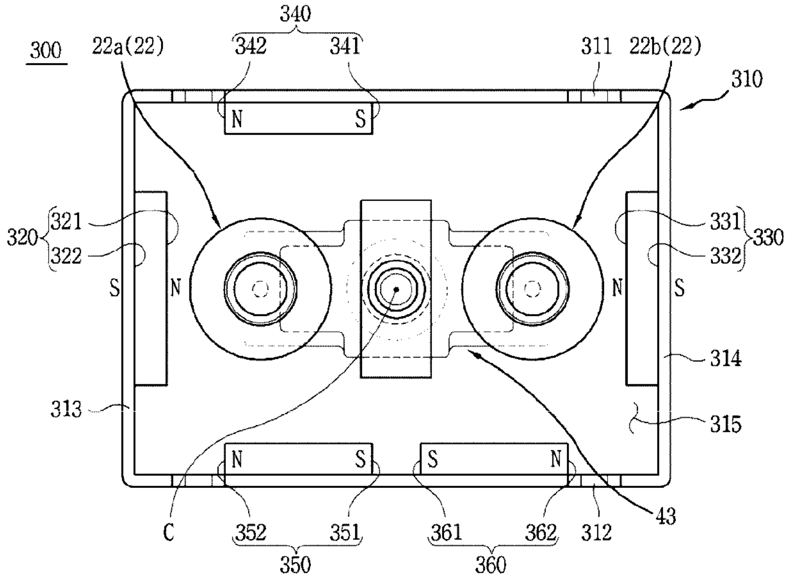
FIGS. 11 to 14 are conceptual views illustrating an arc path formation unit according to a third embodiment of the present disclosure.
Figure 11:
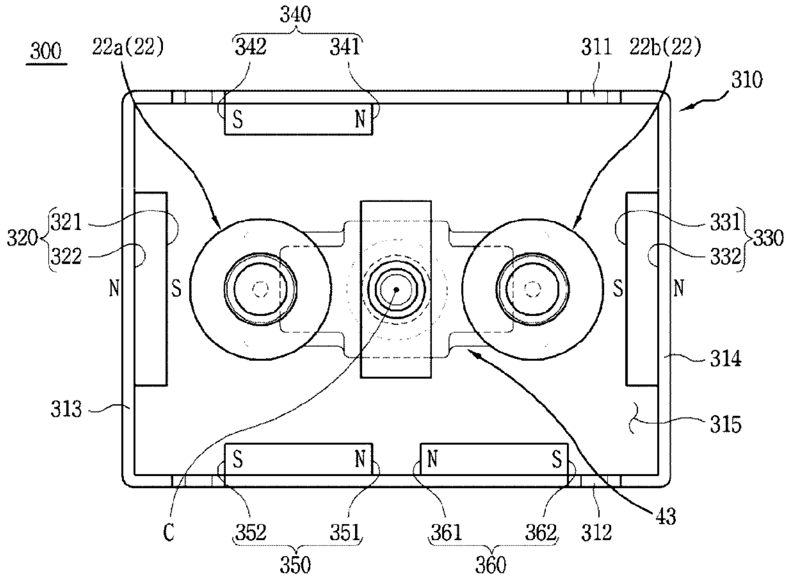
Figure 13:
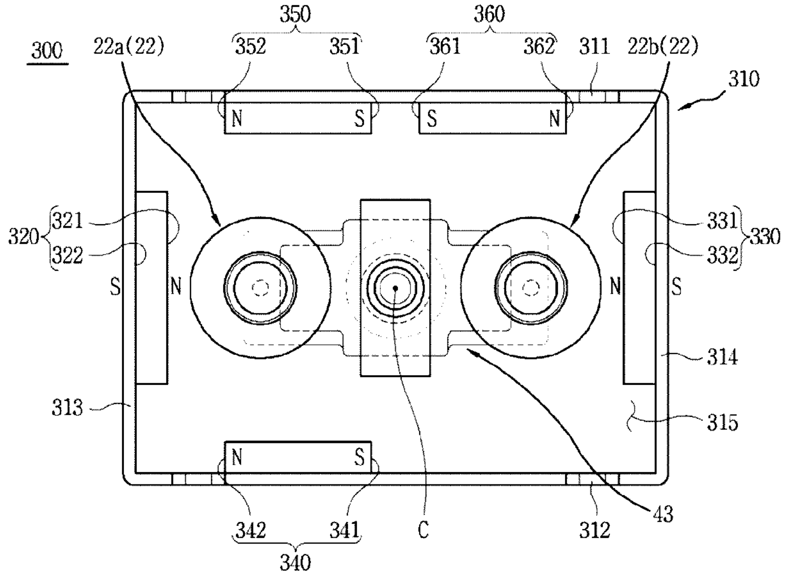
Figure 13:
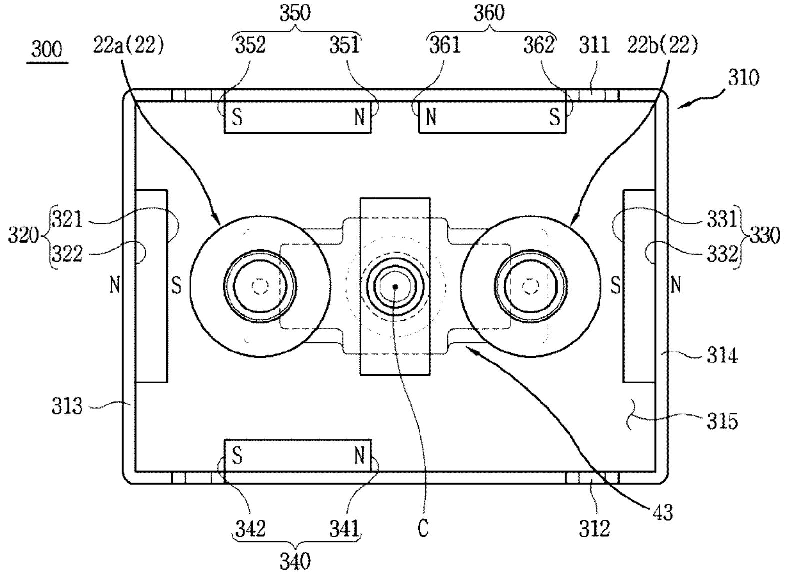

In the embodiment illustrated in FIGS. 11 and 13, the third magnet part 340 is located to be biased to the third surface 313. In the embodiment, the third magnet part 340 is disposed to overlap the first fixed contactor **22*a*** in the front-rear direction.

Figure 12:
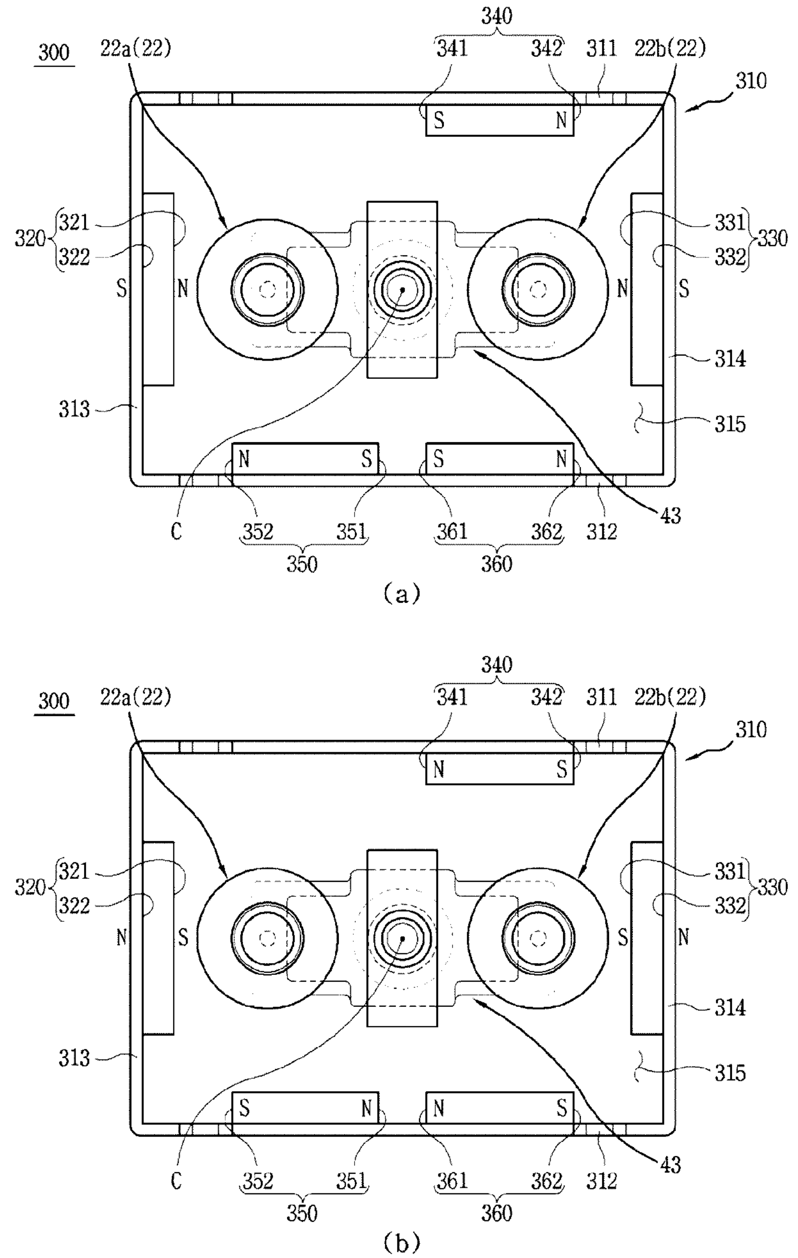
Figure 14:
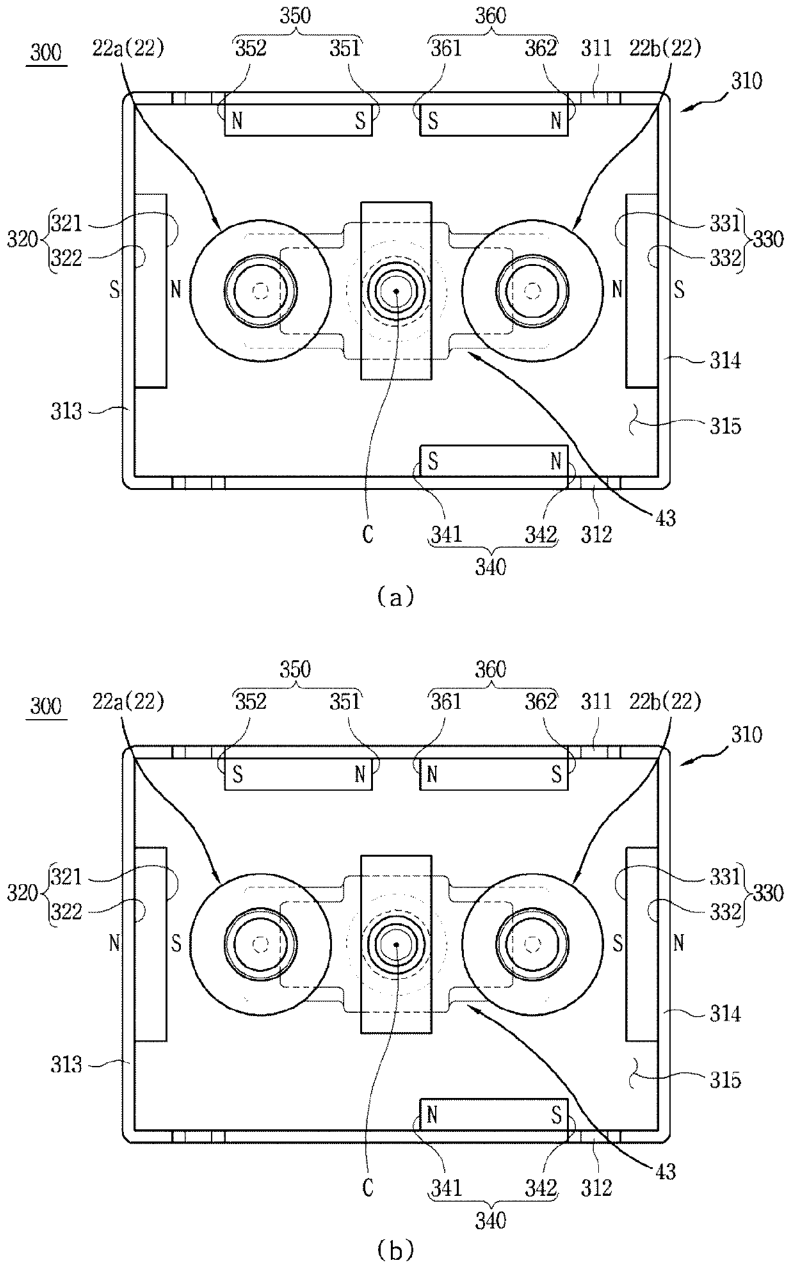
Figure 15:
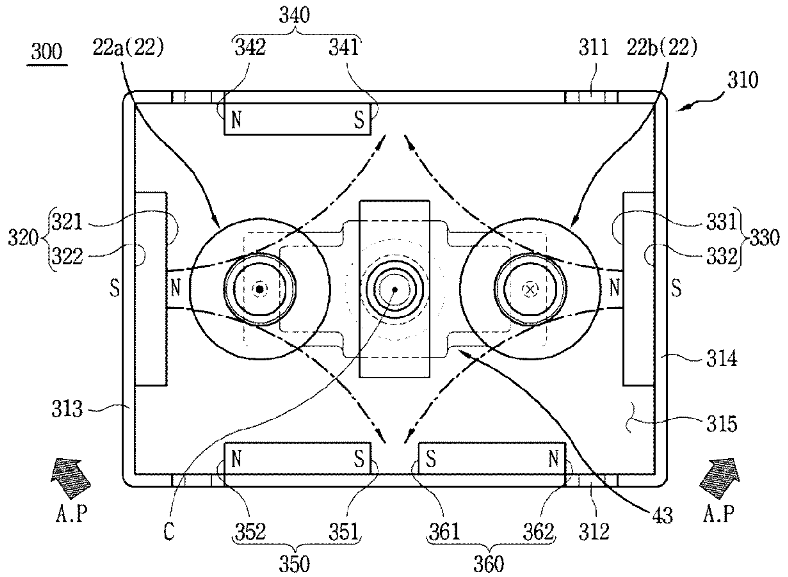
FIGS. 15 to 18 are conceptual views illustrating magnetic field and arc paths formed by the arc path formation unit according to the embodiment of FIGS. 11 to 14.
Figure 15:
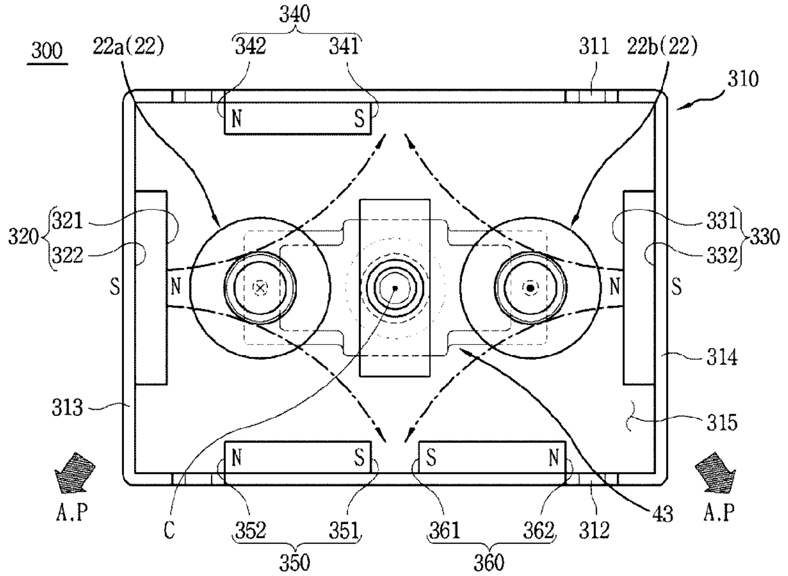
Figure 16:
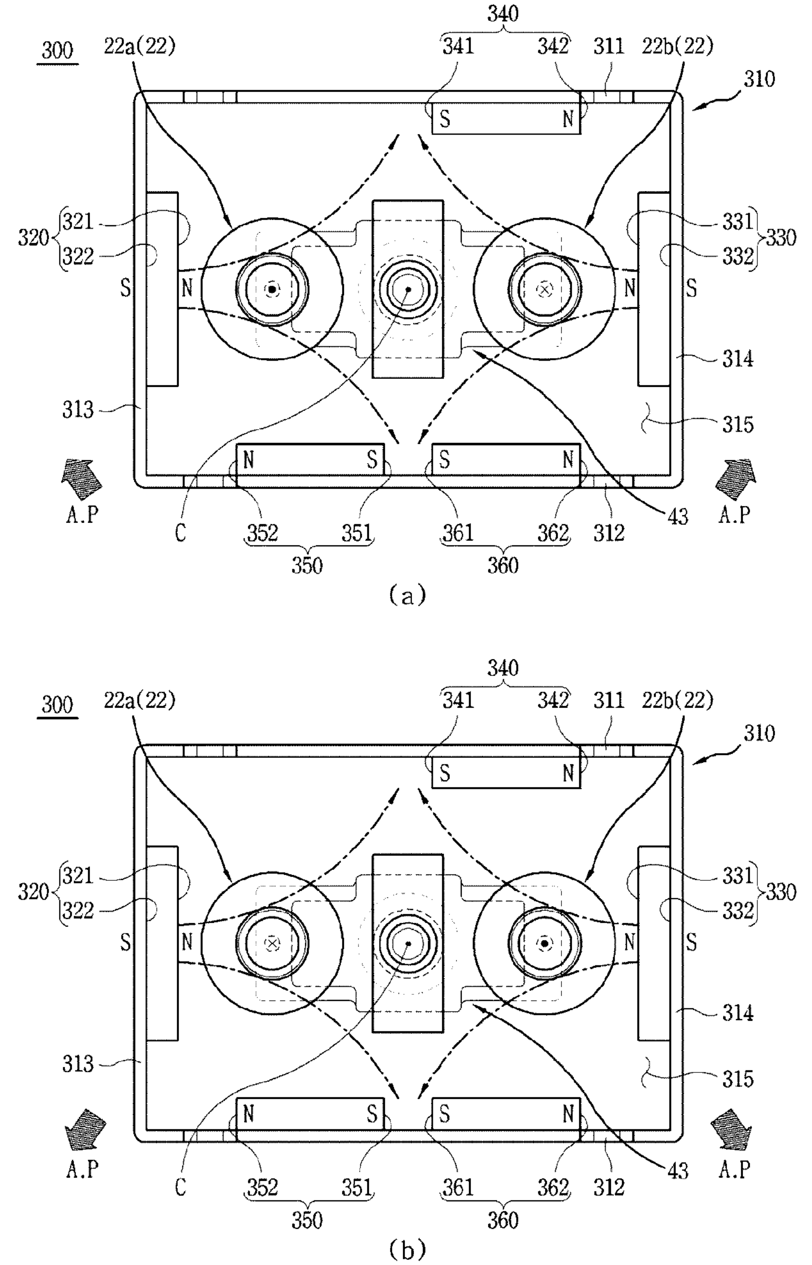
Figure 17:
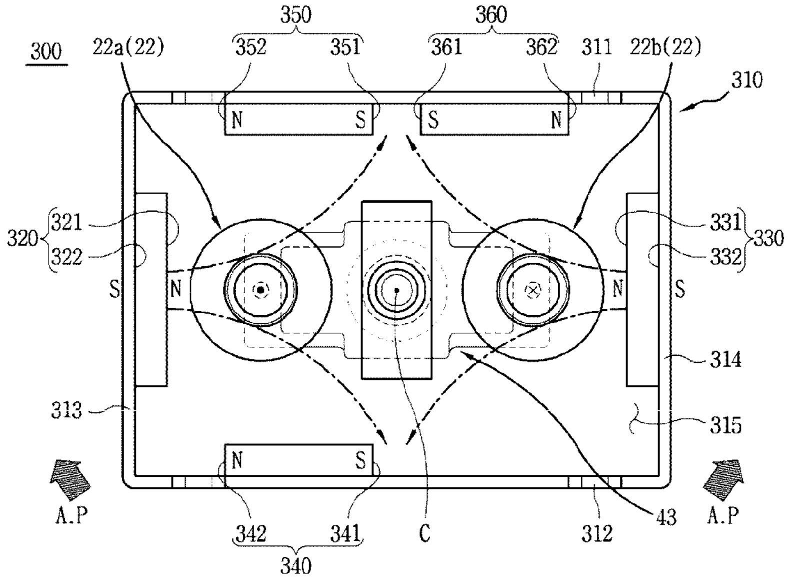
Figure 17:
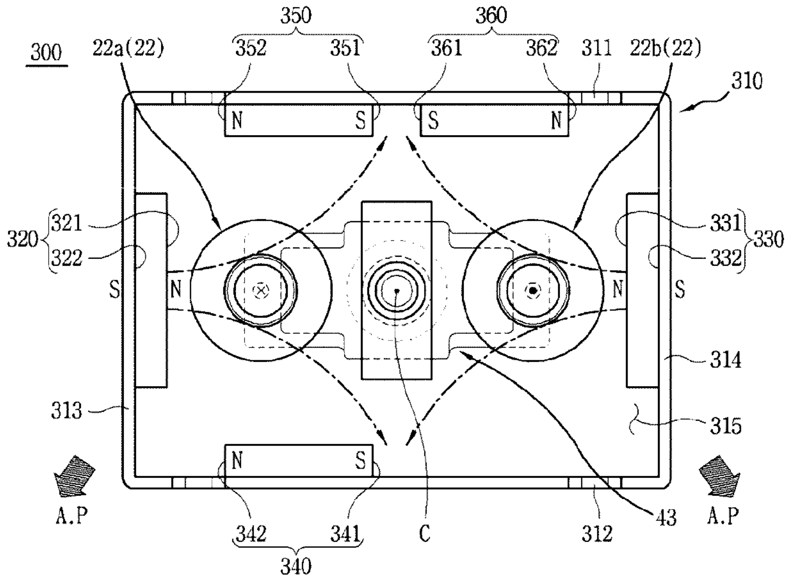
Figure 18:
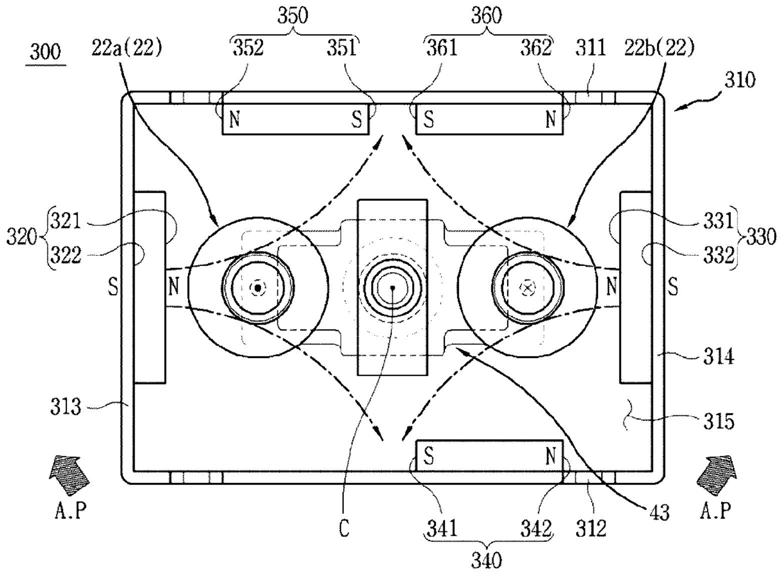
Figure 18:
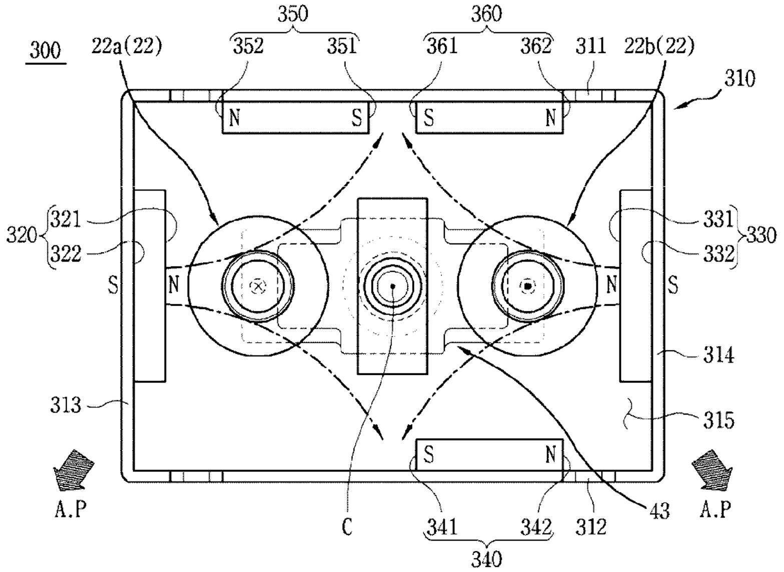

In the embodiment illustrated in FIGS. 12 and 14, the third magnet part 340 is located to be biased to the fourth surface 314. In the embodiment, the third magnet part 340 is disposed to overlap the second fixed contactor **22*b*** in the front-rear direction.

The fourth magnet part 350 and the fifth magnet part 360 are located adjacent to the other surface of the first surface 311 and the second surface 312. In the embodiment illustrated in FIGS. 11 and 12, the fourth magnet part 350 and the fifth magnet part 360 are located adjacent to the second surface 312. In the embodiment illustrated in FIGS. 13 and 14, the fourth magnet part 350 and the fifth magnet part 360 are located adjacent to the first surface 311.

The fourth magnet part 350 and the fifth magnet part 360 are disposed to overlap the first fixed contactor **22*a* and the second fixed contactor 22*b***, respectively, in the front-rear direction.

Further, any one of the fourth magnet part 350 and the fifth magnet part 360 is disposed to overlap the third magnet part 340 in the front-rear direction.

In the embodiment illustrated in FIGS. 11 and 13, the fourth magnet part 350 is disposed to overlap the third magnet part 340 in the front-rear direction. In the embodiment illustrated in FIGS. 12 and 14, the fifth magnet part 360 is disposed to overlap the third magnet part 340 in the front-rear direction.

The fourth magnet part 350 and the fifth magnet part 360 are disposed in parallel to each other in an extending direction thereof. In one embodiment, the fourth magnet part 350 and the fifth magnet part 360 may be in contact with each other.

The first magnet part 320 and the second magnet part 330 are formed to extend in one direction. In the illustrated embodiment, the first magnet part 320 and the second magnet part 330 are formed to extend in the front-rear direction.

The third to fifth magnet parts 340, 350, and 360 are formed to extend in the other direction. In the illustrated embodiment, the third to fifth magnet parts 340, 350, and 360 are formed to extend in the left-right direction.

Each of the first to fifth magnet parts 320, 330, 340, 350, and 360 includes a plurality of surfaces.

Specifically, the first magnet part 320 includes a first facing surface 321 facing the space portion 315 or the fixed contactor 22 and a first opposing surface 322 opposite to the space portion 315 or the fixed contactor 22.

The second magnet part 330 includes a second facing surface 331 facing the space portion 315 or the fixed contactor 22 and a second opposing surface 332 opposite to the space portion 315 or the fixed contactor 22.

The third magnet part 340 includes a third facing surface 341 opposite to the any one surface to which the third magnet part 340 is located to be biased and a third opposing surface 342 facing the one surface.

The fourth magnet part 350 includes a fourth facing surface 351 facing the fifth magnet part 360 and a fourth opposing surface 352 opposite to the fifth magnet part 360.

The fifth magnet part 360 includes a fifth facing surface 361 facing the fourth magnet part 350 and a fifth opposing surface 362 opposite to the fourth magnet part 350.

Each surface of the first to fifth magnet parts 320, 330, 340, 350, and 360 may be magnetized according to a predetermined rule.

Specifically, the first and second facing surfaces 321 and 331 and the third to fifth opposing surfaces 342, 352, and 362 are magnetized to the same polarity.

Similarly, the first and second opposing surfaces 322 and 332 and the third to fifth facing surfaces 341, 351, and 361 are magnetized to the same polarity.

Hereinafter, an arc path A.P formed by the arc path formation unit 300 according to the present embodiment will be described in detail with reference to FIGS. 15 to 18.

Referring to FIGS. 15 to 18, the first and second facing surfaces 321 and 331 and the third to fifth opposing surfaces 342, 352, and 362 are magnetized to N poles. In addition, according to the predetermined rule, the first and second opposing surfaces 322 and 332 and the third to fifth facing surfaces 341, 351, and 361 are magnetized to S poles.

Accordingly, magnetic fields are formed between the first to fifth magnet parts 320, 330, 340, 350, and 360 according to the polarities.

First, magnetic fields that repel each other are formed between the first magnet part 320 and the second magnet part 330.

A magnetic field in a direction toward the third facing surface 341 from the first facing surface 321 is formed between the first magnet part 320 and the third magnet part 340. A magnetic field in a direction toward the fourth and fifth facing surfaces 351 and 361 from the first facing surface 321 is formed between the first magnet part 320 and the fourth and fifth magnet parts 350 and 360.

Further, a magnetic field in a direction toward the third facing surface 341 from the second facing surface 331 is formed between the second magnet part 230 and the third magnet part 340. A magnetic field in a direction toward the fourth and fifth facing surfaces 351 and 361 from the second facing surface 331 is formed between the second magnet part 330 and the fourth and fifth magnet parts 350 and 360.

In the embodiments illustrated in FIGS. 15A, 16A, 17A, and 18A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the rear left side. Accordingly, an arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, an arc path A.P in the vicinity of the second fixed contactor 22*b* is also formed toward the rear right side.

In the embodiments illustrated in FIGS. 15B, 16B, 17B, and 18B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the front left side. Accordingly, an arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, an arc path A.P in the vicinity of the second fixed contactor 22*b* is also formed toward the front right side.

Although not shown in the drawings, when the polarity of each surface of the first to fifth magnet parts 320, 330, 340, 350, and 360 is changed, the direction of the magnetic field formed in the first to fifth magnet parts 320, 330, 340, 350, and 360 is reversed. Accordingly, the generated electromagnetic force and the arc path A.P are also formed so that the front-rear direction thereof is reversed.

That is, in the electric connection situation shown in FIGS. 15A, 16A, 17A, and 18A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIGS. 15B, 16B, 17B, and 18B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path formation unit 300 according to the present embodiment, the electromagnetic force and the arc path A.P may be formed in a direction away from the central portion C regardless of the polarity of each of the first to fifth magnet parts 320, 330, 340, 350, and 360 or the direction of the current flowing through the direct current relay 1.

Accordingly, damage to each constituent element of the direct current relay 1 disposed adjacent to the central portion C can be prevented. Furthermore, since the generated arc can be quickly discharged to the outside, operational reliability of the direct current relay 1 can be improved.

4. Description of Arc Path Formation Unit 500 According to Fourth Embodiment of Present Disclosure The direct current relay 1 according to the embodiment of the present disclosure includes an arc path formation unit 500. The arc path formation unit 500 includes a magnet frame 510 surrounding the fixed contactor 22 and the movable contactor 43.

Further, the arc path formation unit 500 includes a plurality of magnet parts 521, 522, 523, 524, 525, and 526 forming magnetic fields inside the magnet frame 510. The magnetic fields formed by the plurality of magnet parts 521, 522, 523, 524, 525, and 526 form an electromagnetic force that induces an arc generated as the fixed contactor 22 and the movable contactor 43 are separated from each other.

Hereinafter, the arc path formation unit 500 according to the present embodiment will be described in detail with reference to FIGS. 4 to 21.

Figure 4:
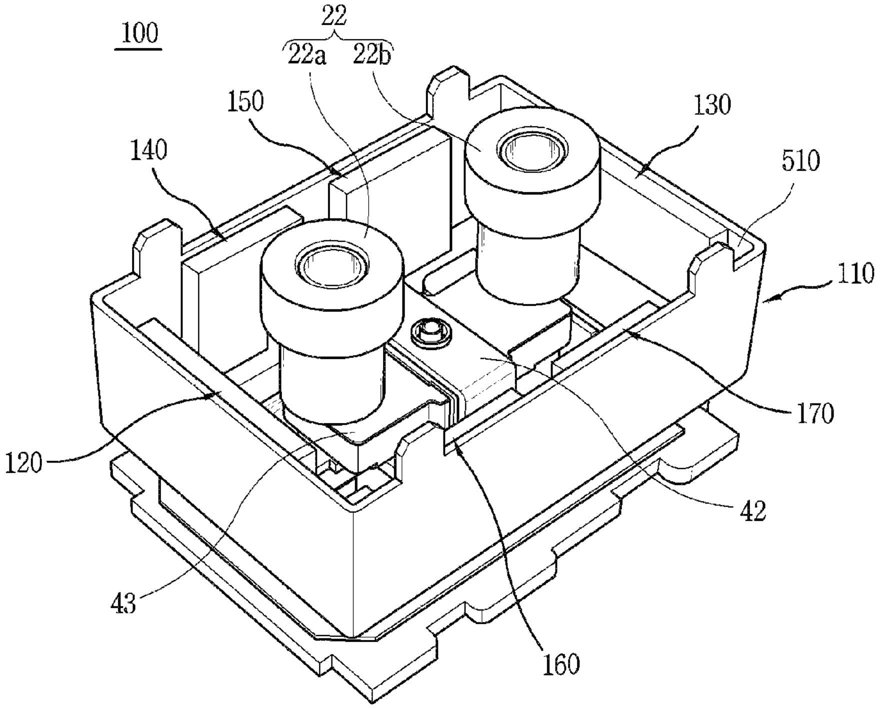
FIG. 4 is a partial opened perspective view of the direct current relay of FIG. 2.
Figure 19:
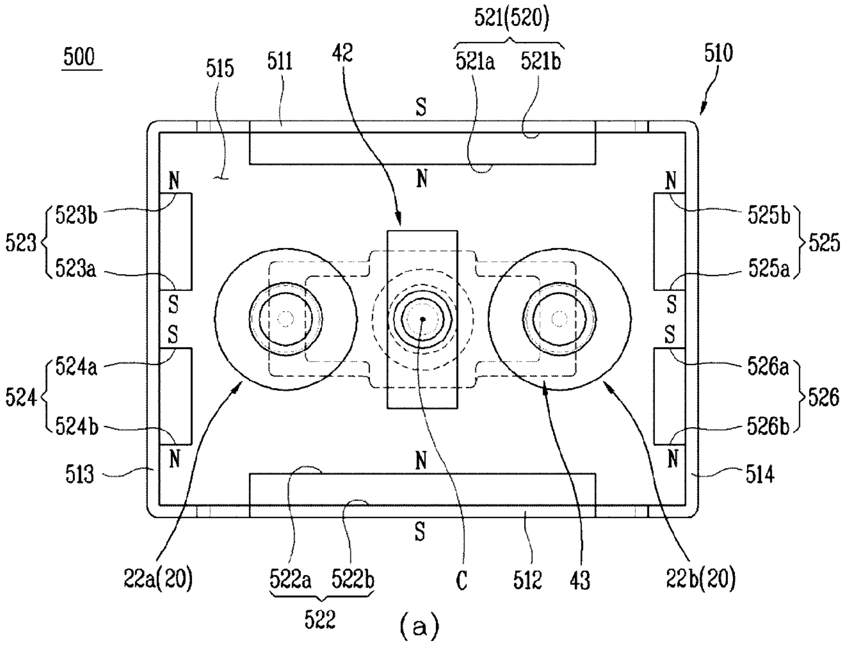
FIG. 19 is a conceptual view illustrating an arc path formation unit according to a fourth embodiment of the present disclosure.
Figure 19:
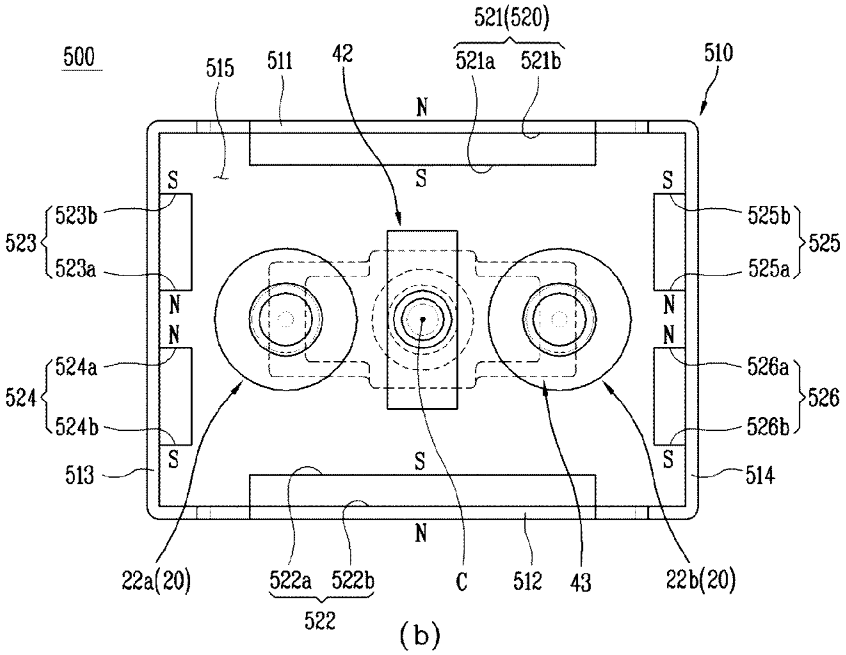

(1) Description of Configuration of Arc Path Formation Unit 500 According to Fourth Embodiment of Present Disclosure Referring to FIGS. 4 and 19, the arc path formation unit 500 according to the present embodiment includes the magnet frame 510 and a magnet part 520.

The magnet frame 510 forms a frame of the arc path formation unit 500. The magnet part 520 is disposed in the magnet frame 510. In one embodiment, the magnet part 520 may be coupled to the magnet frame 510.

The magnet frame 510 has a rectangular cross section formed to extend in the longitudinal direction, i.e., in the left-right direction in the illustrated embodiment. The shape of the magnet frame 510 may be changed depending on shapes of the upper frame 11 and the arc chamber 21.

The magnet frame 510 includes a first surface 511, a second surface 512, a third surface 513, a fourth surface 514, and a space portion 515.

The first surface 511, the second surface 512, the third surface 513, and the fourth surface 514 form an outer circumferential surface of the magnet frame 510. That is, the first surface 511, the second surface 512, the third surface 513, and the fourth surface 514 may serve as walls of the magnet frame 510.

Outer sides of the first surface 511, the second surface 512, the third surface 513, and the fourth surface 514 may be in contact with or fixedly coupled to the inner surface of the upper frame 11. In addition, the magnet part 520 may be located on inner sides of the first surface 511, the second surface 512, the third surface 513, and the fourth surface 514.

In the illustrated embodiment, the first surface 511 forms a rear side surface. The second surface 512 forms a front side surface and faces the first surface 511. In addition, the third surface 513 forms a left side surface. The fourth surface 514 forms a right side surface and faces the third surface 513.

That is, the first surface 511 and the second surface 512 face each other with the space portion 515 therebetween. In addition, the third surface 513 and the fourth surface 514 face each other with the space portion 515 therebetween.

The first surface 511 is continuous with the third surface 513 and the fourth surface 514. The first surface 511 may be coupled to the third surface 513 and the fourth surface 514 at predetermined angles. In one embodiment, the predetermined angle may be a right angle.

The second surface 512 is continuous with the third surface 513 and the fourth surface 514. The second surface 512 may be coupled to the third surface 513 and the fourth surface 514 at predetermined angles. In one embodiment, the predetermined angle may be a right angle.

Each of corners at which the first surface 511 to the fourth surface 514 are connected to each other may be chamfered.

A first magnet part 521 may be coupled to the inner side of the first surface 511, that is, on one side of the first surface 511 facing the second surface 512. In addition, a second magnet part 522 may be coupled to the inner side of the second surface 512, that is, on one side of the second surface 512 facing the first surface 511.

Further, a third magnet part 523 and a fourth magnet part 524 may be coupled to the inner side of the third surface 513, that is, on one side of the third surface 513 facing the fourth surface 514. In addition, a fifth magnet part 525 and a sixth magnet part 526 may be coupled to the inner side of the fourth surface 514, that is, on one side of the fourth surface 514 facing the third surface 513.

Coupling members (not shown) may be provided to couple the magnet part 520 to the respective surfaces 511, 512, 513, and 514.

Although not shown in the drawings, an arc discharge hole (not shown) may be formed through one or more of the first surface 511, the second surface 512, the third surface 513, and the fourth surface 514. The arc discharge hole (not shown) may serve as a path through which an arc generated in the space portion 515 is discharged.

A space surrounded by the first to fourth surfaces 511 to 514 may be defined as the space portion 515.

The fixed contactor 22 and the movable contactor 43 are accommodated in the space portion 515. In addition, the arc chamber 21 is accommodated in the space portion 515.

In the space portion 515, the movable contactor 43 may be moved in a direction toward the fixed contactor 22 (i.e., the downward direction) or a direction away from the fixed contactor 22 (i.e., the upward direction).

Further, an arc path A.P of an arc generated in the arc chamber 21 is formed in the space portion 515. This is achieved by magnetic fields formed by the magnet part 520.

A central portion of the space portion 515 may be defined as a central portion C. A straight line distance from each of corners at which the first to fourth surfaces 511 to 514 are connected to each other to the central portion C may be formed to be equal to each other.

The central portion C may be located between the first fixed contactor 22*a* and the second fixed contactor 22*b*. In addition, a central portion of the movable contactor part 40 is located vertically below the central portion C. That is, a central portion of each of the housing 41, the cover 42, the movable contactor 43, the shaft 44, the elastic portion 45, and the like is located vertically below the central portion C.

Accordingly, when the generated arc is moved toward the central portion C, the above components may be damaged. In order to prevent this, the arc path formation unit 500 according to the present embodiment includes the magnet part 520.

The magnet part 520 forms magnetic fields in the space portion 515. The magnetic fields formed by the magnet part 520 generate an electromagnetic force together with current flowing along the fixed contactor 22 and the movable contactor 43. Accordingly, an arc path A.P may be formed in a direction of the electromagnetic force.

The magnetic field may be generated between the neighboring magnet parts 520 or by each magnet part 520 itself.

The magnet part 520 may be provided in any form capable of having magnetism by itself or obtain magnetism by the application of current or the like. In one embodiment, the magnet part 520 may be provided as a permanent magnet or an electromagnet.

The magnet part 520 is coupled to the magnet frame 510. Coupling members (not shown) may be provided to couple the magnet part 520 to the magnet frame 510.

In the illustrated embodiment, the magnet part 520 extends in one direction and has a rectangular parallelepiped shape having a rectangular cross-section. The magnet part 520 may be provided in any form capable of forming a magnetic field.

The magnet part 520 may be provided in plural. In the illustrated embodiment, six magnet parts 520 are provided, but the number of the magnet parts 520 may be changed.

In the illustrated embodiment, the magnet part 520 includes the first magnet part 521, the second magnet part 522, the third magnet part 523, the fourth magnet part 524, the fifth magnet part 525, and the sixth magnet part 526.

The first magnet part 521 forms magnetic fields together with the second to sixth magnet parts 522 to 526. In addition, the first magnet part 521 may also form a magnetic field by itself.

In the illustrated embodiment, the first magnet part 521 is located on the inner side of the first surface 511 in a central portion of the first surface 511 in the left-right direction.

The first magnet part 521 is disposed to face the second magnet part 522. Specifically, the first magnet part 521 faces the second magnet part 522 in the front-rear direction with the space portion 515 therebetween.

In one embodiment, a virtual straight line connecting a center of the first magnet part 521 in the longitudinal direction (i.e., the left-right direction) and a center of the second magnet part 522 in the longitudinal direction (i.e., the left-right direction) may pass through the central portion C of the space portion 515.

The first magnet part 521 includes a first inner surface 521*a* and a first outer surface 521*b*.

The first inner surface 521*a* is defined as one side surface of the first magnet part 521 facing the space portion 515. In other words, the first inner surface 521*a* may be defined as one side surface of the first magnet part 521 facing the second magnet part 522.

The first outer surface 521*b* is defined as the other side surface of the first magnet part 521 facing the first surface 511. In other words, the first outer surface 521*b* may be defined as the other side surface of the first magnet part 521 facing the first inner surface 521*a*.

The first inner surface 521*a* and the first outer surface 521*b* are magnetized to different polarities. That is, the first inner surface 521*a* may be magnetized to one of an N pole and an S pole, and the first outer surface 521*b* may be magnetized to the other one of the N pole and the S pole.

Accordingly, a magnetic field propagating from one of the first inner surface 521*a* and the first outer surface 521*b* to the other one is formed by the first magnet part 521 itself.

The polarity of the first inner surface 521*a* may be the same as a polarity of a second inner surface 522*a* of the second magnet part 522. Accordingly, magnetic fields that repel each other are formed between the first magnet part 521 and the second magnet part 522.

In the embodiment illustrated in FIG. 19A, the first inner surface 521*a* is magnetized to the N pole same as the second inner surface 522*a*. In the embodiment, a magnetic field directed to the second to sixth magnet parts 522 to 526 diverges from the first inner surface 521*a*.

In the embodiment illustrated in FIG. 19B, the first inner surface 521*a* is magnetized to the S pole same as the second inner surface 522*a*. In the embodiment, magnetic fields diverging from the third to sixth magnet parts 523 to 526 converge to the first inner surface 521*a*.

In the illustrated embodiment, the polarity of the first inner surface 521*a* may be different from that of each of facing surfaces 523*a*, 524*a*, 525*a*, and 526*a* of the third to sixth magnet parts 523 to 526. In addition, the polarity of the first inner surface 521*a* may be the same as that of each of opposing surfaces 523*b*, 524*b*, 525*b*, and 526*b* of the third to sixth magnet parts 523 to 526.

Accordingly, magnetic fields that attract each other are formed between the first inner surface 521*a* and each of the facing surfaces 523*a*, 524*a*, 525*a*, and 526*a*. That is, a magnetic field may be formed in a direction from one of the first inner surface 521*a* and each of the facing surfaces 523*a*, 524*a*, 525*a*, and 526*a* toward another one thereof.

Further, magnetic fields that repel each other are formed between the first inner surface 521*a* and each of the opposing surfaces 523*b*, 524*b*, 525*b*, and 526*b*.

The second magnet part 522 forms magnetic fields together with the first and third to sixth magnet parts 521, 523, 524, 525, and 526. In addition, the second magnet part 522 may also form a magnetic field by itself.

In the illustrated embodiment, the second magnet part 522 is located on the inner side of the second surface 512 in a central portion of the second magnet part 522 in the left-right direction.

The second magnet part 522 is disposed to face the first magnet part 521. Specifically, the second magnet part 522 faces the first magnet part 521 in the front-rear direction with the space portion 515 therebetween.

In one embodiment, the virtual straight line connecting the center of the second magnet part 522 in the longitudinal direction (i.e., the left-right direction) and the center of the first magnet part 521 in the longitudinal direction (i.e., the left-right direction) may pass through the central portion C of the space portion 515.

The second magnet part 522 includes the second inner surface 522*a* and a second outer surface 522*b*.

The second inner surface 522*a* may be defined as one side surface of the second magnet part 522 facing the space portion 515. In other words, the second inner surface 522*a* may be defined as one side surface of the second magnet part 522 facing the first magnet part 521.

The second outer surface 522*b* is defined as the other side surface of the second magnet part 522 facing the second surface 512. In other words, the second outer surface 522*b* may be defined as the other side surface of the second magnet part 522 facing the second inner surface 522*a*.

The second inner surface 522*a* and the second outer surface 522*b* are magnetized to different polarities. That is, the second inner surface 522*a* may be magnetized to one of an N pole and an S pole, and the second outer surface 522*b* may be magnetized to the other one of the N pole and the S pole.

Accordingly, a magnetic field propagating from one of the second inner surface 522*a* and the second outer surface 522*b* to the other one thereof is formed by the second magnet part 522 itself.

In the illustrated embodiment, the polarity of the second inner surface 522*a* may be the same as the polarity of the first inner surface 521*a* of the first magnet part 521. Accordingly, magnetic fields that repel each other are formed between the first magnet part 521 and the second magnet part 522.

In the embodiment illustrated in FIG. 19A, the second inner surface 522*a* is magnetized to the N pole same as the first inner surface 521*a*. In the embodiment, a magnetic field in a direction toward each of the first and third to sixth magnet parts 521, 523, 524, 525, and 526 is generated in the second inner surface 522*a*.

In the embodiment illustrated in FIG. 19B, the second inner surface 522*a* is magnetized to the S pole same as the first inner surface 521*a*. In the embodiment, magnetic fields diverging from the third to sixth magnet parts 523 to 526 converge to the second inner surface 522*a*.

In the illustrated embodiment, the polarity of the second inner surface 522*a* may be different from that of each of the facing surfaces 523*a*, 524*a*, 525*a*, and 526*a* of the third to sixth magnet parts 523 to 526. In addition, the polarity of the second inner surface 522*a* may be the same as that of each of the opposing surfaces 523*b*, 524*b*, 525*b*, and 526*b* of the third to sixth magnet parts 523 to 526.

Accordingly, magnetic fields that attract each other are formed between the second inner surface 522*a* and each of the facing surfaces 523*a*, 524*a*, 525*a*, and 526*a*. That is, a magnetic field may be formed in a direction from one of the second inner surface 522*a* and each of the facing surfaces 523*a*, 524*a*, 525*a*, and 526*a* toward another one thereof.

Further, magnetic fields that repel each other are formed between the second inner surface 522*a* and each of the opposing surfaces 523*b*, 524*b*, 525*b*, and 526*b*.

In one embodiment, a positional relationship between the first magnet part 521 and the second magnet part 522 may be described using a positional relationship between the first magnet part 521 and the second magnet part 522 and the fixed contactor 22.

That is, the fixed contactor 22 is formed to extend in the longitudinal direction, i.e., in the left-right direction in the illustrated embodiment. The fixed contactor 22 includes the first fixed contactor 22*a* located on the left side and the second fixed contactor 22*b* located on the right side. A virtual line connecting the first fixed contactor 22*a* and the second fixed contactor 22*b* may be understood as a horizontal line in the left-right direction.

In this case, a virtual line connecting the first magnet part 521 and the second magnet part 522 may intersect the horizontal line. In one embodiment, a distance between the first magnet part 521 and the intersection point may be the same as a distance between the second magnet part 522 and the intersection point.

That is, the first magnet part 521 and the second magnet part 522 may be disposed to be point-symmetrical with respect to the central portion C.

The third magnet part 523 forms magnetic fields together with the first magnet part 521, the second magnet part 522, and the fourth magnet part 524. In addition, the third magnet part 523 may also form a magnetic field by itself.

In the illustrated embodiment, the third magnet part 523 is located on the inner side of the third surface 513. In addition, the third magnet part 523 is located on the inner side of the third surface 513 to be biased toward the first surface 511. That is, the third magnet part 523 is located more adjacent to the first surface 511 than the second surface 512.

The third magnet part 523 is disposed in parallel to the fourth magnet part 524. Specifically, the third magnet part 523 is located between the first magnet part 521 and the fourth magnet part 524. In other words, the third magnet part 523 is located between the first surface 511 and the fourth magnet part 524. In the illustrated embodiment, the third magnet part 523 is located at a rear side of the fourth magnet part 524.

In the illustrated embodiment, the third magnet part 523 is spaced apart from the fourth magnet part 524. The third magnet part 523 is disposed to face the fourth magnet part 524 in an extending direction thereof, i.e., in the front-rear direction in the illustrated embodiment.

Alternatively, the third magnet part 523 may be in contact with the fourth magnet part 524. Even in the embodiment, the third magnet part 523 and the fourth magnet part 524 may be disposed to face each other in the extending direction, that is, in the front-rear direction in the illustrated embodiment.

The third magnet part 523 may be disposed to face the fifth magnet part 525. Specifically, the third magnet part 523 is disposed to face the fifth magnet part 525 in a horizontal direction, i.e., in the left-right direction in the illustrated embodiment, with the space portion 515 therebetween.

The third magnet part 523 extends in one direction, i.e., in the front-rear direction in the illustrated embodiment. That is, the extending direction of the third magnet part 523 forms a predetermined angle with respect to an extending direction of the first magnet part 521 or the second magnet part 522. In one embodiment, the third magnet part 523 may extend in a direction perpendicular to the first magnet part 521 or the second magnet part 522.

In one embodiment, a virtual straight line connecting a center of the third magnet part 523 in the longitudinal direction and a center of the sixth magnet part 526 in the longitudinal direction may pass through the central portion C of the space portion 515.

The third magnet part 523 includes a third facing surface **523*a* and a third opposing surface 523*b***.

The third facing surface **523*a* is defined as one side surface of the third magnet part 523 facing the fourth magnet part 524. In other words, the third facing surface 523*a* may be defined as one side surface of the third magnet part 523 facing the second surface 512**.

The third opposing surface **523*b* is defined as the other side surface of the third magnet part 523 opposite to the fourth magnet part 524. In other words, the third opposing surface 523*b* may be defined as the other side surface of the third magnet part 523 facing the first surface 511**.

The third facing surface **523*a* and the third opposing surface 523*b* are magnetized to different polarities. That is, the third facing surface 523*a* may be magnetized to one of an N pole and an S pole, and the third opposing surface 523*b*** may be magnetized to the other one of the N pole and the S pole.

Accordingly, a magnetic field propagating from one of the third facing surface **523*a* and the third opposing surface 523*b* to the other one thereof is formed by the third magnet part 523** itself.

The polarity of the third facing surface **523*a* may be the same as a polarity of a fourth facing surface 524*a* of the fourth magnet part 524. Accordingly, magnetic fields that repel each other are formed between the third magnet part 523 and the fourth magnet part 524**.

The polarity of the third facing surface **523*a* may be different from the polarity of the first inner surface 521*a* of the first magnet part 521. Accordingly, a magnetic field propagating from one of the third magnet part 523 and the first magnet part 521 to the other one thereof is formed between the third magnet part 523 and the first magnet part 521**.

The polarity of the third facing surface **523*a* may be different from the polarity of the second inner surface 522*a* of the second magnet part 522. Accordingly, a magnetic field propagating from one of the third magnet part 523 and the second magnet part 522 to the other one thereof is formed between the third magnet part 523 and the second magnet part 522**.

In one embodiment, the third facing surface **523*a* may be located between the first surface 511 and the virtual straight line connecting the fixed contactors 220*a* and 220*b*. That is, the third facing surface 523*a* may be located to be biased to the first surface 511 with respect to the virtual straight line passing through the fixed contactors 220*a* and 220*b***.

The fourth magnet part 524 forms magnetic fields together with the first magnet part 521, the second magnet part 522, and the third magnet part 523. In addition, the third magnet part 523 may also form a magnetic field by itself.

In the illustrated embodiment, the fourth magnet part 524 is located on the inner side of the third surface 513. In addition, the fourth magnet part 524 is located on the inner side of the third surface 513 to be biased toward the second surface 512. That is, the fourth magnet part 524 is located more adjacent to the second surface 512 than the first surface 511.

The fourth magnet part 524 is disposed in parallel to the third magnet part 523. Specifically, the fourth magnet part 524 is located between the third magnet part 523 and the second magnet part 522. In other words, the fourth magnet part 524 is located between the third magnet part 523 and the second surface 512. In the illustrated embodiment, the fourth magnet part 524 is located at a front side of the third magnet part 523.

In the illustrated embodiment, the fourth magnet part 524 is spaced apart from the third magnet part 523. The fourth magnet part 524 is disposed to face the third magnet part 523 in an extending direction thereof, i.e., in the front-rear direction in the illustrated embodiment.

Alternatively, the fourth magnet part 524 may be in contact with the third magnet part 523. Even in the embodiment, the fourth magnet part 524 and the third magnet part 523 may be disposed to face each other in the extending direction, that is, in the front-rear direction in the illustrated embodiment.

The fourth magnet part 524 is disposed to face the sixth magnet part 526. Specifically, the fourth magnet part 524 is disposed to face the sixth magnet part 526 in the horizontal direction, i.e., in the left-right direction in the illustrated embodiment, with the space portion 515 therebetween.

The fourth magnet part 524 extends in one direction, i.e., in the front-rear direction in the illustrated embodiment. That is, the extending direction of the fourth magnet part 524 forms a predetermined angle with respect to the extending direction of the first magnet part 521 or the second magnet part 522. In one embodiment, the fourth magnet part 524 may extend in a direction perpendicular to the first magnet part 521 or the second magnet part 522.

In one embodiment, a virtual straight line connecting a center of the fourth magnet part 524 in the longitudinal direction and a center of the fifth magnet part 525 in the longitudinal direction may pass through the central portion C of the space portion 515.

The fourth magnet part 524 includes the fourth facing surface 524*a* and a fourth opposing surface 524*b*.

The fourth facing surface 524*a* is defined as one side surface of the fourth magnet part 524 facing the third magnet part 523. In other words, the fourth facing surface 524*a* may be defined as one side surface of the fourth magnet part 524 facing the first surface 511.

The fourth opposing surface 524*b* is defined as the other side surface of the fourth magnet part 524 opposite to the third magnet part 523. In other words, the fourth opposing surface 524*b* may be defined as the other side surface of the fourth magnet part 524 facing the second surface 512.

The fourth facing surface 524*a* and the fourth opposing surface 524*b* are magnetized to different polarities. That is, the fourth facing surface 524*a* may be magnetized to one of an N pole and an S pole, and the fourth opposing surface 524*b* may be magnetized to the other one of the N pole and the S pole.

Accordingly, a magnetic field propagating from one of the fourth facing surface 524*a* and the fourth opposing surface 524*b* to the other one thereof is formed by the fourth magnet part 524 itself.

The polarity of the fourth facing surface 524*a* may be the same as the polarity of the third facing surface 523*a* of the third magnet part 523. Accordingly, magnetic fields that repel each other are formed between the fourth magnet part 524 and the third magnet part 523.

The polarity of the fourth facing surface 524*a* may be different from the polarity of the first inner surface 521*a* of the first magnet part 521. Accordingly, a magnetic field propagating from one of the fourth magnet part 524 and the first magnet part 521 to the other one thereof is formed between the fourth magnet part 524 and the first magnet part 521.

The polarity of the fourth facing surface 524*a* may be different from the polarity of the second inner surface 522*a* of the second magnet part 522. Accordingly, a magnetic field propagating from one of the fourth magnet part 524 and the second magnet part 522 to the other one thereof is formed between the fourth magnet part 524 and the second magnet part 522.

In one embodiment, the fourth facing surface 524*a* may be located between the second surface 512 and the virtual straight line connecting the fixed contactors 220*a* and 220*b*. That is, the fourth facing surface 524*a* may be located to be biased to the second surface 512 with respect to the virtual straight line passing through the fixed contactors 220*a* and 220*b*.

The fifth magnet part 525 forms magnetic fields together with the first magnet part 521, the second magnet part 522, and the sixth magnet part 526. In addition, the fifth magnet part 525 may also form a magnetic field by itself.

In the illustrated embodiment, the fifth magnet part 525 is located on the inner side of the fourth surface 514. In addition, the fifth magnet part 525 is located on the inner side of the fourth surface 514 to be biased toward the first surface 511. That is, the fifth magnet part 525 is located more adjacent to the first surface 511 than the second surface 512.

The fifth magnet part 525 is disposed in parallel to the sixth magnet part 526. Specifically, the fifth magnet part 525 is located between the first magnet part 521 and the sixth magnet part 526. In other words, the fifth magnet part 525 is located between the first surface 511 and the sixth magnet part 526. In the illustrated embodiment, the fifth magnet part 525 is located at a rear side of the sixth magnet part 526.

In the illustrated embodiment, the fifth magnet part 525 is spaced apart from the sixth magnet part 526. The fifth magnet part 525 is disposed to face the sixth magnet part 526 in an extending direction thereof, i.e., in the front-rear direction in the illustrated embodiment.

Alternatively, the fifth magnet part 525 may be in contact with the sixth magnet part 526. Even in the embodiment, the fifth magnet part 525 and the sixth magnet part 526 may be disposed to face each other in the extending direction, that is, in the front-rear direction in the illustrated embodiment.

The fifth magnet part 525 may be disposed to face the third magnet part 523. Specifically, the fifth magnet part 525 is disposed to face the third magnet part 523 in the horizontal direction, i.e., in the left-right direction in the illustrated embodiment, with the space portion 515 therebetween.

The fifth magnet part 525 extends in one direction, i.e., in the front-rear direction in the illustrated embodiment. That is, the extending direction of the fifth magnet part 525 forms a predetermined angle with respect to the extending direction of the first magnet part 521 or the second magnet part 522. In one embodiment, the fifth magnet part 525 may extend in a direction perpendicular to the first magnet part 521 or the second magnet part 522.

In one embodiment, the virtual straight line connecting the center of the fifth magnet part 525 in the longitudinal direction and the center of the fourth magnet part 524 in the longitudinal direction may pass through the central portion C of the space portion 515.

The fifth magnet part 525 includes a fifth facing surface 525*a* and a fifth opposing surface 525*b*.

The fifth facing surface 525*a* is defined as one side surface of the fifth magnet part 525 facing the sixth magnet part 526. In other words, the fifth facing surface 525*a* may be defined as one side surface of the fifth magnet part 525 facing the second surface 512.

The fifth opposing surface 525*b* is defined as the other side surface of the fifth magnet part 525 opposite to the sixth magnet part 526. In other words, the fifth opposing surface 525*b* may be defined as the other side surface of the fifth magnet part 525 facing the first surface 511.

The fifth facing surface 525*a* and the fifth opposing surface 525*b* are magnetized to different polarities. That is, the fifth facing surface 525*a* may be magnetized to one of an N pole and an S pole, and the fifth opposing surface 525*b* may be magnetized to the other one of the N pole and the S pole.

Accordingly, a magnetic field propagating from one of the fifth facing surface 525*a* and the fifth opposing surface 525*b* to the other one thereof is formed by the fifth magnet part 525 itself.

The polarity of the fifth facing surface 525*a* may be the same as the polarity of a sixth facing surface 526*a* of the sixth magnet part 526. Accordingly, magnetic fields that repel each other may be formed between the fifth magnet part 525 and the sixth magnet part 526.

The polarity of the fifth facing surface 525*a* may be different from the polarity of the first inner surface 521*a* of the first magnet part 521. Accordingly, a magnetic field propagating from one of the fifth magnet part 525 and the first magnet part 521 to the other one thereof is formed between the fifth magnet part 525 and the first magnet part 521.

The polarity of the fifth facing surface 525*a* may be different from the polarity of the second inner surface 522*a* of the second magnet part 522. Accordingly, a magnetic field propagating from one of the fifth magnet part 525 and the second magnet part 522 to the other one thereof is formed between the fifth magnet part 525 and the second magnet part 522.

In one embodiment, the fifth facing surface 525*a* may be located between the first surface 511 and the virtual straight line connecting the fixed contactors 220*a* and 220*b*. That is, the fifth facing surface 525*a* may be located to be biased to the first surface 511 with respect to the virtual straight line passing through the fixed contactors 220*a* and 220*b*.

The sixth magnet part 526 forms magnetic fields together with the first magnet part 521, the second magnet part 522, and the fifth magnet part 525. In addition, the sixth magnet part 526 may also form a magnetic field by itself.

In the illustrated embodiment, the sixth magnet part 526 is located on the inner side of the fourth surface 514. In addition, the sixth magnet part 526 is located on the inner side of the fourth surface 514 to be biased toward the second surface 512. That is, the sixth magnet part 526 is located more adjacent to the second surface 512 than the first surface 511.

The sixth magnet part 526 is disposed in parallel to the fifth magnet part 525. Specifically, the sixth magnet part 526 is located between the fifth magnet part 525 and the second magnet part 522. In other words, the sixth magnet part 526 is located between the fifth magnet part 525 and the second surface 512. In the illustrated embodiment, the sixth magnet part 526 is located at a front side of the fifth magnet part 525.

In the illustrated embodiment, the sixth magnet part 526 is spaced apart from the fifth magnet part 525. The sixth magnet part 526 is disposed to face the fifth magnet part 525 in an extending direction thereof, i.e., in the front-rear direction in the illustrated embodiment.

Alternatively, the sixth magnet part 526 may be in contact with the fifth magnet part 525. Even in the embodiment, the sixth magnet part 526 and the fifth magnet part 525 may be disposed to face each other in the extending direction, that is, in the front-rear direction in the illustrated embodiment.

The sixth magnet part 526 is disposed to face the fourth magnet part 524. Specifically, the sixth magnet part 526 is disposed to face the fourth magnet part 524 in the horizontal direction, i.e., in the left-right direction in the illustrated embodiment, with the space portion 515 therebetween.

The sixth magnet part 526 extends in one direction, i.e., in the front-rear direction in the illustrated embodiment. That is, the extending direction of the sixth magnet part 526 forms a predetermined angle with respect to the extending direction of the first magnet part 521 or the second magnet part 522. In one embodiment, the sixth magnet part 526 may extend in a direction perpendicular to the first magnet part 521 or the second magnet part 522.

In one embodiment, the virtual straight line connecting the center of the sixth magnet part 526 in the longitudinal direction and the center of the third magnet part 523 in the longitudinal direction may pass through the central portion C of the space portion 515.

The sixth magnet part 526 includes a sixth facing surface 526*a* and a sixth opposing surface 526*b*.

The sixth facing surface 526*a* is defined as one side surface of the sixth magnet part 526 facing the fifth magnet part 525. In other words, the sixth facing surface 526*a* may be defined as one side surface of the sixth magnet part 526 facing the first surface 511.

The sixth opposing surface 526*b* is defined as the other side surface of the sixth magnet part 526 opposite to the fifth magnet part 525. In other words, the sixth opposing surface 526*b* may be defined as the other side surface of the sixth magnet part 526 facing the second surface 512.

The sixth facing surface 526*a* and the sixth opposing surface 526*b* are magnetized to different polarities. That is, the sixth facing surface 526*a* may be magnetized to one of an N pole and an S pole, and the sixth opposing surface 526*b* may be magnetized to the other one of the N pole and the S pole.

Accordingly, a magnetic field propagating from one of the sixth facing surface 526*a* and the sixth opposing surface 526*b* to the other one thereof is formed by the sixth magnet part 526 itself.

The polarity of the sixth facing surface 526*a* may be the same as the polarity of the fifth facing surface 525*a* of the fifth magnet part 525. Accordingly, magnetic fields that repel each other are formed between the sixth magnet part 526 and the fifth magnet part 525.

The polarity of the sixth facing surface 526*a* may be different from the polarity of the first inner surface 521*a* of the first magnet part 521. Accordingly, a magnetic field propagating from one of the sixth magnet part 526 and the first magnet part 521 to the other one thereof is formed between the sixth magnet part 526 and the first magnet part 521.

The polarity of the sixth facing surface 526*a* may be different from the polarity of the second inner surface 522*a* of the second magnet part 522. Accordingly, a magnetic field propagating from one of the sixth magnet part 526 and the second magnet part 522 to the other one thereof is formed between the sixth magnet part 526 and the second magnet part 522.

In one embodiment, the sixth facing surface 526*a* may be located between the second surface 512 and the virtual straight line connecting the fixed contactors 220*a* and 220*b*. That is, the sixth facing surface 526*a* may be located to be biased to the second surface 512 with respect to the virtual straight line passing through the fixed contactors 220*a* and 220*b*.

(2) Description of Arc Path A.P Formed Arc Path Formation Unit 500 According to Fourth Embodiment of the Present Disclosure The arc path formation unit 500 according to the present embodiment forms magnetic fields inside the arc chamber 21.

When the fixed contactor 22 and the movable contactor 43 come into contact with each other in a state in which the magnetic fields are formed, and current flows therethrough, an electromagnetic force is generated according to the Fleming's left-hand rule.

An arc path A.P, which is a path through which an arc generated as the fixed contactor 22 and the movable contactor 43 are separated from each other, may be formed by the electromagnetic force. The generated arc may be induced in a direction opposite to the central portion C of the direct current relay 1.

Accordingly, a situation in which each constituent element provided in the direct current relay 1 is damaged by the generated arc can be prevented.

Hereinafter, the arc path A.P formed by the arc path formation unit 500 according to the present embodiment will be described in detail with reference to FIGS. 20 and 21.

Figure 20:
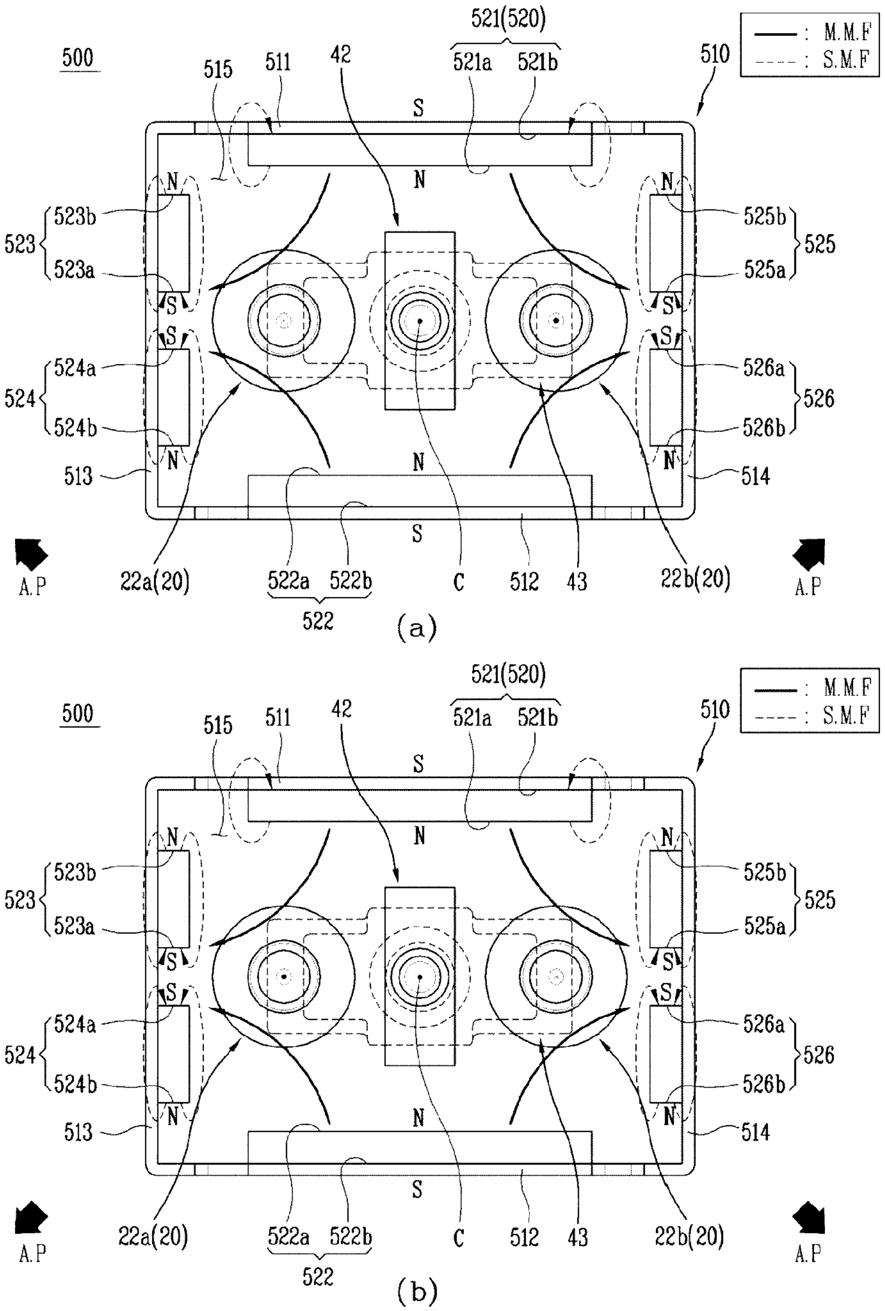
FIGS. 20 and 21 are conceptual views illustrating arc paths formed by the arc path formation unit of FIG. 19.
Figure 21:
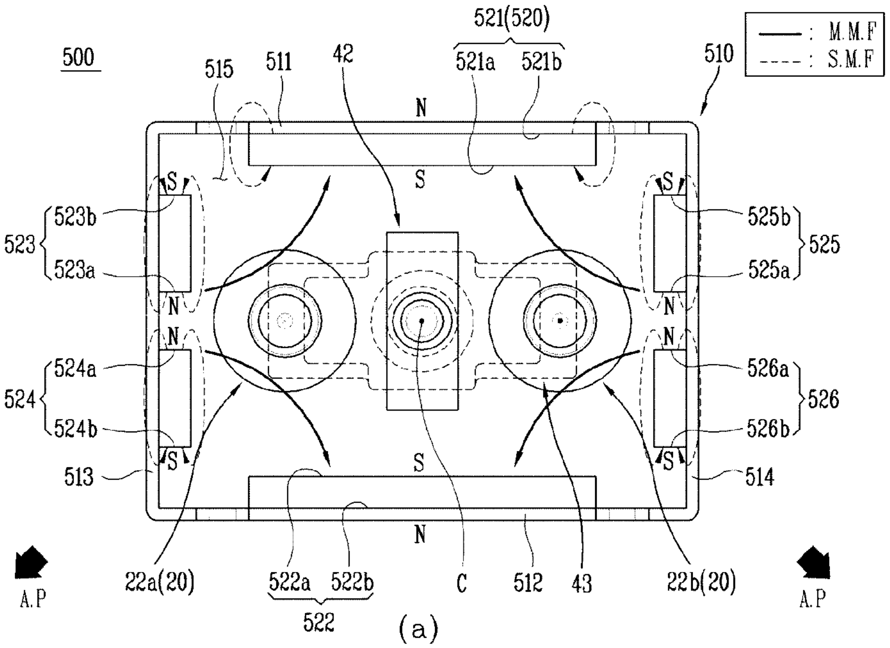
Figure 21:
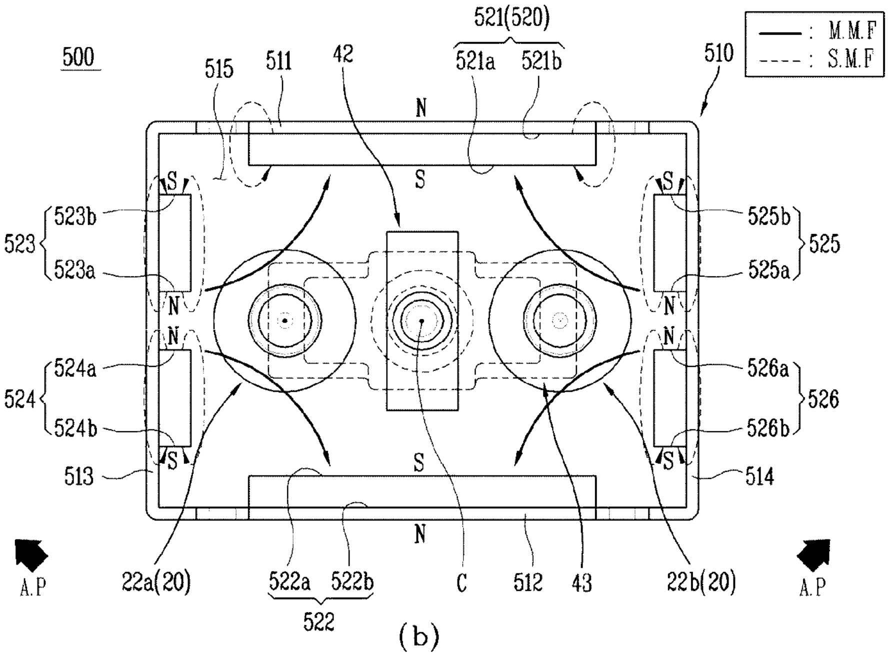

In FIGS. 20 and 21, the symbol "x" shown in each of the fixed contactors 220*a* and 220*b* means a direction in which current flows from the fixed contactors 220*a* and 220*b* toward the movable contactor 43 (i.e., the downward direction), that is, a direction in which the current flows into the ground.

Further, in FIGS. 20 and 21, the symbol "⊙" shown in each of the fixed contactors 220*a* and 220*b* means a direction in which current flows from the movable contactor 43 toward the fixed contactors 220*a* and 220*b* (i.e., the upward direction), that is, a direction in which the current flows from the ground.

A flowing direction of current in FIGS. 20A and 21A is a direction in which the current flows into the first fixed contactor 22*a* and flows out through the second fixed contactor 22*b* via the movable contactor 43.

Further, a flowing direction of current in FIGS. 20B and 21B is a direction in which the current flows into the second fixed contactor 22*b* and flows out through the first fixed contactor 22*a* via the movable contactor 43.

Referring to FIG. 20, the first inner surface 521*a* and the second inner surface 522*a* are magnetized to N poles. In addition, the third to sixth facing surfaces 523*a*, 524*a*, 525*a*, and 526*a* are magnetized to S poles.

As is known, a magnetic field is formed in a direction in which the magnetic field diverges from an N pole and converges to an S pole.

Accordingly, main magnetic fields M.M.F formed between the first and second magnet parts 521 and 522 and the third and fourth magnet parts 523 and 524 are formed in directions from the first and second inner surfaces 521*a* and 522*a* toward the third and fourth facing surfaces 523*a* and 524*a*.

Further, main magnetic fields M.M.F formed between the first and second magnet parts 521 and 522 and the fifth and sixth magnet parts 525 and 526 are formed in directions from the first and second inner surfaces 521*a* and 522*a* toward the fifth and sixth facing surfaces 525*a* and 526*a*.

In this case, the first magnet part 521 forms a sub magnetic field S.M.F in a direction from the first inner surface 521*a* toward the first outer surface 521*b*. The second magnet part 522 forms a sub magnetic field S.M.F in a direction from the second inner surface 522*a* toward the second outer surface 522*b*.

Further, the third to sixth magnet parts 523 to 526 form sub magnetic fields S.M.F in directions from the opposing surfaces 523*b*, 524*b*, 525*b*, and 526*b* toward the facing surfaces 523*a*, 524*a*, 525*a*, and 526*a*, respectively.

By the formed main magnetic fields M.M.F and sub magnetic fields S.M.F, in the embodiment illustrated in FIG. 20A, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 20B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Referring to FIG. 21, the first inner surface 521*a* and the second inner surface 522*a* are magnetized to S poles. In addition, the third to sixth facing surfaces 523*a*, 524*a*, 525*a*, and 526*a* are magnetized to N poles.

Accordingly, main magnetic fields M.M.F formed between the first and second magnet parts 521 and 522 and the third and fourth magnet parts 523 and 524 are formed in directions from the third and fourth facing surfaces 523*a* and 524*a* toward the first and second inner surfaces 521*a* and 522*a*.

Further, main magnetic fields M.M.F formed between the first and second magnet parts 521 and 522 and the fifth and sixth magnet parts 525 and 526 are formed in directions from the fifth and sixth facing surfaces 525*a* and 526*a* toward the first and second inner surfaces 521*a* and 522*a*.

In this case, the first magnet part 521 forms a sub magnetic field S.M.F in a direction from the first outer surface 521*b* toward the first inner surface 521*a*. The second magnet part 522 forms a sub magnetic field S.M.F in a direction from the second outer surface 522*b* toward the second inner surface 522*a*.

Further, the third to sixth magnet parts 523 to 526 form sub magnetic fields S.M.F in directions from the facing surfaces 523*a*, 524*a*, 525*a*, and 526*a* toward the opposing surfaces 523*b*, 524*b*, 525*b*, and 526*b*, respectively.

By the formed main magnetic fields M.M.F and sub magnetic fields S.M.F, in the embodiment illustrated in FIG. 21A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 21B, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

In the present embodiment, the arc path A.P formed by the arc path formation unit 500 does not extend toward the central portion C. Accordingly, damage to constituent elements disposed in the central portion C can be prevented.

5. Description of Arc Path Formation Unit 600 According to Fifth Embodiment of Present Disclosure Hereinafter, an arc path formation unit 600 according to fifth embodiment of the present disclosure will be described in detail with reference to FIGS. 22 to 39.

(1) Description of Configuration of Arc Path Formation Unit 600 According to Fifth Embodiment of Present Disclosure Referring to FIGS. 22 to 27, the arc path formation unit 600 includes a magnet frame 610 and a magnet part 620.

The magnet frame 610 according to the present embodiment has the same structure and function as the magnet frame 510 of the above-described embodiment. Accordingly, a description of the magnet frame 610 will be replaced with the description of the above-described magnet frame 510.

In addition, the magnet part 620 according to the present embodiment has the same function as the magnet part 520 of the above-described embodiment. However, there are some differences in the number and arrangement method of magnet parts 621, 622, 623, and 624.

Accordingly, in the following description, a difference between the magnet part 620 according to the present embodiment and the magnet part 520 according to the above-described embodiment will be mainly described.

Figure 22:
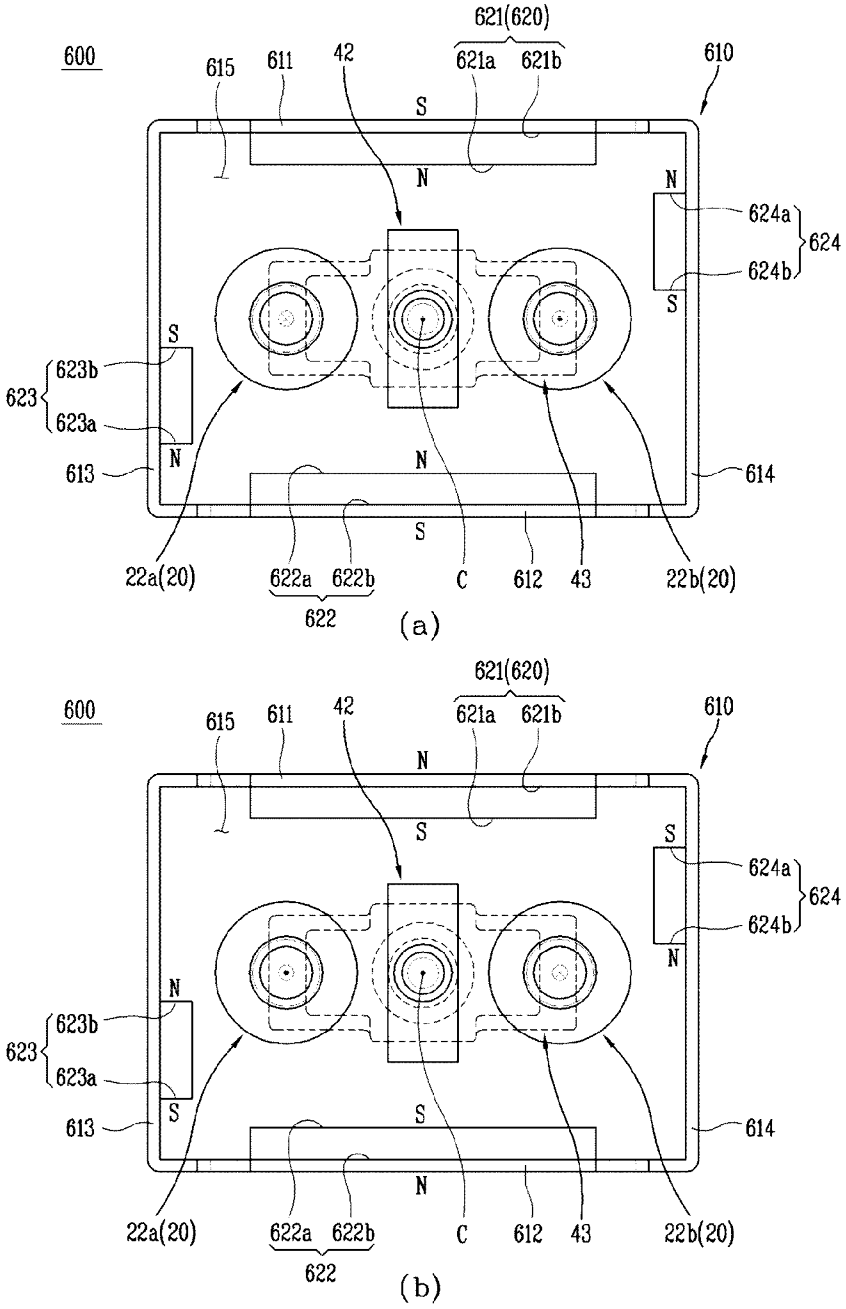
FIGS. 22 and 23 are conceptual views illustrating an arc path formation unit according to a fifth embodiment of the present disclosure.
Figure 23:
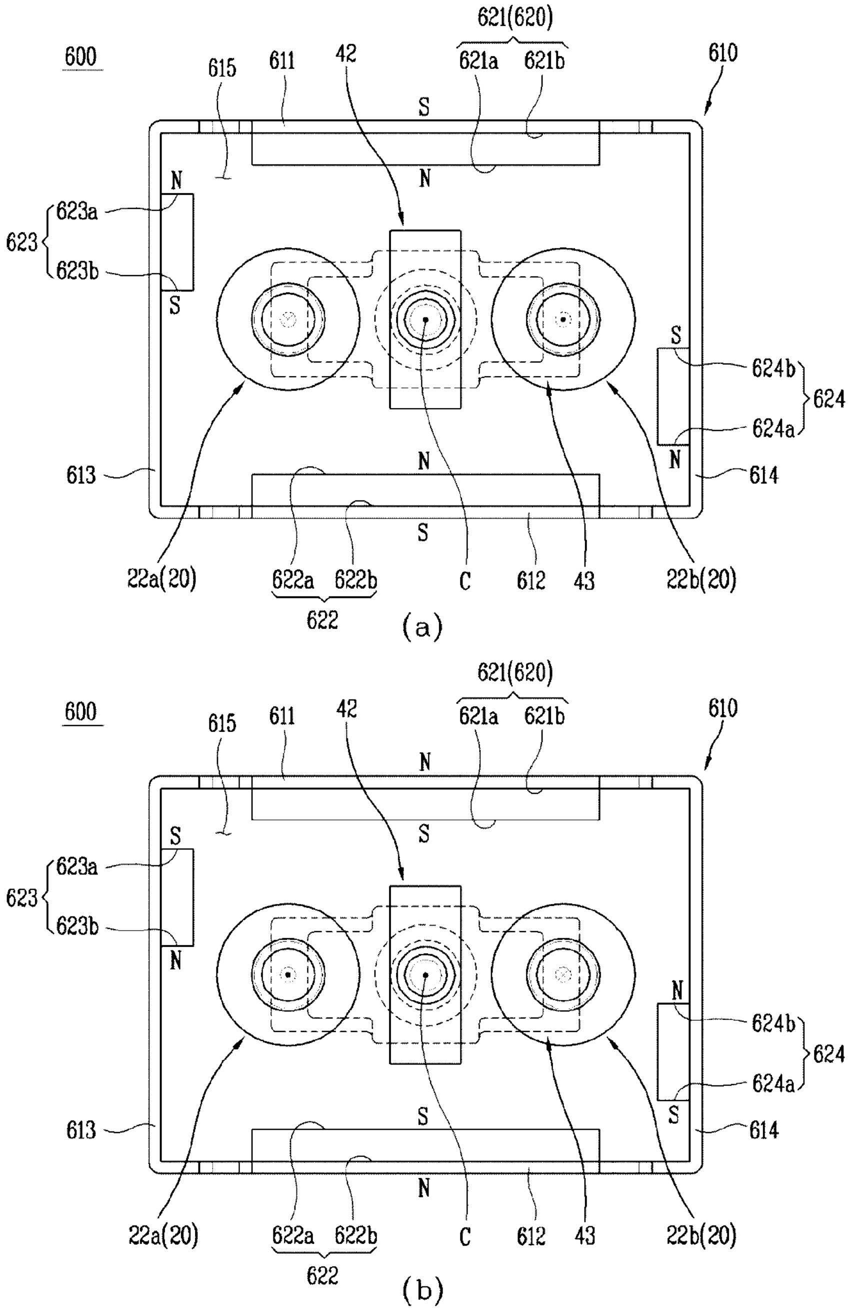

In the embodiment illustrated in FIGS. 22 and 23, the magnet part 620 includes a first magnet part 621, a second magnet part 622, a third magnet part 623, and a fourth magnet part 624.

The first magnet part 621 has the same structure, arrangement method, and function as the first magnet part 521 of the above-described embodiment. In addition, the second magnet part 622 has the same structure, arrangement method, and function as the second magnet part 522 of the above-described embodiment. That is, a first inner surface 621*a* of the first magnet part 621 and a second inner surface 622*a* of the second magnet part 622 are magnetized to the same polarity.

However, the present embodiment is partially different from the above-described embodiment in that the first and second magnet parts 621 and 622 form main magnetic fields M.M.F together with the third and fourth magnet parts 623 and 624

The third magnet part 623 has the same structure as the third magnet part 523 of the above-described embodiment. However, the third magnet part 623 is partially different from the third magnet part 523 of the above-described embodiment in the arrangement method.

That is, the third magnet part 623 is located on an inner side of a third surface 613 to be more adjacent to any one surface of a first surface 611 and a second surface 612.

In the present embodiment, the third magnet part 623 includes a third facing surface 623*a* and a third opposing surface 623*b*.

At this time, the third facing surface 623*a* may be defined as one side surface facing the surface to which the third magnet part 623 is located adjacent, that is, the any one surface of the first surface 611 and the second surface 612. In addition, the third opposing surface 623*b* may be defined as the other side surface that faces a surface opposite to the third facing surface 623*a*, that is, the other surface of the first surface 611 and the second surface 612.

The third facing surface 623*a* is magnetized to the same polarity as the first and second inner surfaces 621*a* and 622*a*. In addition, the third opposing surface 623*b* is magnetized to a polarity different from those of the first and second inner surfaces 621*a* and 622*a*.

Accordingly, a magnetic field in a direction from one of the third facing surface 623*a* and the first and second inner surfaces 621*a* and 622*a* to the other one thereof is formed between the third facing surface 623*a* and the first and second inner surfaces 621*a* and 622*a*. In addition, magnetic fields that repel each other are formed between the third opposing surface 623*b* and the first and second inner surfaces 621*a* and 622*a*.

The fourth magnet part 624 has the same structure as the fourth magnet part 524 of the above-described embodiment. However, the fourth magnet part 624 is partially different from the fourth magnet part 524 of the above-described embodiment in the arrangement method.

That is, the fourth magnet part 624 is located on an inner side of a fourth surface 614 to be more adjacent to the other surface of the first surface 611 and the second surface 612, wherein the other surface is a surface other than the surface to which the third magnet part 623 is located adjacent.

In other words, the third magnet part 623 and the fourth magnet part 624 are located alternately adjacent to the first surface 611 and the second surface 612.

In the present embodiment, the fourth magnet part 624 includes a fourth facing surface 624*a* and a fourth opposing surface 624*b*.

At this time, the fourth facing surface 624*a* may be defined as one side surface facing the surface to which the fourth magnet part 624 is located adjacent, that is, the any one surface of the first surface 611 and the second surface 612. In addition, the fourth opposing surface 624*b* may be defined as the other side surface that faces a surface opposite to the fourth facing surface 624*a*, that is, the other surface of the first surface 611 and the second surface 612.

The fourth facing surface 624*a* is magnetized to the same polarity as the first and second inner surfaces 621*a* and 622*a*. In addition, the fourth opposing surface 624*b* is magnetized to a polarity different from those of the first and second inner surfaces 621*a* and 622*a*.

Accordingly, a magnetic field in a direction from one of the fourth facing surface 624*a* and the first and second inner surfaces 621*a* and 622*a* to the other one thereof is formed between the fourth facing surface 624*a* and the first and second inner surfaces 621*a* and 622*a*. In addition, magnetic fields that repel each other are formed between the fourth opposing surface 624*b* and the first and second inner surfaces 621*a* and 622*a*.

In the embodiment illustrated in FIG. 22, the third magnet part 623 is located on the inner side of the third surface 613 to be biased toward the second surface 612. That is, the third magnet part 623 is located more adjacent to the second surface 612 than the first surface 611.

In one embodiment, the third opposing surface 623*b* may be located between the second surface 612 and the virtual straight line connecting the fixed contactors 220*a* and 220*b*. In other words, the third opposing surface 623*b* is located to be more biased to the second surface 612 on the basis of the virtual straight line connecting the fixed contactors 220*a* and 220*b*.

At this time, the fourth magnet part 624 is located on the inner side of the fourth surface 614 to be biased toward the first surface 611. That is, the fourth magnet part 624 is located more adjacent to the first surface 611 than the second surface 612.

In one embodiment, the fourth opposing surface 624*b* may be located between the first surface 611 and the virtual straight line connecting the fixed contactors 220*a* and 220*b*. In other words, the fourth opposing surface 624*b* is located to be more biased to the first surface 611 on the basis of the virtual straight line connecting the fixed contactors 220*a* and 220*b*.

In the embodiment illustrated in FIG. 23, the third magnet part 623 is located on the inner side of the third surface 613 to be biased toward the first surface 611. That is, the third magnet part 623 is located more adjacent to the first surface 611 than the second surface 612.

In one embodiment, the third opposing surface 623*b* may be located between the first surface 611 and the virtual straight line connecting the fixed contactors 220*a* and 220*b*. In other words, the third opposing surface 623*b* is located to be more biased to the first surface 611 on the basis of the virtual straight line connecting the fixed contactors 220*a* and 220*b*.

At this time, the fourth magnet part 624 is located on the inner side of the fourth surface 614 to be biased toward the second surface 612. That is, the fourth magnet part 624 is located more adjacent to the second surface 612 than the first surface 611.

In one embodiment, the fourth opposing surface 624*b* may be located between the second surface 612 and the virtual straight line connecting the fixed contactors 220*a* and 220*b*. In other words, the fourth opposing surface 624*b* is located to be more biased to the second surface 612 on the basis of the virtual straight line connecting the fixed contactors 220*a* and 220*b*.

In this case, the first inner surface 621*a*, the second inner surface 622*a*, the third facing surface 623*a*, and the fourth facing surface 624*a* may be magnetized to the same polarity. Similarly, a first outer surface 621*b*, a second outer surface 622*b*, the third opposing surface 623*b*, and the fourth opposing surface 624*b* may be magnetized to the same polarity.

Accordingly, a magnetic field in a direction from one of the first and second inner surfaces 621*a* and 622*a* and the third and fourth opposing surfaces 623*b* and 624*b* toward the other one thereof is formed between the first and second inner surfaces 621*a* and 622*a* and the third and fourth opposing surfaces 623*b* and 624*b*.

Referring to FIGS. 24 to 27, an arc path formation unit 600 including a magnet part 630 according to a modified example of the present embodiment is illustrated.

In the modified example of the present embodiment, there are some differences in the number and arrangement method of the magnet part 630 as compared with the magnet part 620 according to the above-described embodiment.

That is, in the embodiment illustrated in FIGS. 24 to 27, the magnet part 630 includes a first magnet part 631, a second magnet part 632, and a third magnet part 633.

The first magnet part 631 has the same structure, arrangement method, and function as the first magnet part 621 of the above-described embodiment. In addition, the second magnet part 632 has the same structure, arrangement method, and function as second magnet part 622 of the above-described embodiment. That is, a first inner surface 631*a* of the first magnet part 631 and a second inner surface 632*a* of the second magnet part 632 are magnetized to the same polarity.

However, the present embodiment is partially different from the above-described embodiment in that the first and second magnet parts 631 and 632 form main magnetic fields M.M.F together with the third magnet part 633

The third magnet part 633 has the same structure as the third magnet part 623 of the above-described embodiment. However, the third magnet part 633 is partially different from the third magnet part 623 of the above-described embodiment in the arrangement method.

That is, the third magnet part 633 is located on the inner side of the third surface 613 or the fourth surface 614 to be more adjacent to any one surface of the first surface 611 and the second surface 612.

In the present embodiment, the third magnet part 633 includes a third facing surface 633*a* and a third opposing surface 633*b*.

At this time, the third facing surface 633*a* may be defined as one side surface facing the surface to which the third magnet part 633 is located adjacent, that is, the any one surface of the first surface 611 and the second surface 612. In addition, the third opposing surface 633*b* may be defined as the other side surface that faces a surface opposite to the third facing surface 633*a*, that is, the other one of the first surface 611 and the second surface 612.

The third facing surface 633*a* is magnetized to the same polarity as the first and second inner surfaces 631*a* and 632*a*. In addition, the third opposing surface 633*b* is magnetized to a polarity different from those of the first and second inner surfaces 631*a* and 632*a*.

Accordingly, a magnetic field formed between the third opposing surface 633*b* and the first and second inner surfaces 631*a* and 632*a* is formed in a direction from one of the third opposing surface 633*b* and the first and second inner surfaces 631*a* and 632*a* toward the other one thereof.

At this time, the third opposing surface 633*b* is located to be biased to one surface of the first surface 611 and the second surface 612, wherein the one surface is the surface to which the third magnet part 633 is located more adjacent.

In other words, the third opposing surface 633*b* is located to be more biased to the second surface 612 on the basis of the virtual straight line connecting the fixed contactors 220*a* and 220*b*. That is, the third opposing surface 633*b* is located between the virtual straight line connecting the fixed contactors 220*a* and 220*b* and the surface to which the third magnet part 633 is located more adjacent.

Figure 24:
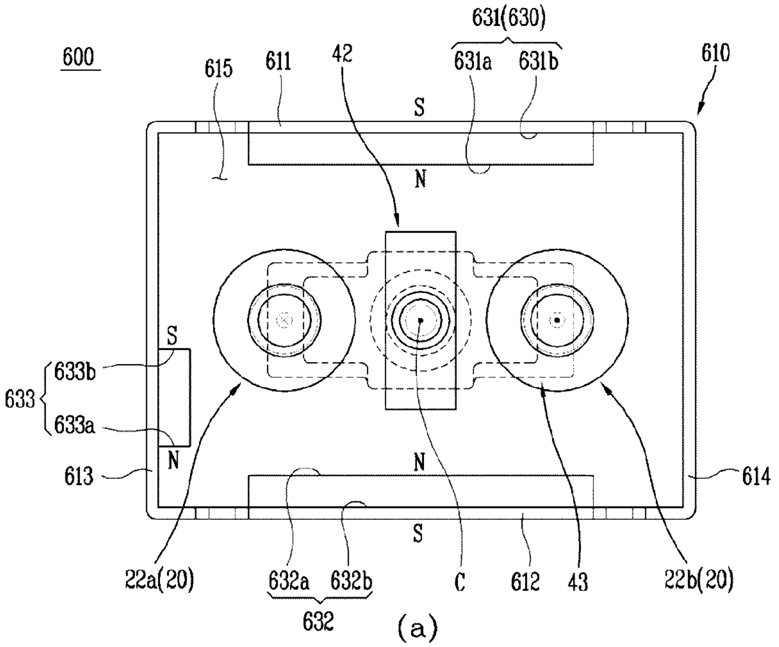
FIGS. 24 to 27 are conceptual views illustrating modified examples of the arc path formation unit according to the fifth embodiment of the present disclosure.
Figure 24:
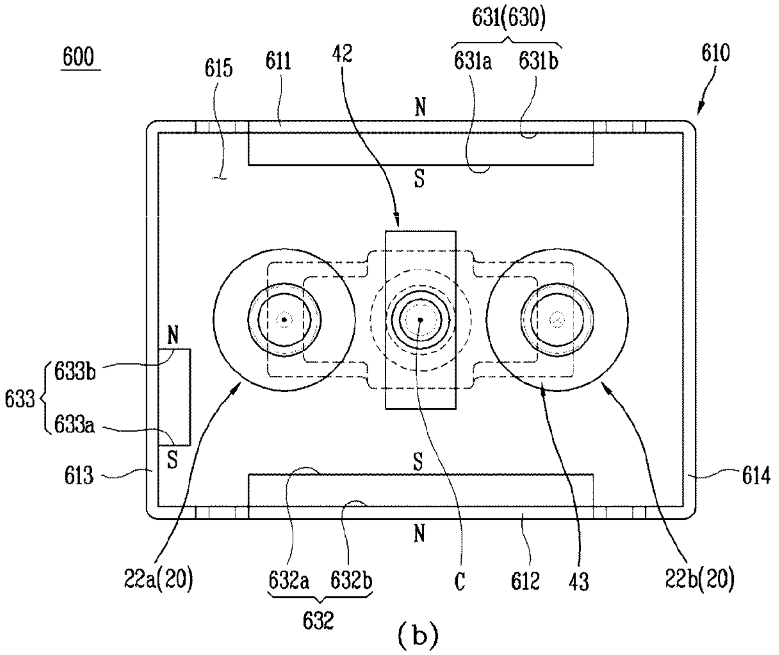

In the embodiment illustrated in FIG. 24, the third magnet part 633 is located on the inner side of the third surface 613. In addition, the third magnet part 633 is located to be biased to the second surface 612, that is, to be more adjacent to the second surface 612. In the embodiment, the third opposing surface 633*b* may be located between the second surface 612 and the virtual straight line connecting the fixed contactors 220*a* and 220*b*.

Figure 25:
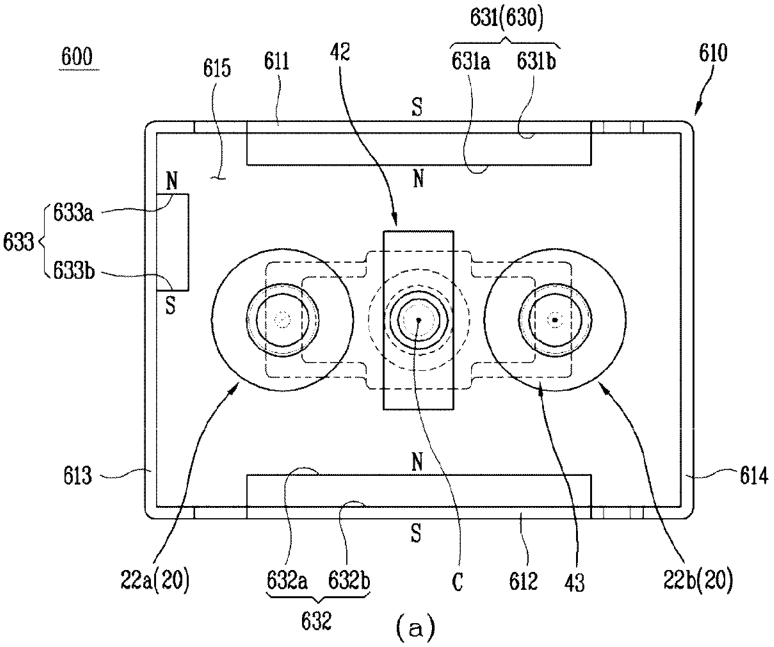
Figure 25:
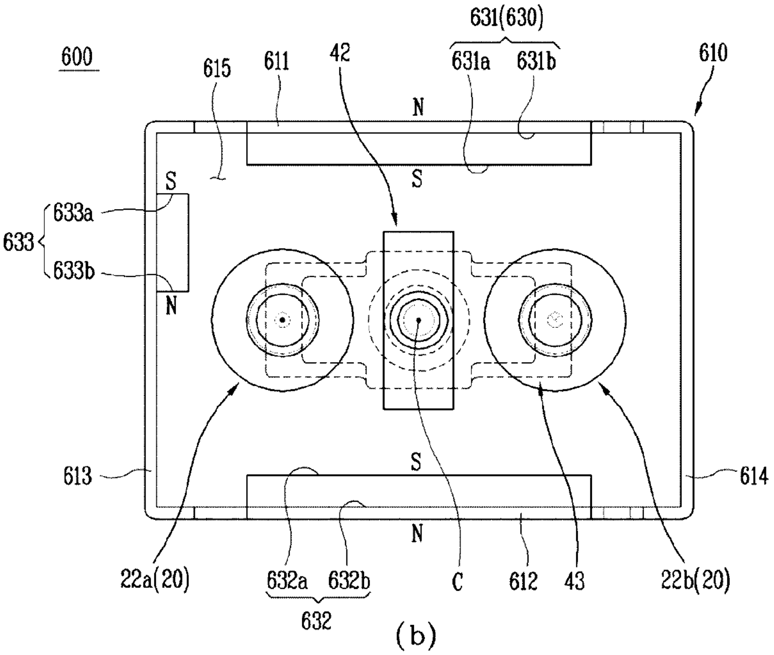

In the embodiment illustrated in FIG. 25, the third magnet part 633 is located on the inner side of the third surface 613. In addition, the third magnet part 633 is located to be biased to the first surface 611, that is, to be more adjacent to the first surface 611.

In the embodiment, the third opposing surface 633*b* may be located between the first surface 611 and the virtual straight line connecting the fixed contactors 220*a* and 220*b*.

Figure 26:
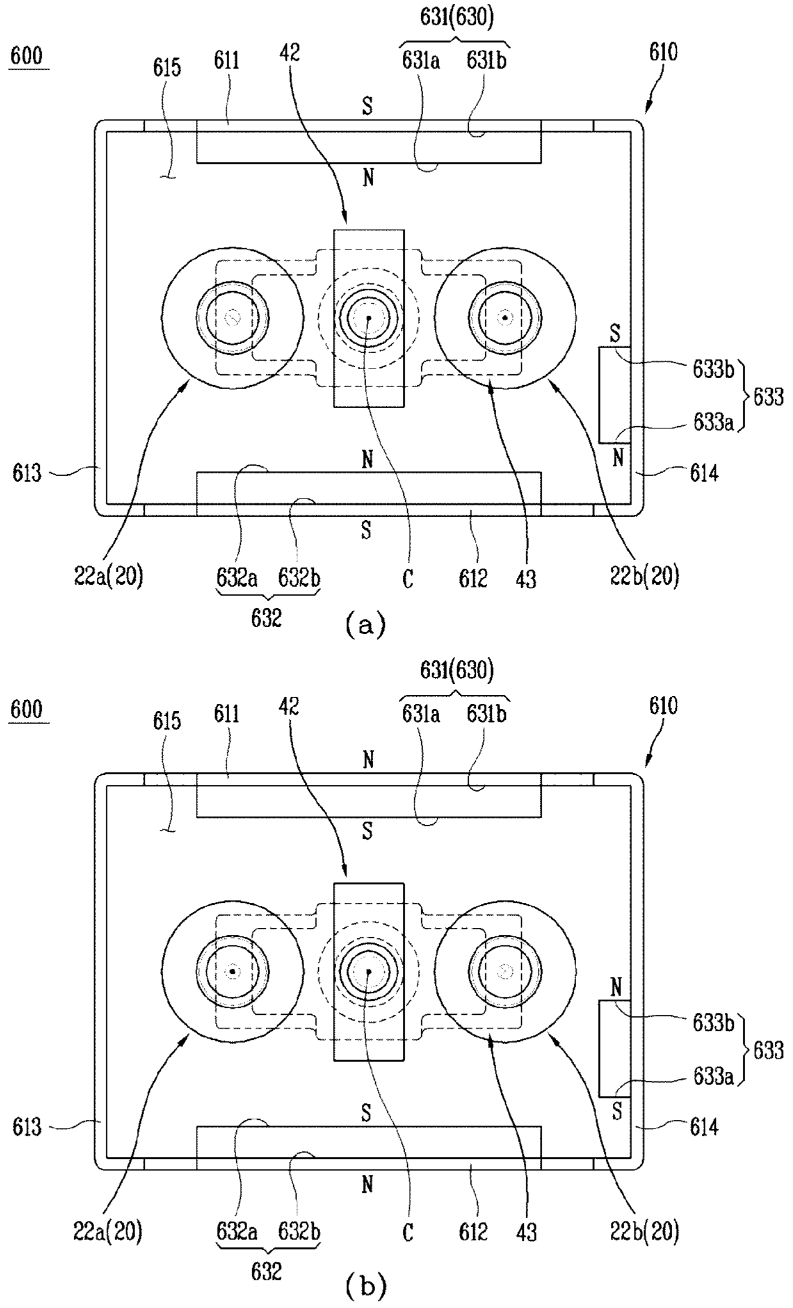

In the embodiment illustrated in FIG. 26, the third magnet part 633 is located on the inner side of the fourth surface 614. In addition, the third magnet part 633 is located to be biased to the second surface 612, that is, to be more adjacent to the second surface 612. In the embodiment, the third opposing surface 633*b* may be located between the second surface 612 and the virtual straight line connecting the fixed contactors 220*a* and 220*b*.

Figure 27:
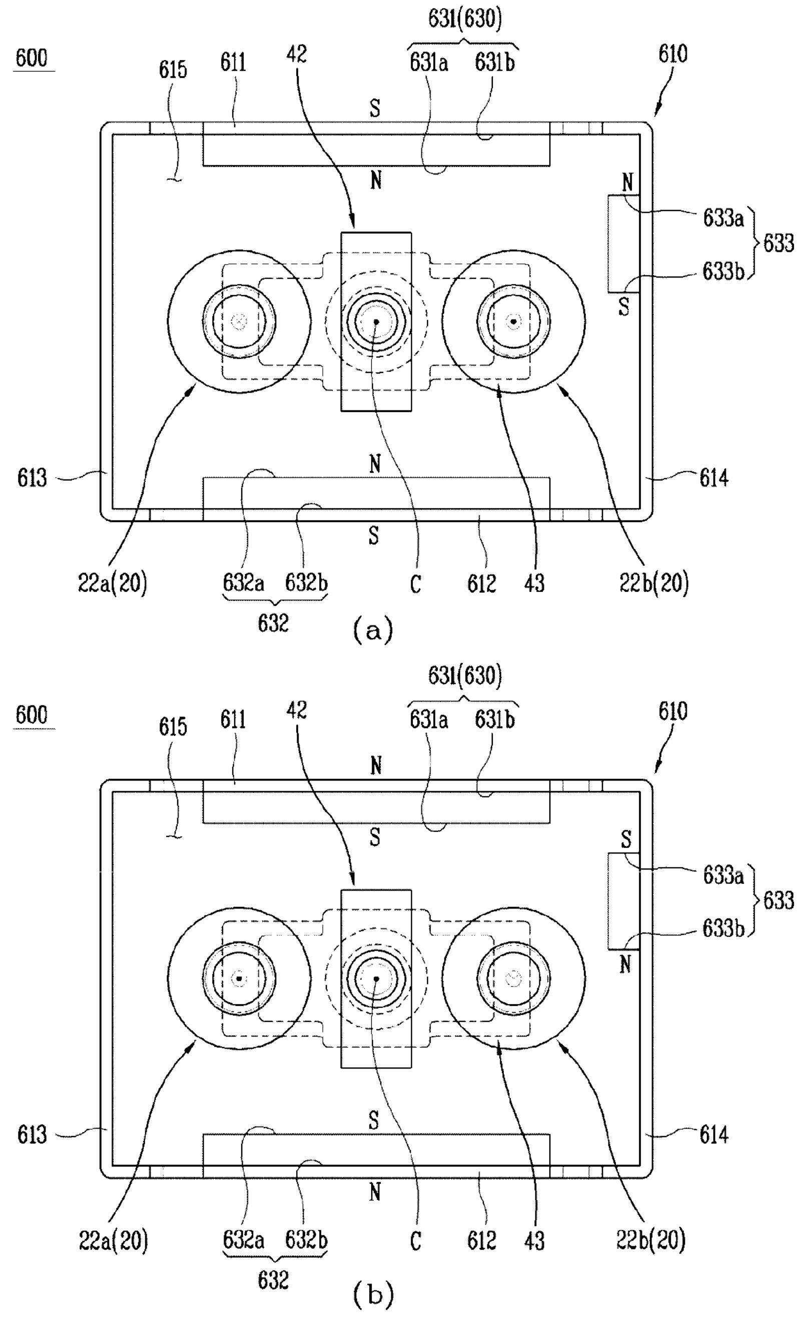

In the embodiment illustrated in FIG. 27, the third magnet part 633 is located on the inner side of the fourth surface 614. In addition, the third magnet part 633 is located to be biased to the first surface 611, that is, to be more adjacent to the first surface 611.

In the embodiment, the third opposing surface 633*b* may be located between the first surface 611 and the virtual straight line connecting the fixed contactors 220*a* and 220*b*.

In the present embodiment, the first inner surface 631*a*, the second inner surface 632*a*, and the third facing surface 633*a* may be magnetized to the same polarity. Similarly, a first outer surface 631*b*, a second outer surface 632*b*, and the third opposing surface 633*b* may be magnetized to the same polarity.

Accordingly, a magnetic field in a direction from one of the first and second inner surfaces 631*a* and 632*a* and the third opposing surface 633*b* toward the other one thereof is formed between the first and second inner surfaces 631*a* and 632*a* and the third opposing surface 633*b*.

(2) Description of Arc Path A.P Formed Arc Path Formation Unit 600 According to Fifth Embodiment of the Present Disclosure Hereinafter, an arc path A.P formed by the arc path formation unit 600 according to the present embodiment will be described in detail with reference to FIGS. 28 to 39.

In FIGS. 28 to 39, the symbol "x" shown in each of the fixed contactors 220*a* and 220*b* means a direction in which current flows from the fixed contactors 220*a* and 220*b* toward the movable contactor 43 (i.e., the downward direction), that is, a direction in which the current flows into the ground.

Further, in FIGS. 28 to 39, the symbol "O" shown in each of the fixed contactors 220*a* and 220*b* means a direction in which current flows from the movable contactor 43 toward the fixed contactors 220*a* and 220*b* (i.e., the upward direction), that is, a direction in which the current flows from the ground.

A flowing direction of current in FIGS. 28A to 39A is a direction in which the current flows into the first fixed contactor 22*a* and flows out through the second fixed contactor 22*b* via the movable contactor 43.

Further, a flowing direction of current in FIGS. 28B to 39B is a direction in which the current flows into the second fixed contactor 22*b* and flows out through the first fixed contactor 22*a* via the movable contactor 43.

Figure 28:
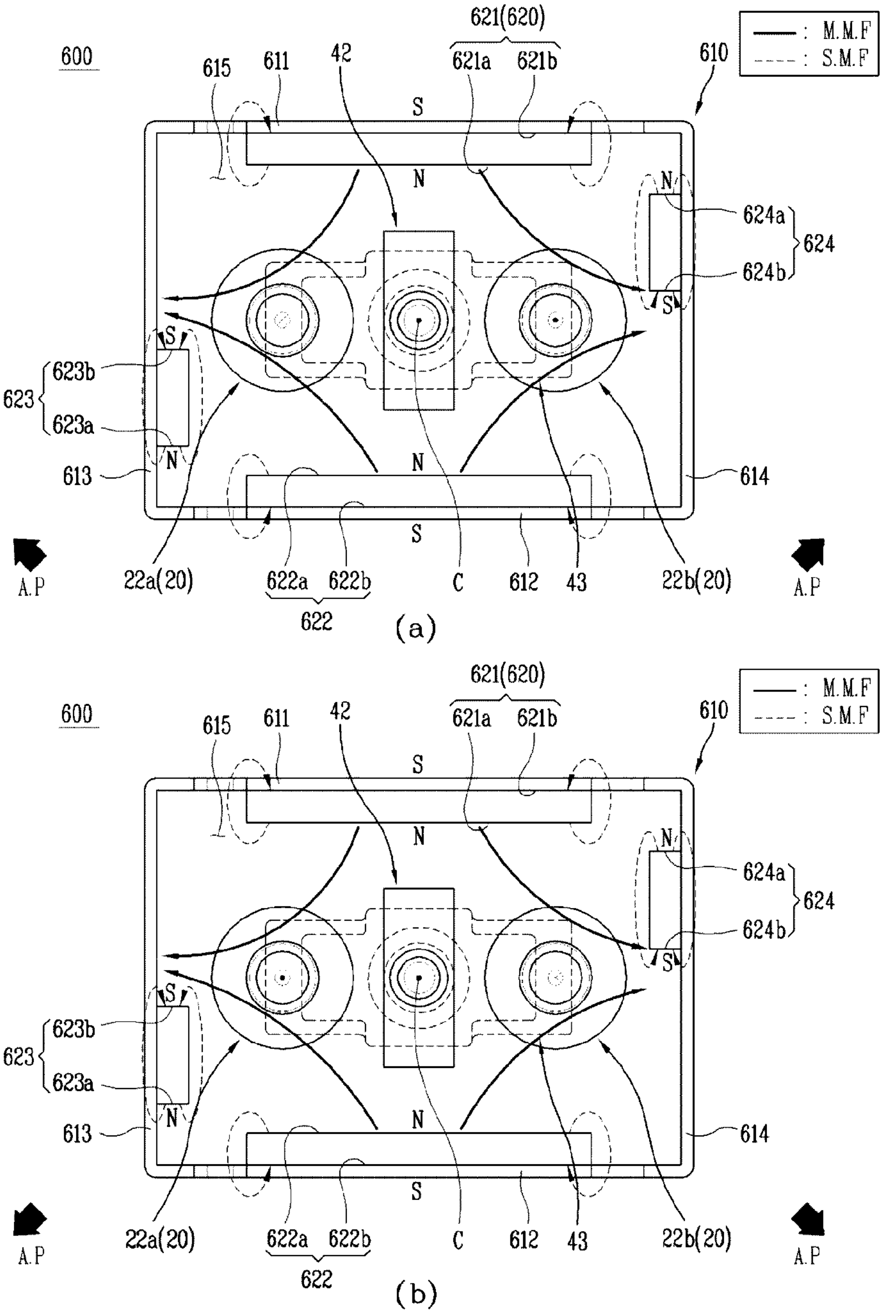
FIGS. 28 and 29 are conceptual views illustrating arc paths formed by the arc path formation unit of FIG. 22.

Referring to FIG. 28, the first inner surface 621*a* and the second inner surface 622*a* are magnetized to N poles. In addition, the third opposing surface 623*b* and the fourth opposing surface 624*b* are magnetized to S poles.

Accordingly, main magnetic fields M.M.F formed between the first and second magnet parts 621 and 622 and the third magnet part 623 are formed in directions from the first and second inner surfaces 621*a* and 622*a* toward the third opposing surface 623*b*.

Further, main magnetic fields M.M.F formed between the first and second magnet parts 621 and 622 and the fourth magnet part 624 are formed in directions from the first and second inner surfaces 621*a* and 622*a* toward the fourth opposing surface 624*b*.

In this case, the first magnet part 621 forms a sub magnetic field S.M.F in a direction from the first inner surface 621*a* toward the first outer surface 621*b*. The second magnet part 622 forms a sub magnetic field S.M.F in a direction from the second inner surface 622*a* toward the second outer surface 622*b*.

Further, the third and fourth magnet parts 623 and 624 form sub magnetic fields S.M.F in directions from the facing surfaces 623*a* and 624*a* toward the opposing surfaces 623*b* and 624*b*, respectively.

By the formed main magnetic fields M.M.F and sub magnetic fields S.M.F, in the embodiment illustrated in FIG. 28A, an electromagnetic force in a direction toward the rear left side is generated in the vicinity of the first fixed contactor 22*a*. An arc path A.P is formed toward the rear left side along the direction of the electromagnetic force. Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 28B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Figure 29:
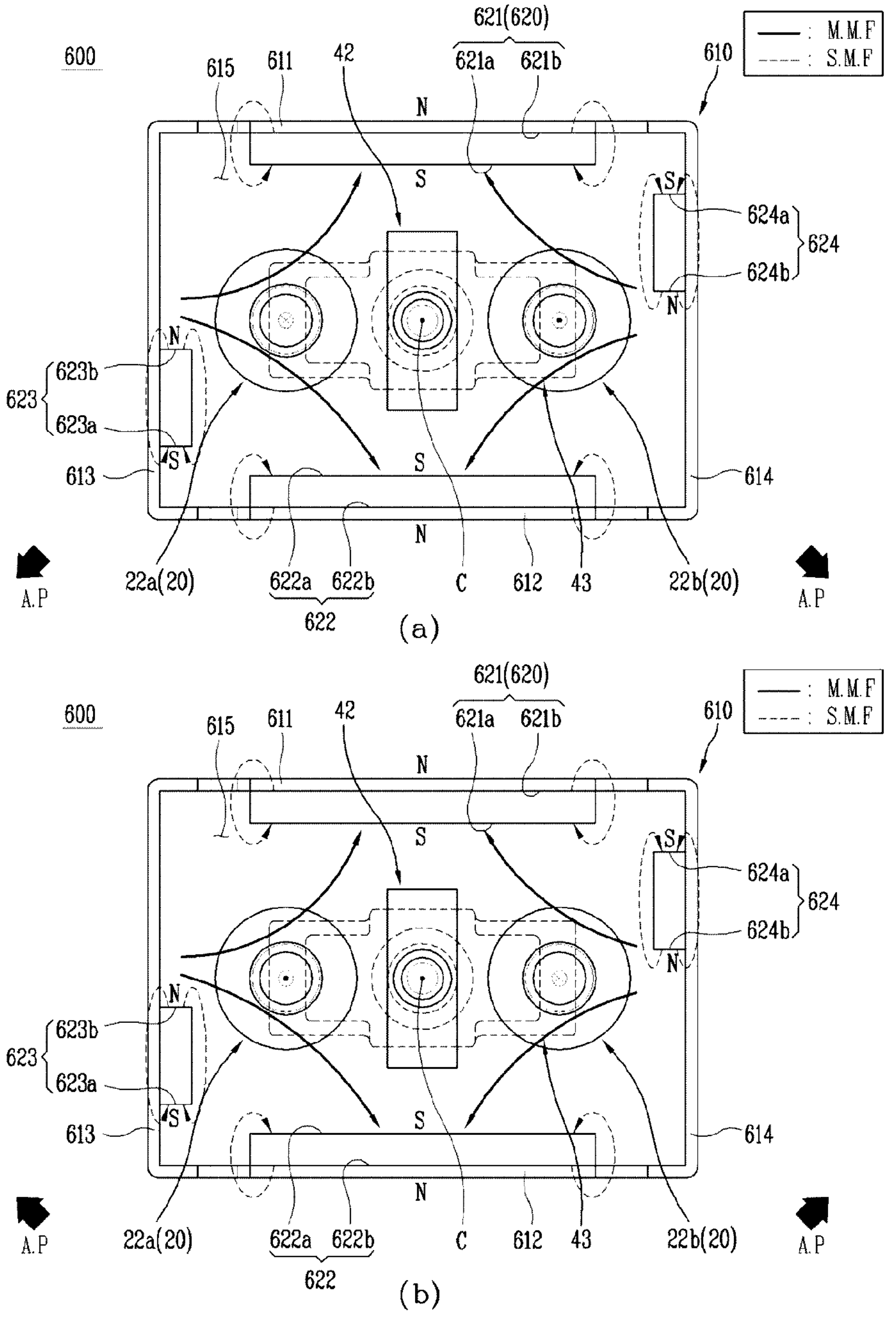

Referring to FIG. 29, the first inner surface 621*a* and the second inner surface 622*a* are magnetized to S poles. In addition, the third opposing surface 623*b* and the fourth opposing surface 624*b* are magnetized to N poles.

Accordingly, main magnetic fields M.M.F formed between the first and second magnet parts 621 and 622 and the third magnet part 623 are formed in directions from the third opposing surface 623*b* toward the first and second inner surfaces 621*a* and 622*a*.

Further, main magnetic fields M.M.F formed between the first and second magnet parts 621 and 622 and the fourth magnet part 624 are formed in directions from the fourth opposing surface 624*b* toward the first and second inner surfaces 621*a* and 622*a*.

In this case, the first magnet part 621 forms a sub magnetic field S.M.F in a direction from the first outer surface 621*b* toward the first inner surface 621*a*. The second magnet part 622 forms a sub magnetic field S.M.F in a direction from the second outer surface 622*b* toward the second inner surface 622*a*.

Further, the third and fourth magnet parts 623 and 624 form sub magnetic fields S.M.F in directions from the opposing surfaces 623*b* and 624*b* toward the facing surfaces 623*a* and 624*a*, respectively.

By the formed main magnetic fields M.M.F and sub magnetic fields S.M.F, in the embodiment illustrated in FIG. 29A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 29B, electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Figure 30:
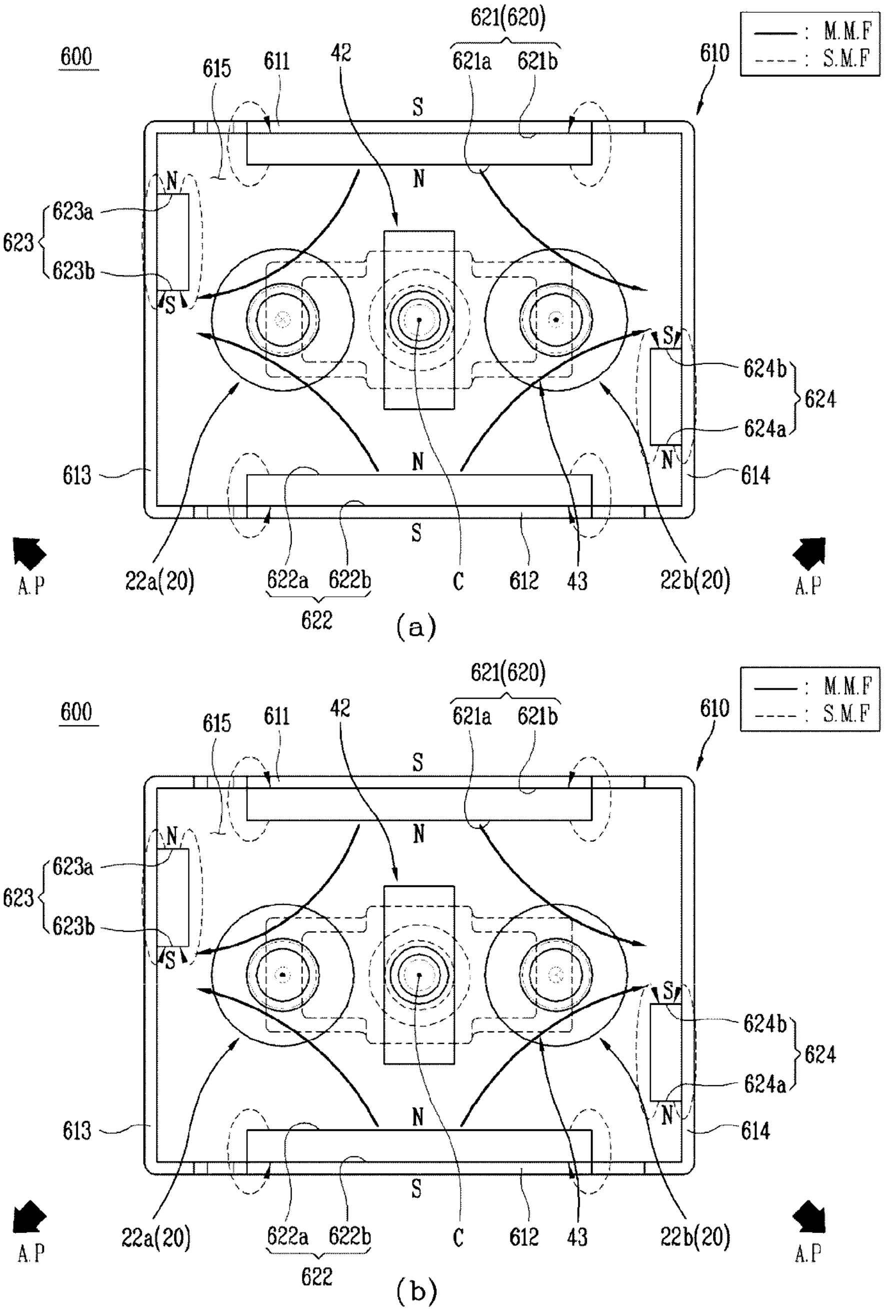
FIGS. 30 and 31 are conceptual views illustrating arc paths formed by the arc path formation unit of FIG. 23.

Referring to FIG. 30, the first inner surface 621*a* and the second inner surface 622*a* are magnetized to N poles. In addition, the third opposing surface 623*b* and the fourth opposing surface 624*b* are magnetized to S poles.

Accordingly, main magnetic fields M.M.F formed between the first and second magnet parts 621 and 622 and the third magnet part 623 are formed in directions from the first and second inner surfaces 621*a* and 622*a* toward the third opposing surface 623*b*.

Further, main magnetic fields M.M.F formed between the first and second magnet parts 621 and 622 and the fourth magnet part 624 are formed in directions from the first and second inner surfaces 621*a* and 622*a* toward the fourth opposing surface 624*b*.

In this case, the first magnet part 621 forms a sub magnetic field S.M.F in a direction from the first inner surface 621*a* toward the first outer surface 621*b*. The second magnet part 622 forms a sub magnetic field S.M.F in a direction from the second inner surface 622*a* toward the second outer surface 622*b*.

Further, the third and fourth magnet parts 623 and 624 form sub magnetic fields S.M.F in directions from the facing surfaces 623*a* and 624*a* toward the opposing surfaces 623*b* and 624*b*, respectively.

By the formed main magnetic fields M.M.F and sub magnetic fields S.M.F, in the embodiment illustrated in FIG. 30A, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 30B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Figure 31:
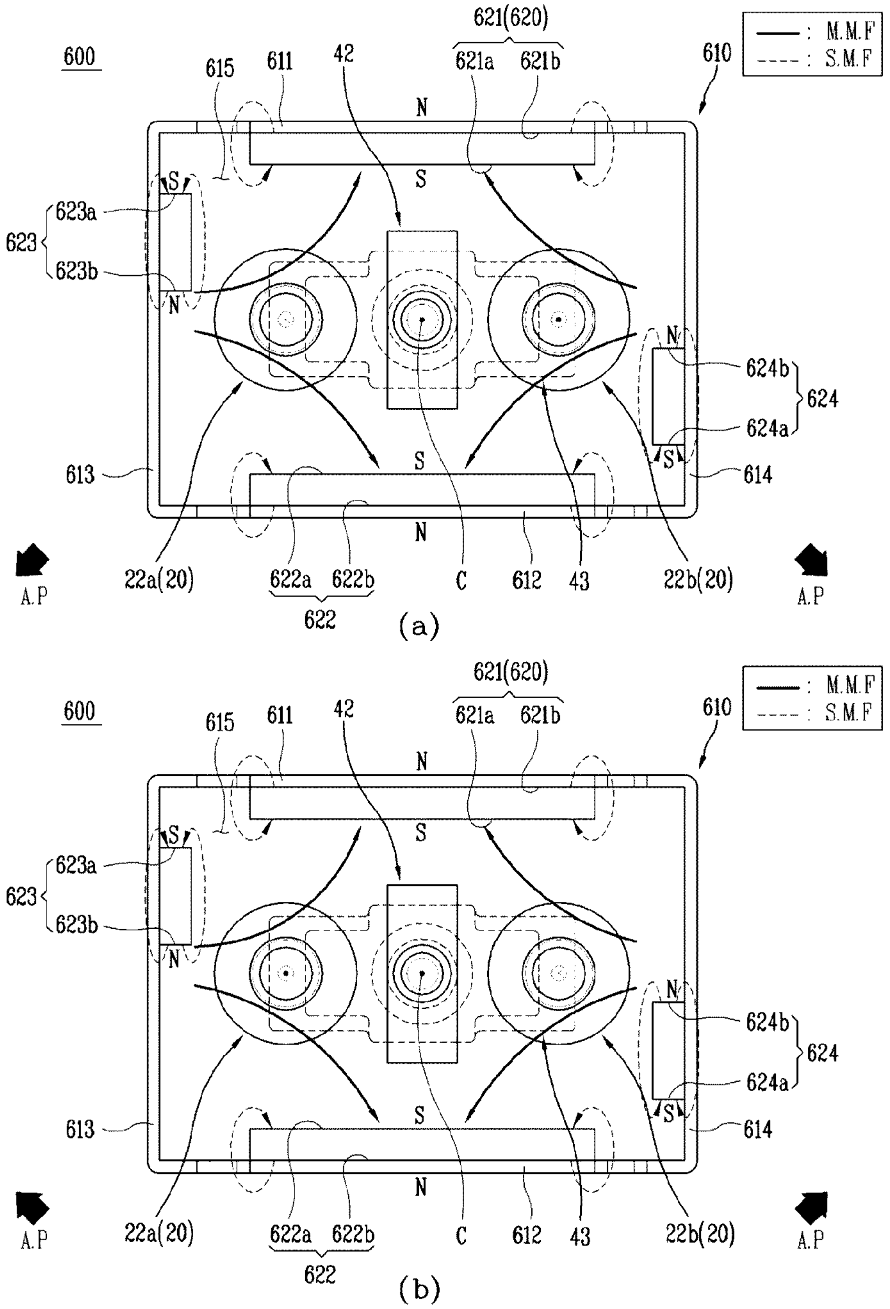

Referring to FIG. 31, the first inner surface 621*a* and the second inner surface 622*a* are magnetized to S poles. In addition, the third opposing surface 623*b* and the fourth opposing surface 624*b* are magnetized to N poles.

Accordingly, main magnetic fields M.M.F formed between the first and second magnet parts 621 and 622 and the third magnet part 623 are formed in directions from the third opposing surface 623*b* toward the first and second inner surfaces 621*a* and 622*a*.

Further, main magnetic fields M.M.F formed between the first and second magnet parts 621 and 622 and the fourth magnet part 624 are formed in directions from the fourth opposing surface 624*b* toward the first and second inner surfaces 621*a* and 622*a*.

In this case, the first magnet part 621 forms a sub magnetic field S.M.F in a direction from the first outer surface 621*b* toward the first inner surface 621*a*. The second magnet part 622 forms a sub magnetic field S.M.F in a direction from the second outer surface 622*b* toward the second inner surface 622*a*.

Further, the third and fourth magnet parts 623 and 624 form sub magnetic fields S.M.F in directions from the opposing surfaces 623*b* and 624*b* toward the facing surfaces 623*a* and 624*a*, respectively.

By the formed main magnetic fields M.M.F and sub magnetic fields S.M.F, in the embodiment illustrated in FIG. 31A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 31B, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Figure 32:
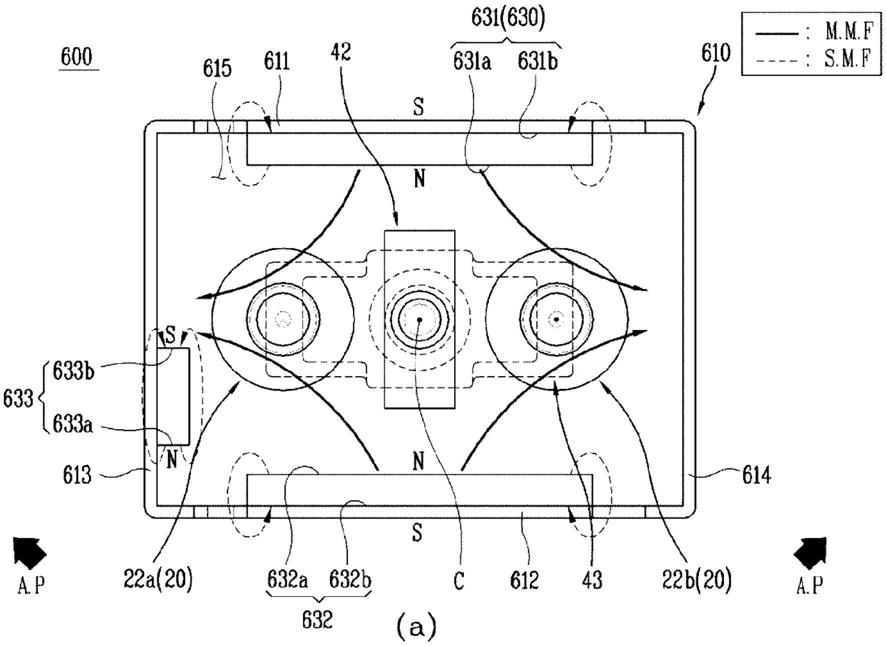
FIGS. 32 and 33 are conceptual views illustrating arc paths formed by the arc path formation unit of FIG. 24.
Figure 32:
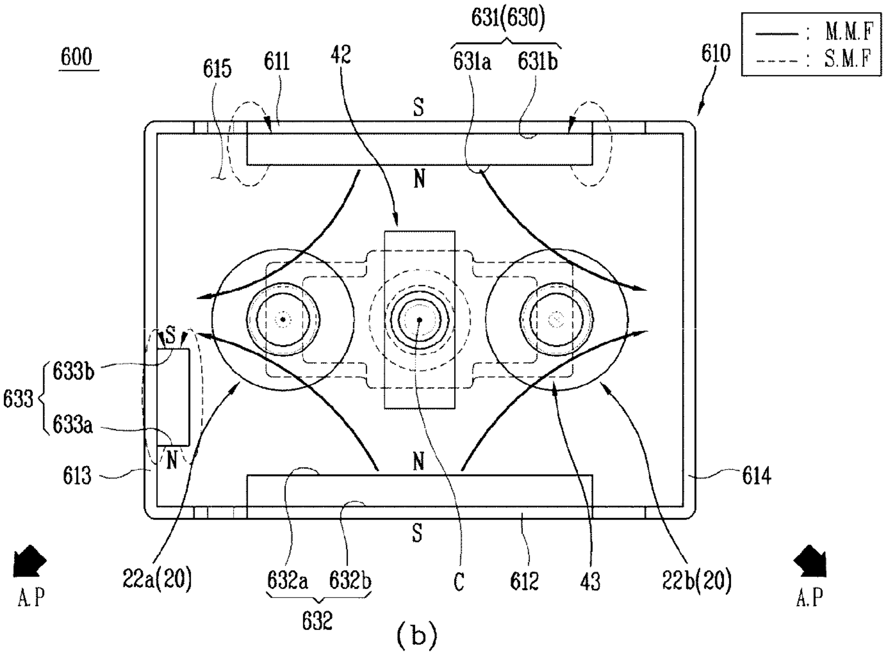

Referring to FIG. 32, the first inner surface 631*a* and the second inner surface 632*a* are magnetized to N poles. In addition, the third opposing surface 633*b* is magnetized to an S pole.

Accordingly, main magnetic fields M.M.F formed between the first and second magnet parts 631 and 632 and the third magnet part 633 are formed in directions from the first and second inner surfaces 631*a* and 632*a* toward the third opposing surface 633*b*.

In this case, the first magnet part 631 forms a sub magnetic field S.M.F in a direction from the first inner surface 631*a* toward the first outer surface 631*b*. The second magnet part 632 forms a sub magnetic field S.M.F in a direction from the second inner surface 632*a* toward the second outer surface 632*b*.

Further, the third magnet part 633 forms a sub magnetic field S.M.F in a direction from the third facing surface 633*a* toward the third opposing surface 633*b*.

By the formed main magnetic fields M.M.F and sub magnetic fields S.M.F, in the embodiment illustrated in FIG. 32A, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 32B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Figure 33:
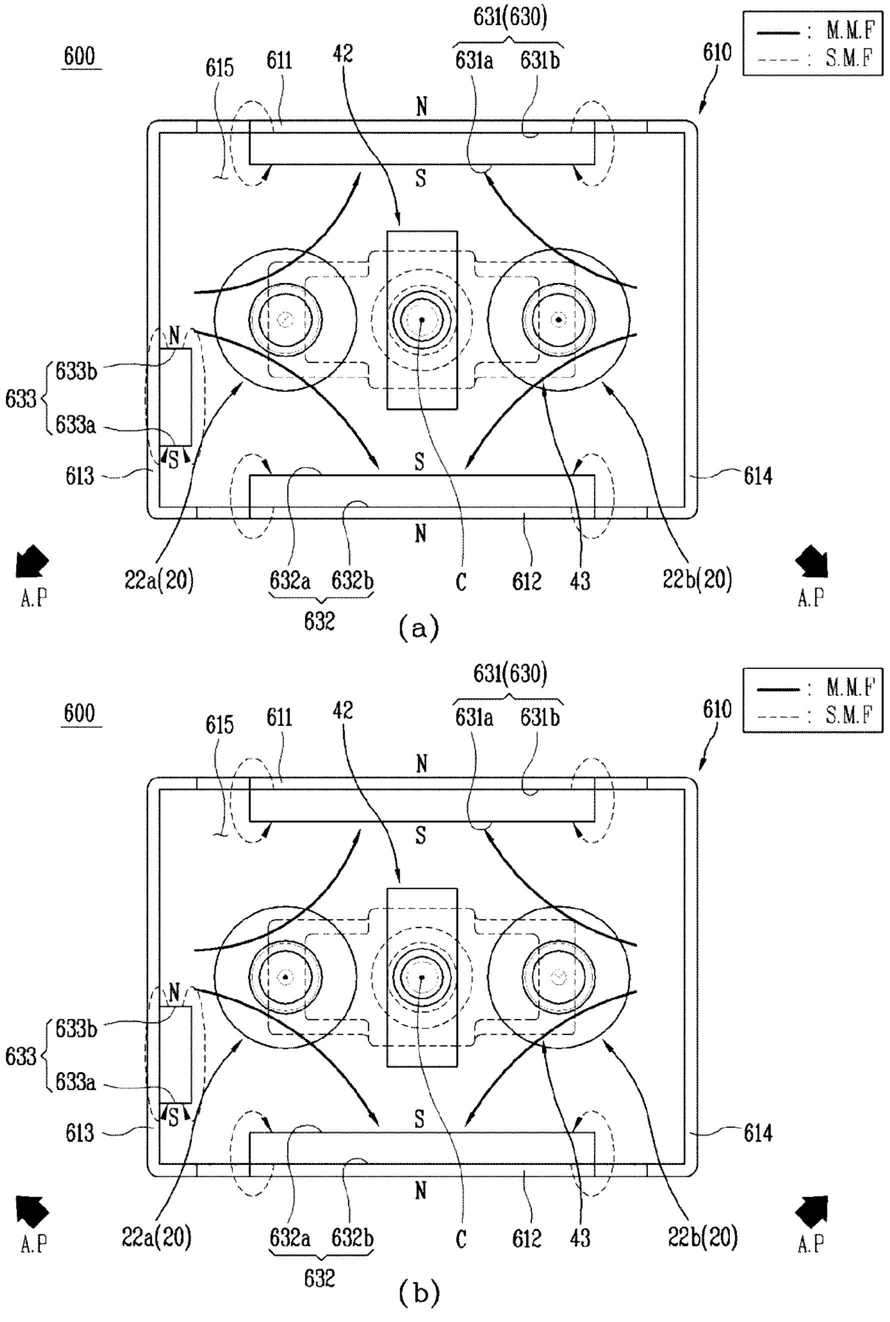

Referring to FIG. 33, the first inner surface 631*a* and the second inner surface 632*a* are magnetized to S poles. In addition, the third opposing surface 633*b* is magnetized to an N pole.

Accordingly, main magnetic fields M.M.F formed between the first and second magnet parts 631 and 632 and the third magnet part 633 are formed in directions from the third opposing surface 633*b* toward the first and second inner surfaces 631*a* and 632*a*.

In this case, the first magnet part 631 forms a sub magnetic field S.M.F in a direction from the first outer surface 631*b* toward the first inner surface 631*a*. The second magnet part 632 forms a sub magnetic field S.M.F in a direction from the second outer surface 632*b* toward the second inner surface 632*a*.

Further, the third magnet part 633 forms a sub magnetic field S.M.F in a direction from the third opposing surface 633*b* toward the third facing surface 633*a*.

By the formed main magnetic fields M.M.F and sub magnetic fields S.M.F, in the embodiment illustrated in FIG. 33A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 33B, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Figure 34:
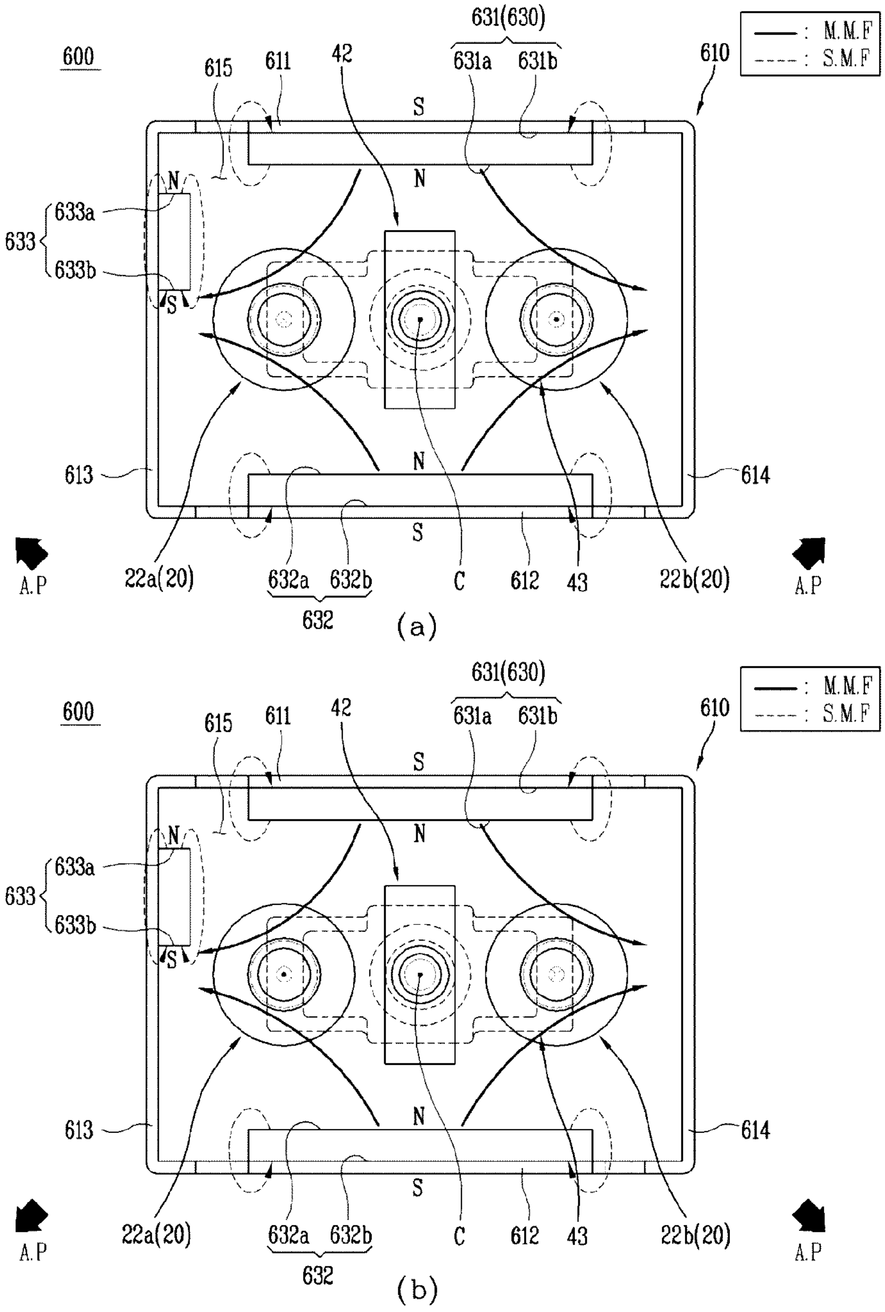
FIGS. 34 and 35 are conceptual views illustrating arc paths formed by the arc path formation unit of FIG. 25.

Referring to FIG. 34, the first inner surface 631*a* and the second inner surface 632*a* are magnetized to N poles. In addition, the third opposing surface 633*b* is magnetized to an S pole.

Accordingly, main magnetic fields M.M.F formed between the first and second magnet parts 631 and 632 and the third magnet part 633 are formed in directions from the first and second inner surfaces 631*a* and 632*a* toward the third opposing surface 633*b*.

In this case, the first magnet part 631 forms a sub magnetic field S.M.F in a direction from the first inner surface 631*a* toward the first outer surface 631*b*. The second magnet part 632 forms a sub magnetic field S.M.F in a direction from the second inner surface 632*a* toward the second outer surface 632*b*.

Further, the third magnet part 633 forms a sub magnetic field S.M.F in a direction from the third facing surface 633*a* toward the third opposing surface 633*b*.

By the formed main magnetic fields M.M.F and sub magnetic fields S.M.F, in the embodiment illustrated in FIG. 34A, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 34B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Figure 35:
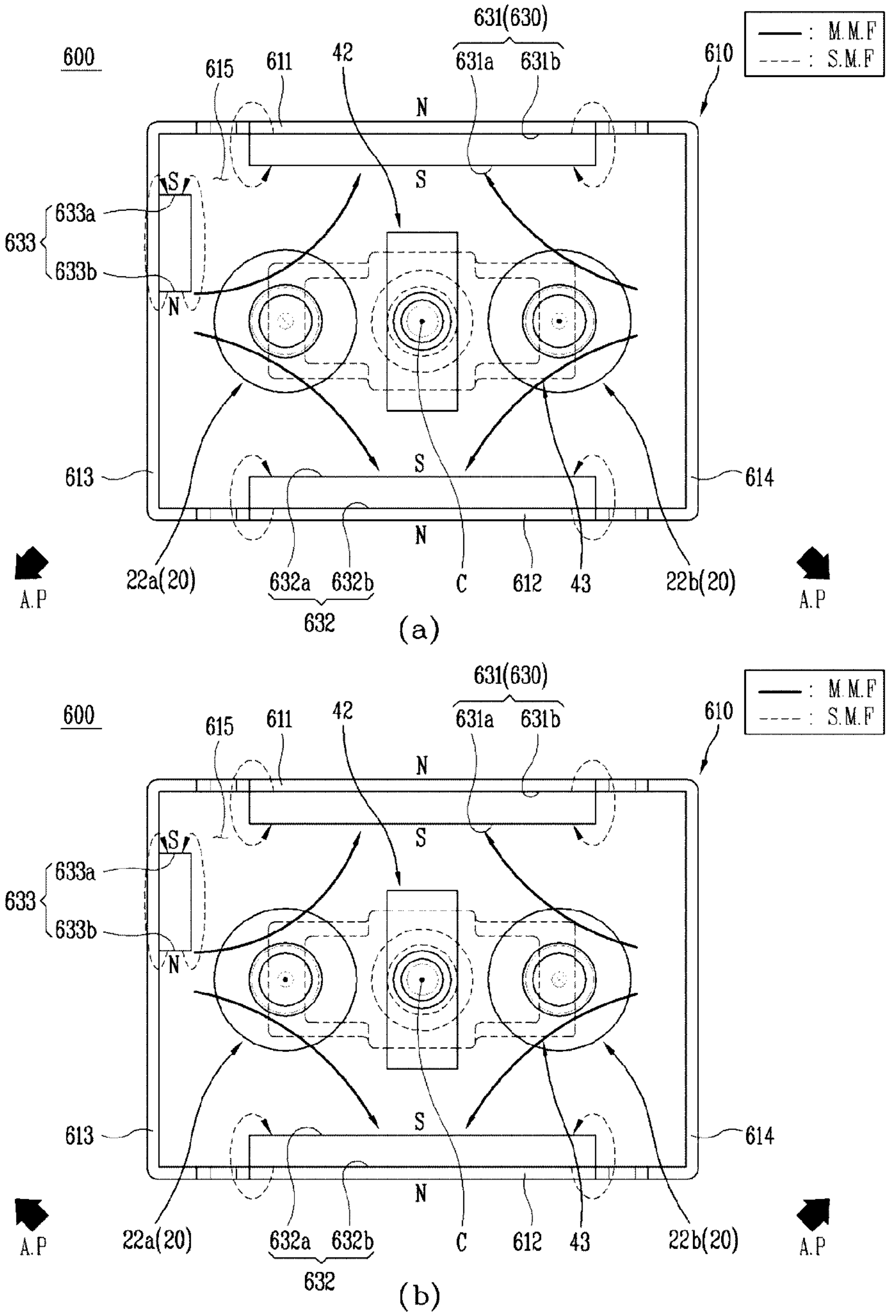

Referring to FIG. 35, the first inner surface 631*a* and the second inner surface 632*a* are magnetized to S poles. In addition, the third opposing surface 633*b* is magnetized to an N pole.

Accordingly, main magnetic fields M.M.F formed between the first and second magnet parts 631 and 632 and the third magnet part 633 are formed in directions from the third opposing surface 633*b* toward the first and second inner surfaces 631*a* and 632*a*.

In this case, the first magnet part 631 forms a sub magnetic field S.M.F in a direction from the first outer surface 631*b* toward the first inner surface 631*a*. The second magnet part 632 forms a sub magnetic field S.M.F in a direction from the second outer surface 632*b* toward the second inner surface 632*a*.

Further, the third magnet part 633 forms a sub magnetic field S.M.F in a direction from the third opposing surface 633*b* toward the third facing surface 633*a*.

By the formed main magnetic fields M.M.F and sub magnetic fields S.M.F, in the embodiment illustrated in FIG. 35A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 35B, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Figure 36:
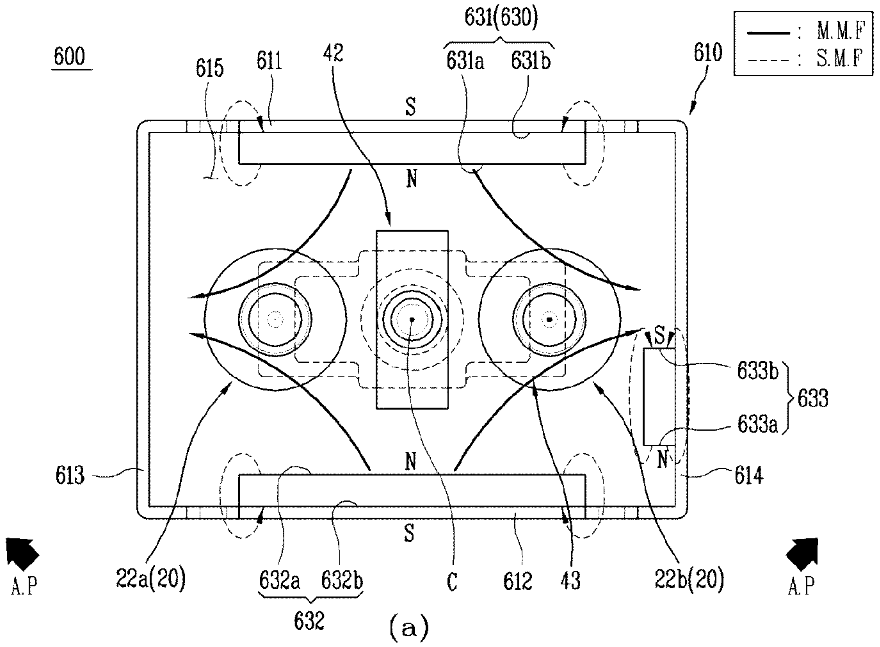
FIGS. 36 and 37 are conceptual views illustrating arc paths formed by the arc path formation unit of FIG. 26.
Figure 36:
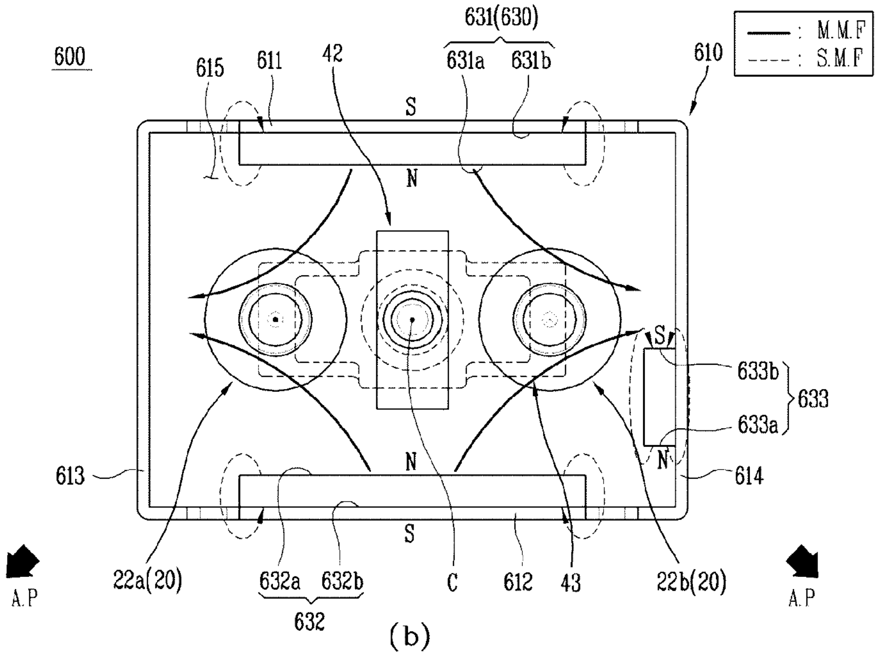

Referring to FIG. 36, the first inner surface 631*a* and the second inner surface 632*a* are magnetized to N poles. In addition, the third opposing surface 633*b* is magnetized to an S pole.

Accordingly, main magnetic fields M.M.F formed between the first and second magnet parts 631 and 632 and the third magnet part 633 are formed in directions from the first and second inner surfaces 631*a* and 632*a* toward the third opposing surface 633*b*.

In this case, the first magnet part 631 forms a sub magnetic field S.M.F in a direction from the first inner surface 631*a* toward the first outer surface 631*b*. The second magnet part 632 forms a sub magnetic field S.M.F in a direction from the second inner surface 632*a* toward the second outer surface 632*b*.

Further, the third magnet part 633 forms a sub magnetic field S.M.F in a direction from the third facing surface 633*a* toward the third opposing surface 633*b*.

By the formed main magnetic fields M.M.F and sub magnetic fields S.M.F, in the embodiment illustrated in FIG. 36A, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 36B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Figure 37:
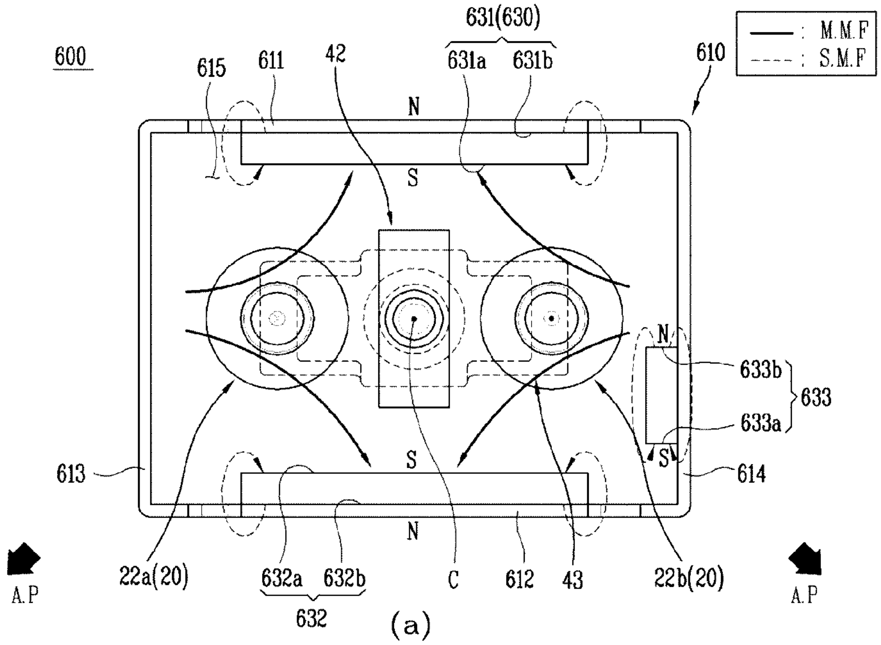
Figure 37:
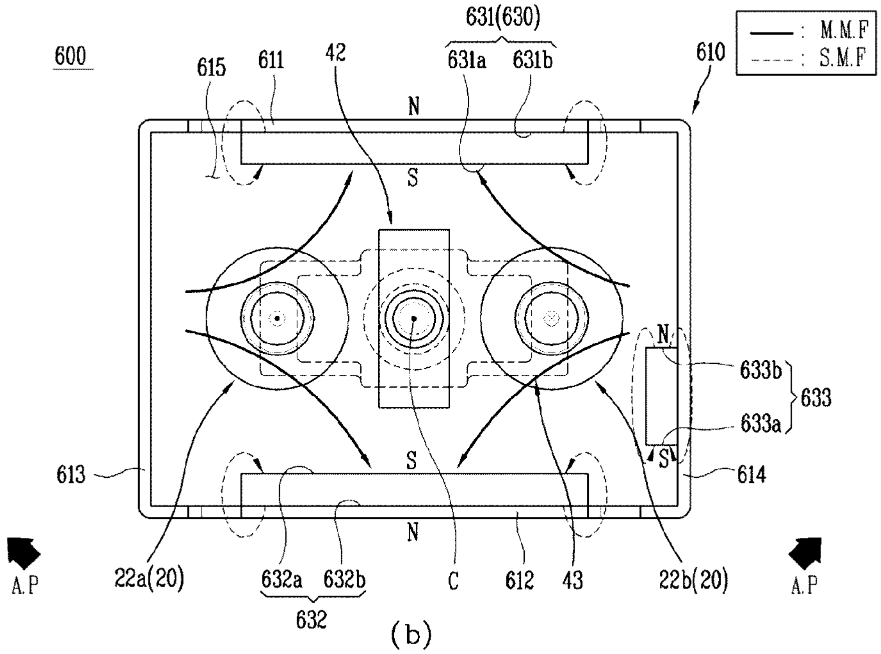

Referring to FIG. 37, the first inner surface 631*a* and the second inner surface 632*a* are magnetized to S poles. In addition, the third opposing surface 633*b* is magnetized to an N pole.

Accordingly, main magnetic fields M.M.F formed between the first and second magnet parts 631 and 632 and the third magnet part 633 are formed in directions from the third opposing surface 633*b* toward the first and second inner surfaces 631*a* and 632*a*.

In this case, the first magnet part 631 forms a sub magnetic field S.M.F in a direction from the first outer surface 631*b* toward the first inner surface 631*a*. The second magnet part 632 forms a sub magnetic field S.M.F in a direction from the second outer surface 632*b* toward the second inner surface 632*a*.

Further, the third magnet part 633 forms a sub magnetic field S.M.F in a direction from the third opposing surface 633*b* toward the third facing surface 633*a*.

By the formed main magnetic fields M.M.F and sub magnetic fields S.M.F, in the embodiment illustrated in FIG. 37A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 37B, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Figure 38:
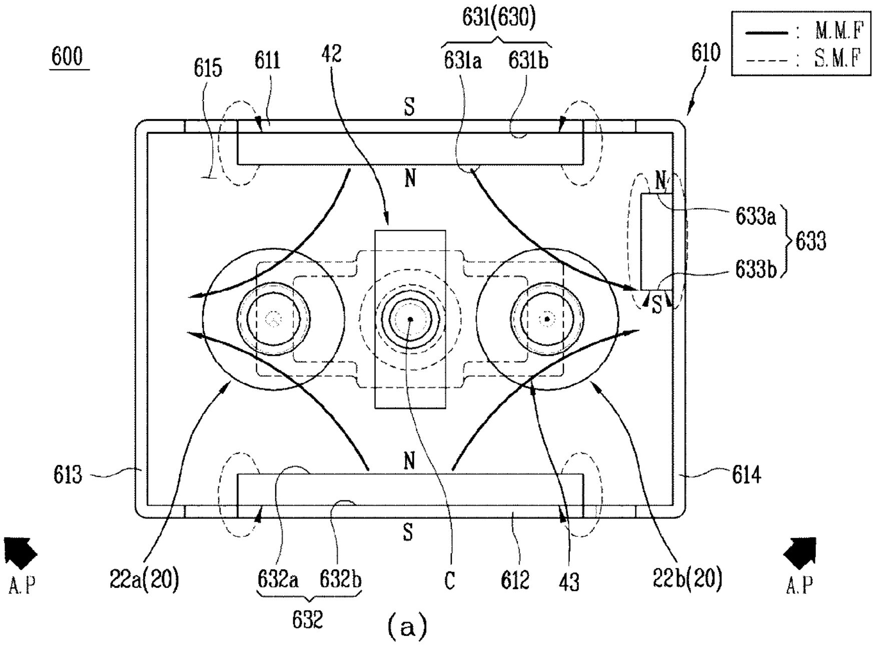
FIGS. 38 and 39 are conceptual views illustrating arc paths formed by the arc path formation unit of FIG. 27.
Figure 38:
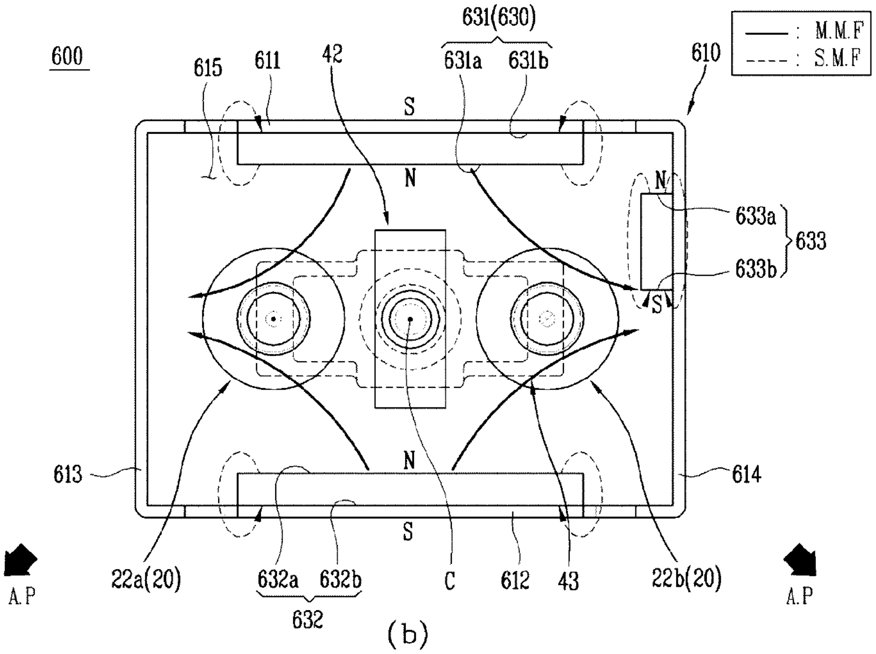

Referring to FIG. 38, the first inner surface 631*a* and the second inner surface 632*a* are magnetized to N poles. In addition, the third opposing surface 633*b* is magnetized to an S pole.

Accordingly, main magnetic fields M.M.F formed between the first and second magnet parts 631 and 632 and the third magnet part 633 are formed in directions from the first and second inner surfaces 631*a* and 632*a* toward the third opposing surface 633*b*.

In this case, the first magnet part 631 forms a sub magnetic field S.M.F in a direction from the first inner surface 631*a* toward the first outer surface 631*b*. The second magnet part 632 forms a sub magnetic field S.M.F in a direction from the second inner surface 632*a* toward the second outer surface 632*b*.

Further, the third magnet part 633 forms a sub magnetic field S.M.F in a direction from the third facing surface 633*a* toward the third opposing surface 633*b*.

By the formed main magnetic fields M.M.F and sub magnetic fields S.M.F, in the embodiment illustrated in FIG. 38A, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 38B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Figure 39:
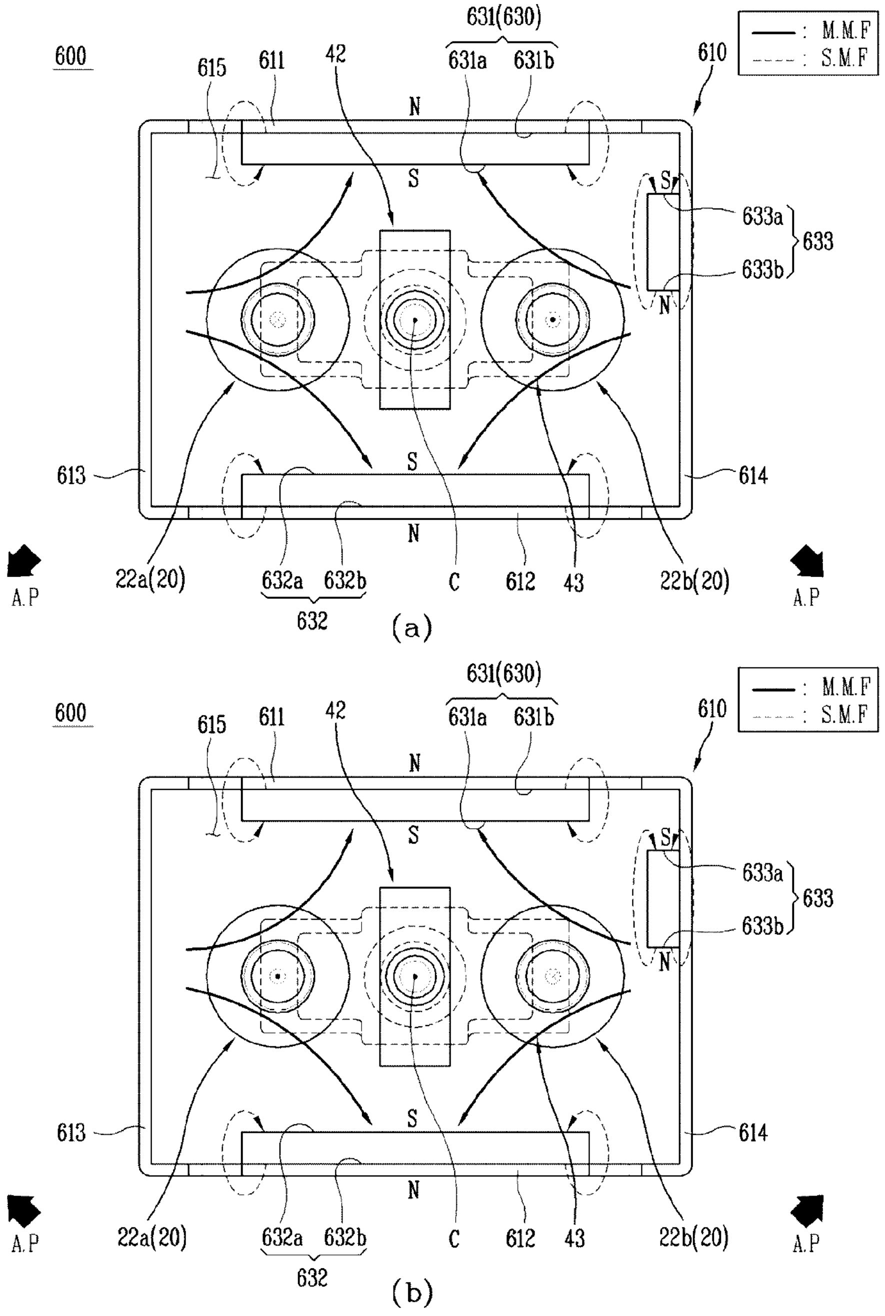

Referring to FIG. 39, the first inner surface 631*a* and the second inner surface 632*a* are magnetized to S poles. In addition, the third opposing surface 633*b* is magnetized to an N pole.

Accordingly, main magnetic fields M.M.F formed between the first and second magnet parts 631 and 632 and the third magnet part 633 are formed in directions from the third opposing surface 633*b* toward the first and second inner surfaces 631*a* and 632*a*.

In this case, the first magnet part 631 forms a sub magnetic field S.M.F in a direction from the first outer surface 631*b* toward the first inner surface 631*a*. The second magnet part 632 forms a sub magnetic field S.M.F in a direction from the second outer surface 632*b* toward the second inner surface 632*a*.

Further, the third magnet part 633 forms a sub magnetic field S.M.F in a direction from the third opposing surface 633*b* toward the third facing surface 633*a*.

By the formed main magnetic fields M.M.F and sub magnetic fields S.M.F, in the embodiment illustrated in FIG. 39A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 39B, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

In the present embodiment, the arc path A.P formed by the arc path formation unit 600 does not extend toward the central portion C. Accordingly, damage to constituent elements disposed in the central portion C can be prevented.

6. Description of Arc Path Formation Unit 700 According to Sixth Embodiment of Present Disclosure Hereinafter, an arc path formation unit 700 according to sixth embodiment of the present disclosure will be described in detail with reference to FIGS. 40 to 57.

(1) Description of Configuration of Arc Path Formation Unit 700 According to Sixth Embodiment of Present Disclosure Referring to FIGS. 40 to 45, the arc path formation unit 700 includes a magnet frame 710 and a magnet part 720.

The magnet frame 710 according to the present embodiment has the same structure and function as the magnet frame 510 of the above-described embodiment. Accordingly, a description of the magnet frame 710 will be replaced with the description of the above-described magnet frame 510.

In addition, the magnet part 720 according to the present embodiment has the same function as the magnet part 520 of the above-described embodiment. However, there are some differences in the number and arrangement method of magnet parts 721, 722, 723, 724, and 725.

Accordingly, in the following description, a difference between the magnet part 720 according to the present embodiment and the magnet part 520 according to the above-described embodiment will be mainly described.

In the embodiment illustrated in FIGS. 40 to 43, the magnet part 720 includes a first magnet part 721, a second magnet part 722, a third magnet part 723, a fourth magnet part 724, and a fifth magnet part 725.

The first magnet part 721 has the same structure, arrangement method, and function as the first magnet part 521 of the above-described embodiment. In addition, the second magnet part 722 has the same structure, arrangement method, and function as the second magnet part 522 of the above-described embodiment. That is, a first inner surface 721*a* of the first magnet part 721 and a second inner surface 722*a* of the second magnet part 722 are magnetized to the same polarity.

However, the present embodiment is partially different from the above-described embodiment in that the first and second magnet parts 721 and 722 form main magnetic fields M.M.F together with the third to fifth magnet parts 723 to 725.

The third magnet part 723 has the same structure as the third magnet part 523 of the above-described embodiment. However, the third magnet part 723 is partially different from the third magnet part 523 of the above-described embodiment in the arrangement method.

That is, the third magnet part 723 is located on an inner side of any one surface of a third surface 713 and a fourth surface 714 to be more adjacent to any one surface of a first surface 711 and a second surface 712.

Further, the fourth magnet part 724 has the same structure as the fourth magnet part 524 of the above-described embodiment. However, the fourth magnet part 724 is partially different from the fourth magnet part 524 of the above-described embodiment in the arrangement method.

That is, the fourth magnet part 724 is located on the inner side of the any one surface of the third surface 713 and the fourth surface 714 to be more adjacent to the other surface of the first surface 711 and the second surface 712, wherein the other surface is a surface other than the surface to which the third surface 713 is located adjacent.

In other words, the third magnet part 723 and the fourth magnet part 724 are disposed on the inner side of the any one surface of the third surface 713 and the fourth surface 714 in parallel in an extending direction thereof (i.e., in the front-rear direction).

In this case, the third magnet part 723 and the fourth magnet part 724 may be located such that a third facing surface 723*a* and a fourth facing surface 724*a* of the fourth magnet part 724 are in contact with or spaced apart from each other.

Further, the third magnet part 723 and the fourth magnet part 724 are located alternately adjacent to the first surface 711 and the second surface 712.

In the present embodiment, the third magnet part 723 includes the third facing surface 723*a* and a third opposing surface 723*b*.

The third facing surface 723*a* may be defined as one side surface of the third magnet part 723 facing the fourth magnet part 724. In the illustrated embodiment, the third facing surface 723*a* may be defined as a front side surface of the third magnet part 723. The third opposing surface 723*b* may be defined as the other side surface of the third magnet part 723 opposite to the fourth magnet part 724. In the illustrated embodiment, the third opposing surface 723*b* may be defined as a rear side surface of the third magnet part 723.

The third facing surface 723*a* is magnetized to a polarity different from those of the first inner surface 721*a* and the second inner surface 722*a*. In addition, the third opposing surface 723*b* is magnetized to the same polarity as the first inner surface 721*a* and the second inner surface 722*a*.

In this case, the third facing surface 723*a* may be located between the first surface 711 and the virtual straight line connecting the fixed contactors 220*a* and 220*b*.

In the present embodiment, the fourth magnet part 724 includes the fourth facing surface 724*a* and a fourth opposing surface 724*b*.

The fourth facing surface 724*a* may be defined as one side surface of the fourth magnet part 724 facing the third magnet part 723. In the illustrated embodiment, the fourth facing surface 724*a* may be defined as a rear side surface of the fourth magnet part 724.

The fourth opposing surface 724*b* may be defined as the other side surface of the fourth magnet part 724 opposite to the third magnet part 723. In the illustrated embodiment, the fourth opposing surface 724*b* may be defined as a front side surface of the fourth magnet part 724.

The fourth facing surface 724*a* is magnetized to a polarity different from those of the first inner surface 721*a* and the second inner surface 722*a*. In addition, the fourth opposing surface 724*b* is magnetized to the same polarity as the first inner surface 721*a* and the second inner surface 722*a*.

In this case, the fourth facing surface 724*a* may be located between the virtual straight line connecting the fixed contactors 220*a* and 220*b* and the second surface 712.

The fifth magnet part 725 has the same structure as the fifth magnet part 525 of the above-described embodiment. However, the fifth magnet part 725 is partially different from the fifth magnet part 525 of the above-described embodiment in the arrangement method.

That is, the fifth magnet part 725 is located on an inner side of the other surface of the third surface 713 and the fourth surface 714 to be more adjacent to any one surface of the first surface 711 and the second surface 712.

In other words, the fifth magnet part 725 is disposed on the inner side of the other surface, which is a surface other than the surface having an inner side on which the third magnet part 723 and the fourth magnet part 724 are disposed.

In the present embodiment, the fifth magnet part 725 includes a fifth facing surface 725*a* and a fifth opposing surface 725*b*.

The fifth facing surface 725*a* may be defined as one side surface of the fifth magnet part 725 facing the any one surface of the first surface 711 and the second surface 712, to which the fifth magnet part 725 is located adjacent.

Figure 40:
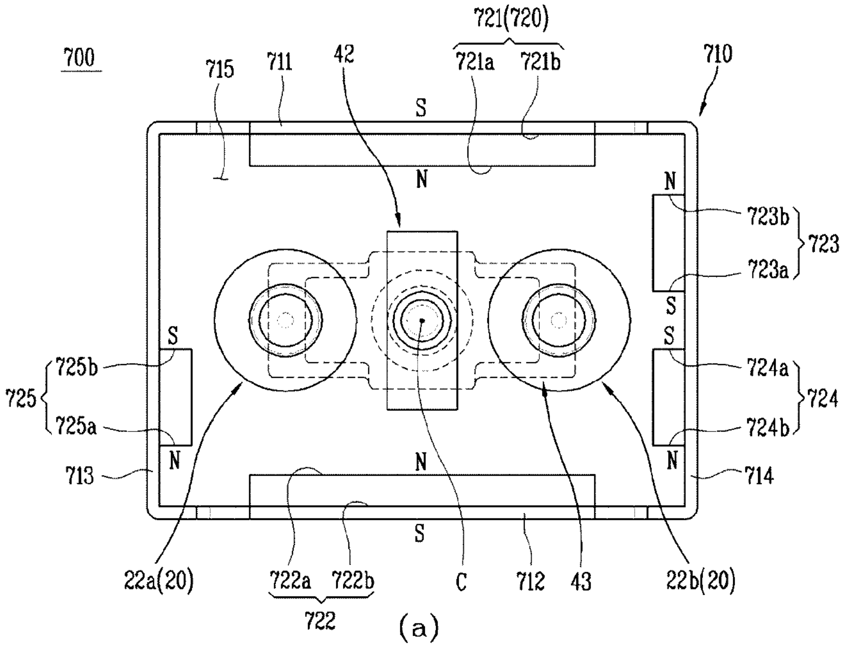
FIGS. 40 to 43 are conceptual views illustrating an arc path formation unit according to a sixth embodiment of the present disclosure.
Figure 40:
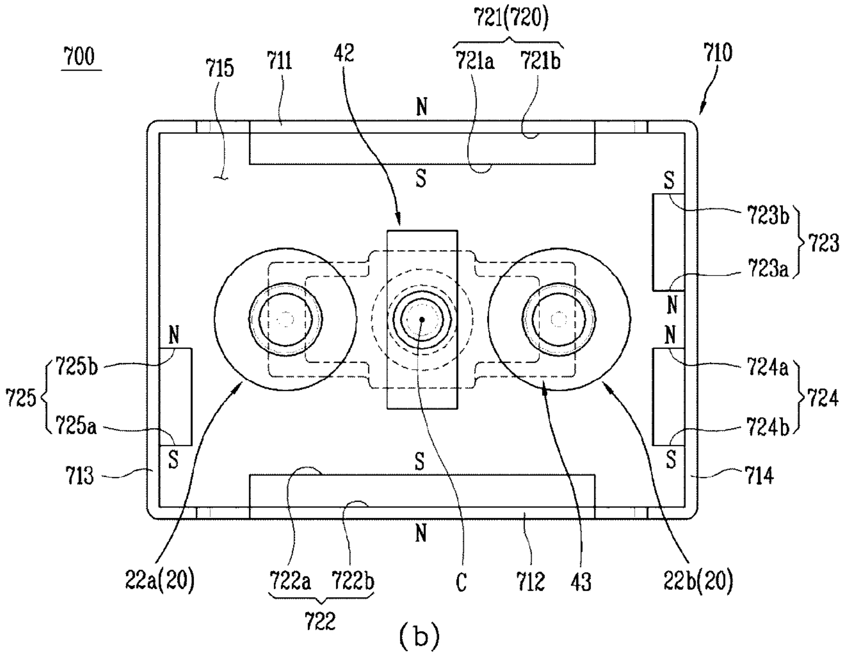
Figure 42:
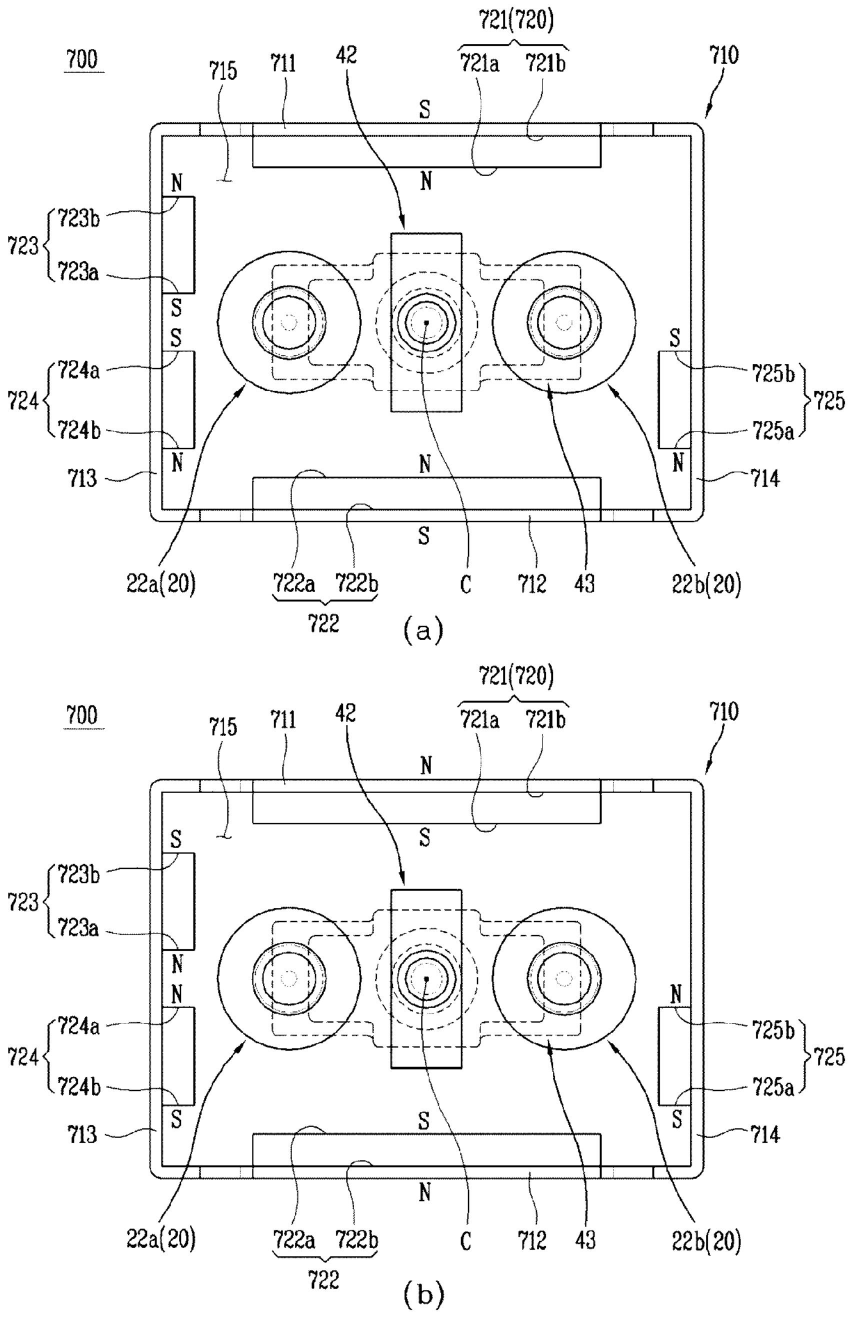

In the embodiment illustrated in FIGS. 40 and 42, the fifth magnet part 725 is located adjacent to the second surface 712. Accordingly, the fifth facing surface 725*a* may be defined as one side (i.e., a front side) surface of the fifth magnet part 725 facing the second surface 712.

Figure 41:
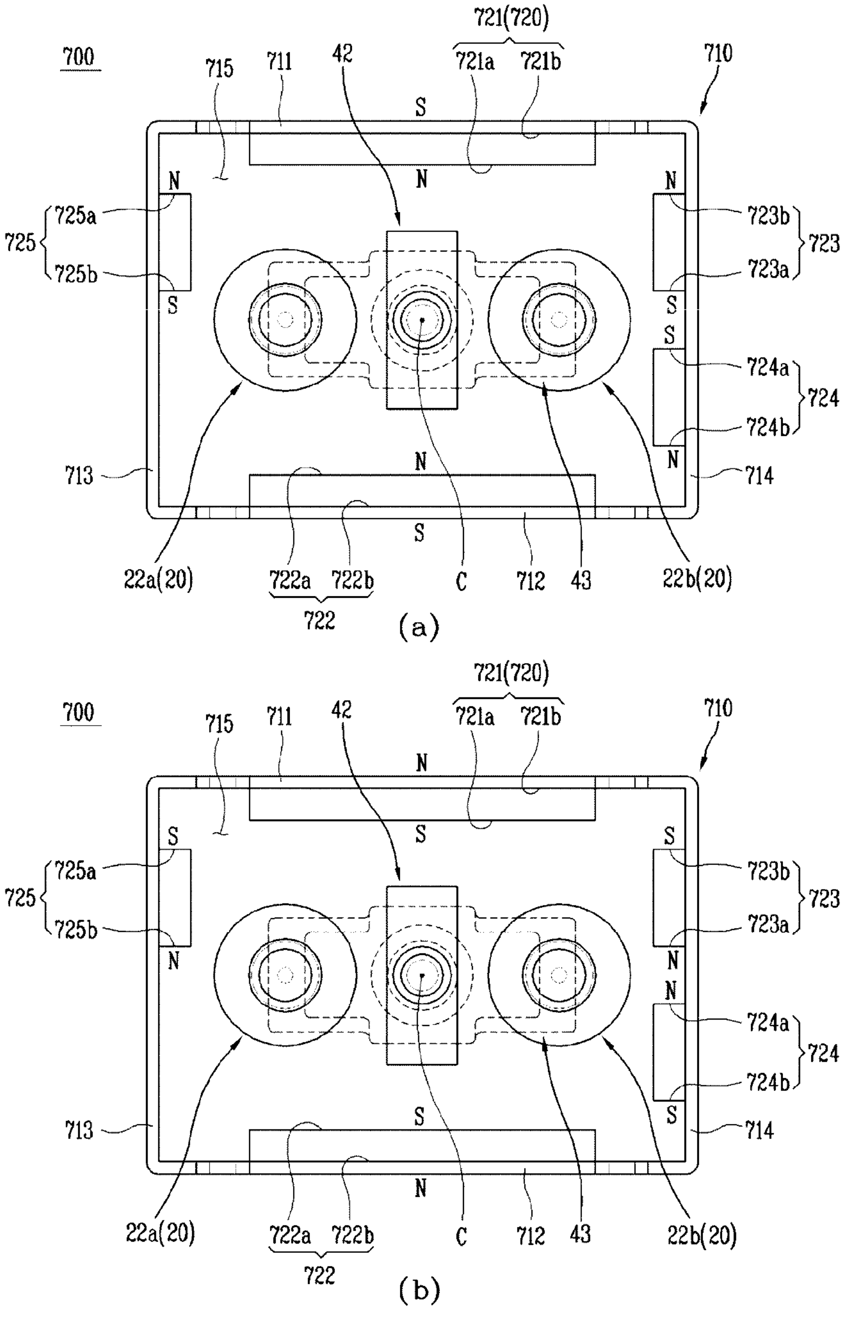
Figure 43:
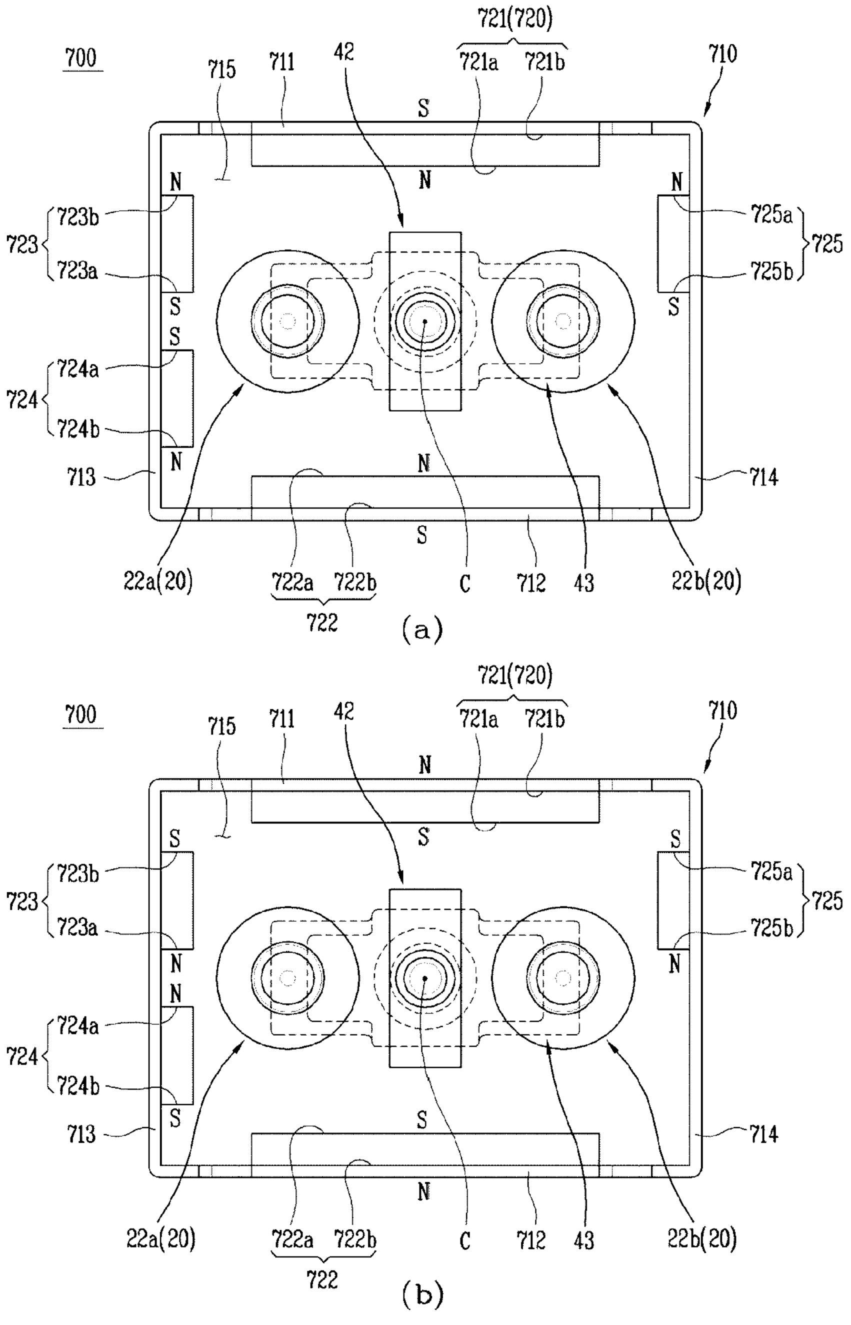

In the embodiment illustrated in FIGS. 41 and 43, the fifth magnet part 725 is located adjacent to the first surface 711. Accordingly, the fifth facing surface 725*a* may be defined as one side (i.e., a rear side) surface of the fifth magnet part 725 facing the first surface 711.

The fifth opposing surface 725*b* may be defined as the other side surface of the fifth magnet part 725 opposite to any one surface of the first surface 711 and the second surface 712, to which the fifth magnet part 725 is located adjacent.

In the embodiment illustrated in FIGS. 40 and 42, the fifth magnet part 725 is located adjacent to the second surface 712. Accordingly, the fifth opposing surface 725*b* may be defined as a surface opposite to the second surface 712, that is, the other side (i.e., the rear side) surface of the fifth magnet part 725 facing the first surface 711.

In the embodiment illustrated in FIGS. 41 and 43, the fifth magnet part 725 is located adjacent to the first surface 711. Accordingly, the fifth opposing surface 725*b* may be defined as a surface opposite to the first surface 711, that is, the other side (i.e., a front side) surface of the fifth magnet part 725 facing the first surface 711.

In this case, the fifth opposing surface 725*b* may be located between the virtual straight line connecting the fixed contactors 220*a* and 220*b* and any one surface of the first surface 711 and the second surface 712, to which the fifth magnet part 725 is located adjacent.

That is, in the embodiment illustrated in FIGS. 40 and 42, the fifth opposing surface 725*b* is located to be more biased to the second surface 712 than the virtual straight line connecting the fixed contactors 220*a* and 220*b*.

Further, in the embodiment illustrated in FIGS. 41 and 43, the fifth opposing surface 725*b* is located to be more biased to the first surface 711 than the virtual straight line connecting the fixed contactors 220*a* and 220*b*.

In the embodiment illustrated in FIGS. 40 and 41, the third magnet part 723 and the fourth magnet part 724 are located in parallel on an inner side of the fourth surface 714. In addition, the third magnet part 723 is located to be biased to the first surface 711, and the fourth magnet part 724 is located to be biased to the second surface 712.

In the embodiment, the third facing surface 723*a* may be located between the first surface 711 and the virtual straight line connecting the fixed contactors 220*a* and 220*b*. In addition, the fourth facing surface 724*a* may be located between the second surface 712 and the virtual straight line connecting the fixed contactors 220*a* and 220*b*.

In the embodiment illustrated in FIG. 40, the fifth magnet part 725 is located on the inner side of the third surface 713 to be biased to the second surface 712. In addition, the fifth magnet part 725 is disposed to face the fourth magnet part 724 with a space portion 715 therebetween.

In the embodiment, the fifth opposing surface 725*b* may be located between the second surface 712 and the virtual straight line connecting the fixed contactors 220*a* and 220*b*.

In the embodiment illustrated in FIG. 41, the fifth magnet part 725 is located on the inner side of the third surface 713 to be biased to the first surface 711. In addition, the fifth magnet part 725 is disposed to face the third magnet part 723 with the space portion 715 therebetween.

In the embodiment, the fifth opposing surface 725*b* may be located between the first surface 711 and the virtual straight line connecting the fixed contactors 220*a* and 220*b*.

In the embodiment illustrated in FIGS. 28 and 43, the third magnet part 723 and the fourth magnet part 724 are located in parallel on the inner side of the third surface 713. In addition, the third magnet part 723 is located to be biased to the first surface 711, and the fourth magnet part 724 is located to be biased to the second surface 712.

In the embodiment, the third facing surface 723*a* may be located between the first surface 711 and the virtual straight line connecting the fixed contactors 220*a* and 220*b*. In addition, the fourth facing surface 724*a* may be located between the second surface 712 and the virtual straight line connecting the fixed contactors 220*a* and 220*b*.

In the embodiment illustrated in FIG. 42, the fifth magnet part 725 is located on the inner side of the fourth surface 714 to be biased to the second surface 712. In addition, the fifth magnet part 725 is disposed to face the fourth magnet part 724 with the space portion 715 therebetween.

In the embodiment, the fifth opposing surface 725*b* may be located between the second surface 712 and the virtual straight line connecting the fixed contactors 220*a* and 220*b*.

In the embodiment illustrated in FIG. 43, the fifth magnet part 725 is located on the inner side of the fourth surface 714 to be biased to the first surface 711. In addition, the fifth magnet part 725 is disposed to face the third magnet part 723 with the space portion 715 therebetween.

In the embodiment, the fifth opposing surface 725*b* may be located between the first surface 711 and the virtual straight line connecting the fixed contactors 220*a* and 220*b*.

In this case, the first inner surface 721*a*, the second inner surface 722*a*, the third opposing surface 723*b*, the fourth opposing surface 724*b*, and the fifth facing surface 725*a* may be magnetized to the same polarity. Similarly, a first outer surface 721*b*, a second outer surface 722*b*, the third facing surface 723*a*, the fourth facing surface 724*a*, and the fifth opposing surface 725*b* may be magnetized to the same polarity.

Accordingly, a magnetic field in a direction from any one surface of the first and second inner surfaces 721*a* and 722*a* and the third and fourth facing surfaces 723*a* and 724*a*, and the fifth opposing surface 725*b* toward the other surface thereof is formed.

Figure 44:
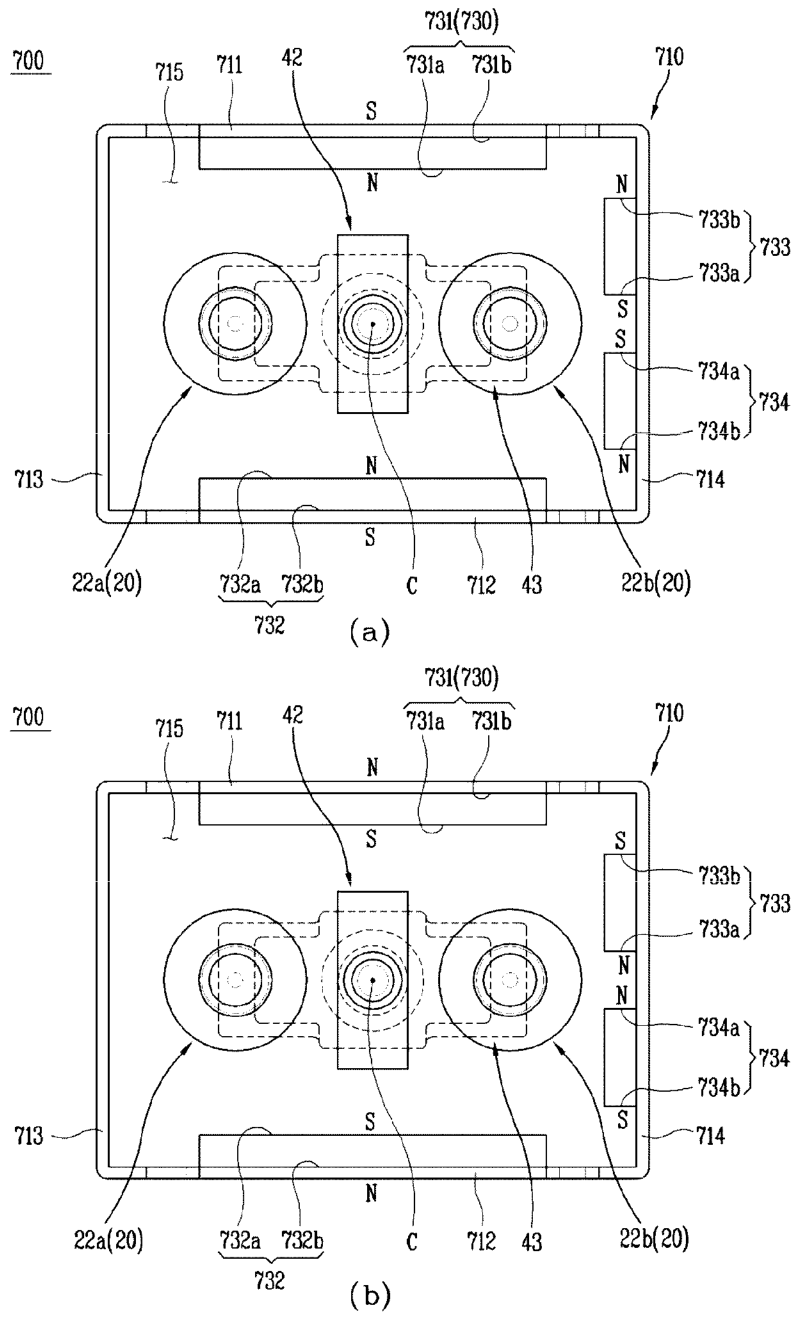
FIGS. 44 and 45 are conceptual views illustrating modified examples of the arc path formation unit according to the sixth embodiment of the present disclosure.
Figure 45:
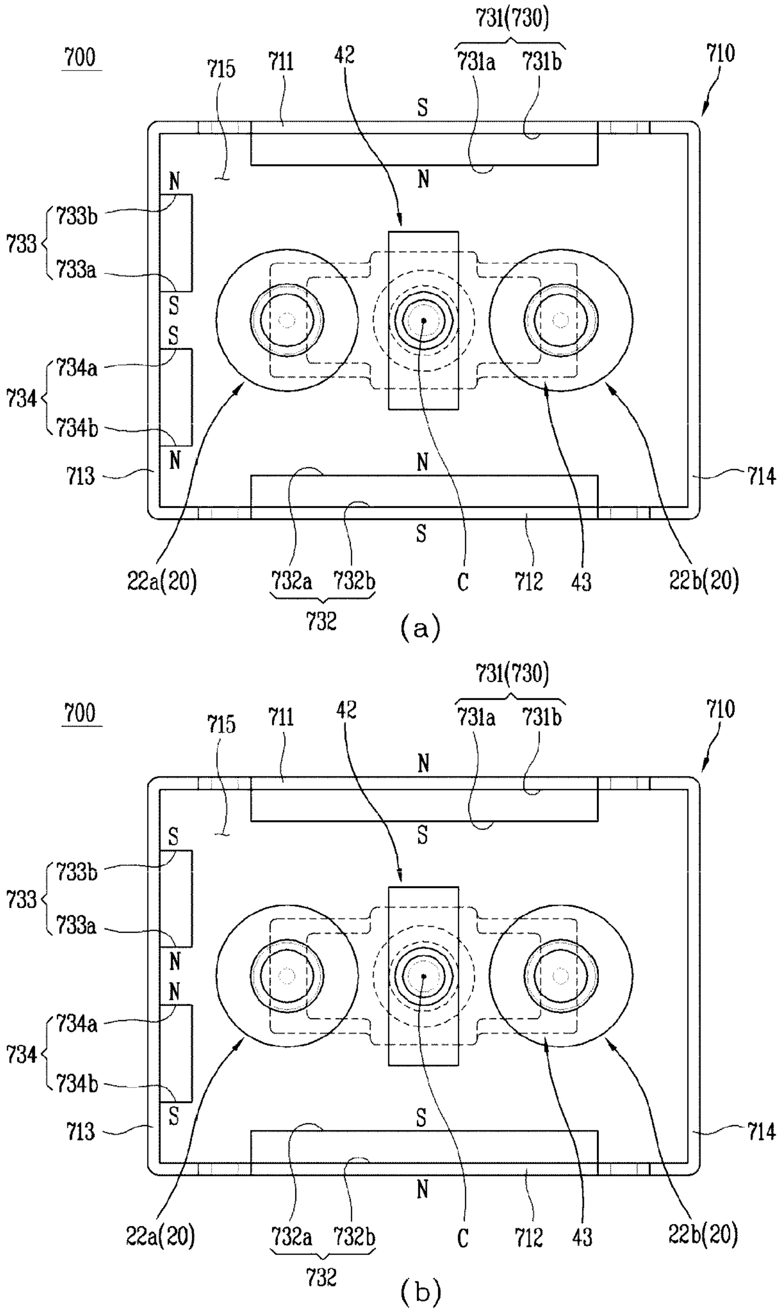

Referring to FIGS. 44 and 45, a modified example of the arc path formation unit 700 according to the sixth embodiment of the present disclosure is illustrated.

In the modified example of the present embodiment, there are some differences in the number and arrangement method of a magnet part 730 as compared with the magnet part 720 according to the above-described embodiment.

That is, in the embodiment illustrated in FIGS. 44 and 45, the magnet part 730 includes a first magnet part 731, a second magnet part 732, a third magnet part 733, and a fourth magnet part 734. That is, in the present embodiment, the magnet part corresponding to the fifth magnet part 725 of the above-described embodiment is excluded.

Except for the difference, the structure and arrangement method of each of the magnet parts 731, 732, 733, and 734 are the same as those of each of the magnet parts 721, 722, 723, and 724 of the above-described embodiments.

At this time, a first inner surface 731*a*, a second inner surface 732*a*, a third opposing surface 733*b*, and a fourth opposing surface 734*b* may be magnetized to the same polarity. Similarly, a second outer surface 731*b*, a second outer surface 732*b*, a third facing surface 733*a*, and a fourth facing surface 734*a* may be magnetized to the same polarity.

(2) Description of Arc Path A.P Formed Arc Path Formation Unit 700 According to Sixth Embodiment of the Present Disclosure Hereinafter, an arc path A.P formed by the arc path formation unit 700 according to the present embodiment will be described in detail with reference to FIGS. 46 to 57.

In FIGS. 46 to 57, the symbol "x" shown in each of the fixed contactors 220*a* and 220*b* means a direction in which current flows from the fixed contactors 220*a* and 220*b* toward the movable contactor 43 (i.e., the downward direction), that is, a direction in which the current flows into the ground.

Further, in FIGS. 46 to 57, the symbol "⊙" shown in each of the fixed contactors 220*a* and 220*b* means a direction in which current flows from the movable contactor 43 toward the fixed contactors 220_a_ and 220_b_ (i.e., the upward direction), that is, a direction in which the current flows from the ground.

A flowing direction of current in FIGS. 46A, 47A, 48A, 49A, 50A, 51A, 52A, 53A, 54A, 55A, 56A, and 57A is a direction in which the current flows into the first fixed contactor 22_a_ and flows out through the second fixed contactor 22_b_ via the movable contactor 43.

Further, a flowing direction of current in FIGS. 46B, 47B, 48B, 49B, 50B, 51B, 52B, 53B, 54B, 55B, 56B, and 57B is a direction in which the current flows into the second fixed contactor 22_b_ and flows out through the first fixed contactor 22_a_ via the movable contactor 43.

Figure 46:
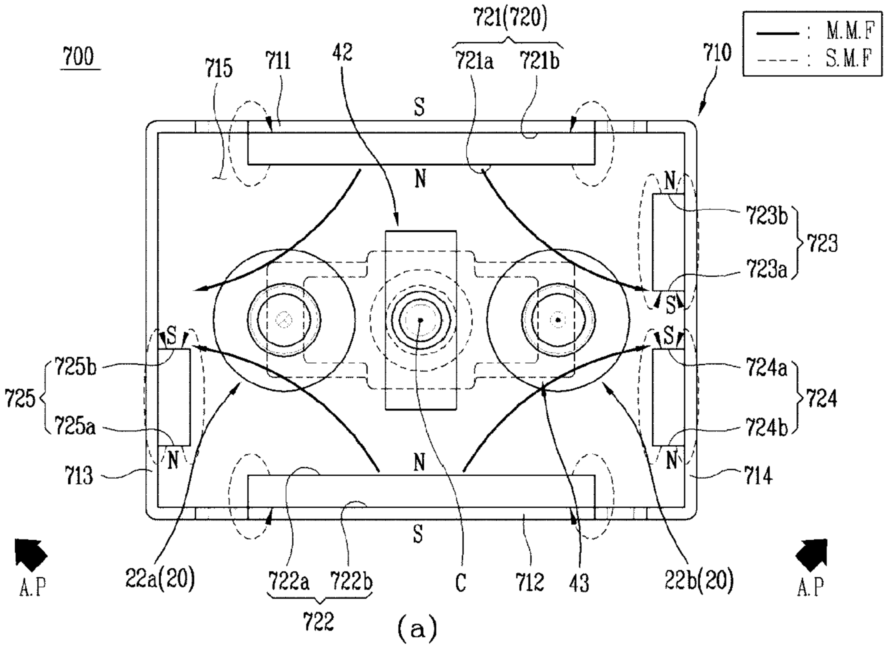
FIGS. 46 and 47 are conceptual views illustrating arc paths formed by the arc path formation unit of FIG. 40.
Figure 46:
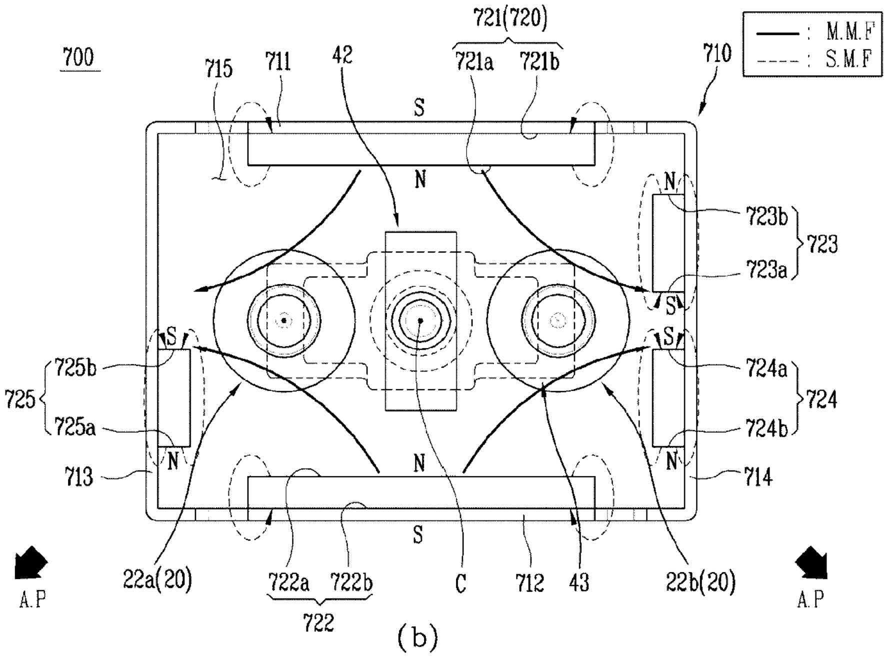

Referring to FIG. 46, the first inner surface 721_a_ and the second inner surface 722_a_ are magnetized to N poles. In addition, the third facing surface 723_a_, the fourth facing surface 724_a_, and the fifth opposing surface 725_b_ are magnetized to S poles.

Accordingly, main magnetic fields M.M.F formed between the first and second magnet parts 721 and 722 and the third magnet part 723 are formed in directions from the first and second inner surfaces 721_a_ and 722_a_ toward the third facing surface 723_a_.

Further, main magnetic fields M.M.F formed between the first and second magnet parts 721 and 722 and the fourth magnet part 724 are formed in directions from the first and second inner surfaces 721_a_ and 722_a_ toward the fourth facing surface 724_a_.

Furthermore, main magnetic fields M.M.F formed between the first and second magnet parts 721 and 722 and the fifth magnet part 725 are formed in directions from the first and second inner surfaces 721_a_ and 722_a_ toward the fifth opposing surface 725_b_.

In this case, the first magnet part 721 forms a sub magnetic field S.M.F in a direction from the first inner surface 721_a_ toward the first outer surface 721_b_. The second magnet part 722 forms a sub magnetic field S.M.F in a direction from the second inner surface 722_a_ toward the second outer surface 722_b_.

Further, the third and fourth magnet parts 723 and 724 form sub magnetic fields S.M.F in directions from the opposing surfaces 723_b_ and 724_b_ toward the facing surfaces 723_a_ and 724_a_, respectively.

Furthermore, the fifth magnet part 725 forms a sub magnetic field S.M.F in a direction from the fifth facing surface 725_a_ toward the fifth opposing surface 725_b_.

By the formed main magnetic fields M.M.F and sub magnetic fields S.M.F, in the embodiment illustrated in FIG. 46A, an electromagnetic force in a direction toward the rear left side is generated in the vicinity of the first fixed contactor 22_a_. An arc path A.P is formed toward the rear left side along the direction of the electromagnetic force.

Further, an electromagnetic force in a direction toward the rear right side is generated in the vicinity of the second fixed contactor 22_b_. An arc path A.P is formed toward the rear right side along the direction of the electromagnetic force.

Similarly, in the embodiment illustrated in FIG. 46B, an electromagnetic force in a direction toward the front left side is generated in the vicinity of the first fixed contactor 22_a_. An arc path A.P is formed toward the front left side along the direction of the electromagnetic force.

Further, an electromagnetic force in a direction toward the front right side is generated in the vicinity of the second fixed contactor 22_b_. An arc path A.P is formed toward the front right side along the direction of the electromagnetic force.

Figure 47:
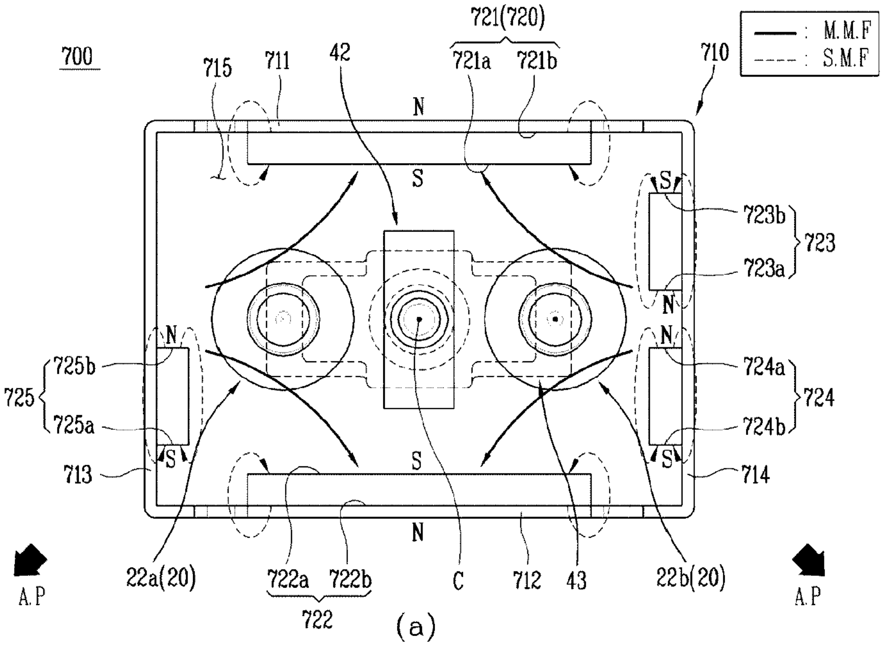
Figure 47:
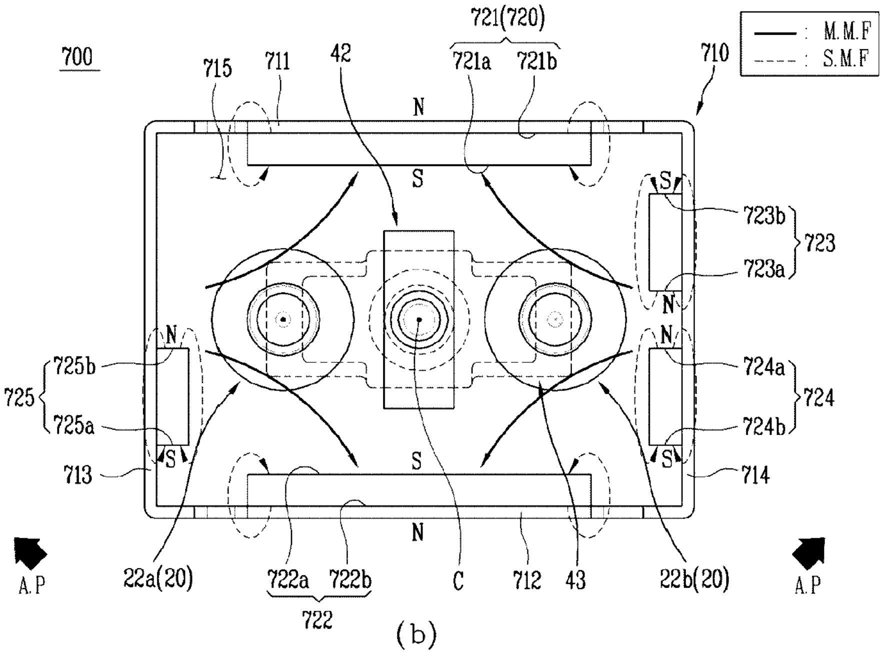

Referring to FIG. 47, the first inner surface 721_a_ and the second inner surface 722_a_ are magnetized to S poles. In addition, the third facing surface 723_a_, the fourth facing surface 724_a_, and the fifth opposing surface 725_b_ are magnetized to N poles.

Accordingly, magnetic fields M.M.F. formed between the first and second magnet parts 721 and 722 and the third magnet part 723 are formed in directions from the third facing surface 723_a_ toward the first and second inner surfaces 721_a_ and 722_a_.

Further, main magnetic fields M.M.F formed between the first and second magnet parts 721 and 722 and the fourth magnet part 724 are formed in directions from the fourth facing surface 724_a_ toward the first and second inner surfaces 721_a_ and 722_a_.

Furthermore, main magnetic fields M.M.F formed between the first and second magnet parts 721 and 722 and the fifth magnet part 725 are formed in directions from the fifth opposing surface 725_b_ toward the first and second inner surfaces 721_a_ and 722_a_.

In this case, the first magnet part 721 forms a sub magnetic field S.M.F in a direction from the first outer surface 721_b_ toward the first inner surface 721_a_. The second magnet part 722 forms a sub magnetic field S.M.F in a direction from the second outer surface 722_b_ toward the second inner surface 722_a_.

Further, the third and fourth magnet parts 723 and 724 form sub magnetic fields S.M.F in directions from the facing surfaces 723_a_ and 724_a_ toward the opposing surfaces 723_b_ and 724_b_, respectively.

Furthermore, the fifth magnet part 725 forms a sub magnetic field S.M.F in a direction from the fifth opposing surface 725_b_ toward the fifth facing surface 725_a_.

By the formed main magnetic fields M.M.F and sub magnetic fields S.M.F, in the embodiment illustrated in FIG. 47A, an electromagnetic force in a direction toward the front left side is generated in the vicinity of the first fixed contactor 22_a_. An arc path A.P is formed toward the front left side along the direction of the electromagnetic force.

Further, an electromagnetic force in a direction toward the front right side is generated in the vicinity of the second fixed contactor 22_b_. An arc path A.P is formed toward the front right side along the direction of the electromagnetic force.

Similarly, in the embodiment illustrated in FIG. 47B, an electromagnetic force in a direction toward the rear left side is generated in the vicinity of the first fixed contactor 22_a_. An arc path A.P is formed toward the rear left side along the direction of the electromagnetic force.

Further, an electromagnetic force in a direction toward the rear right side is generated in the vicinity of the second fixed contactor 22_b_. An arc path A.P is formed toward the rear right side along the direction of the electromagnetic force.

Figure 48:
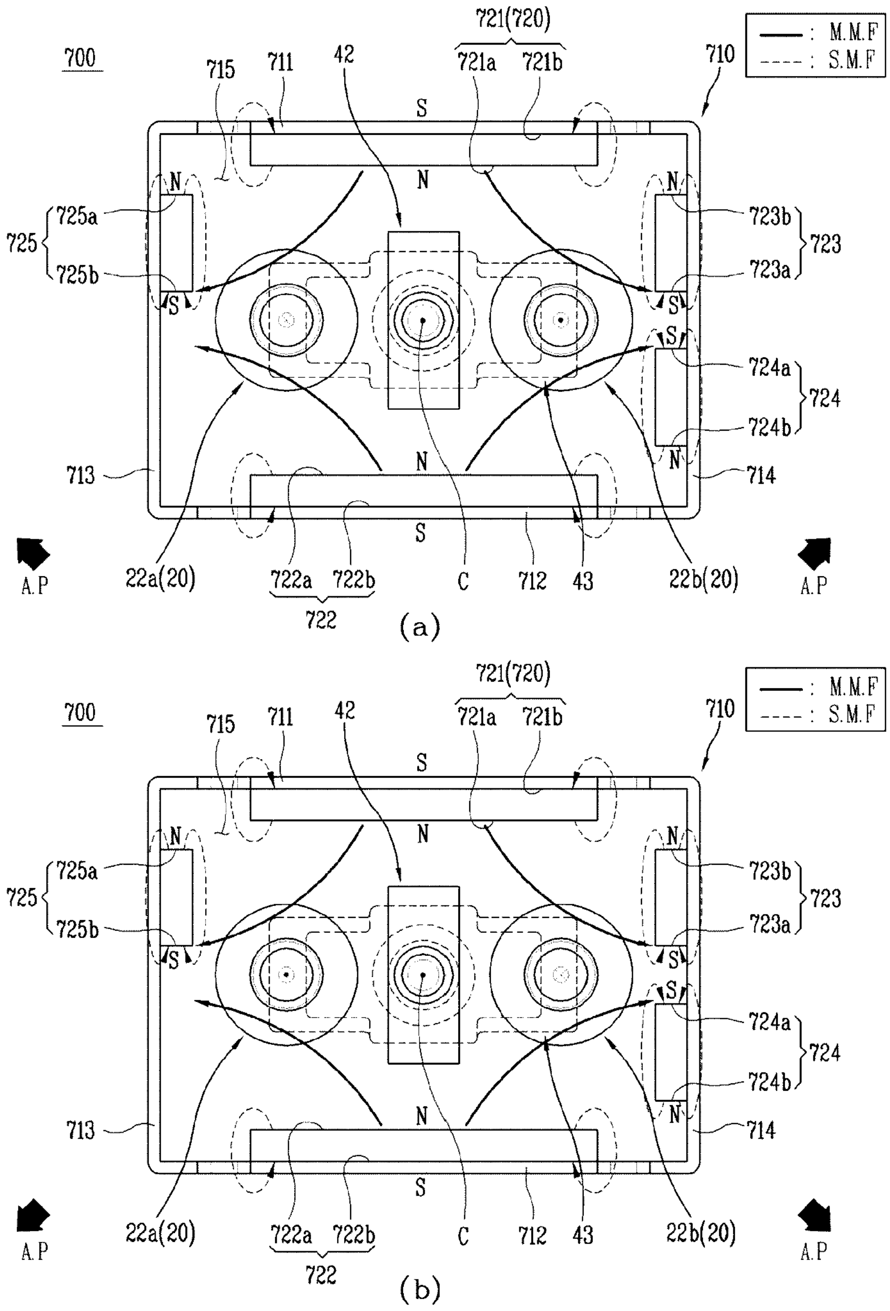
FIGS. 48 and 49 are conceptual views illustrating arc paths formed by the arc path formation unit of FIG. 41.

Referring to FIG. 48, the first inner surface 721_a_ and the second inner surface 722_a_ are magnetized to N poles. In addition, the third facing surface 723_a_, the fourth facing surface 724_a_, and the fifth opposing surface 725_b_ are magnetized to S poles.

Accordingly, main magnetic fields M.M.F formed between the first and second magnet parts 721 and 722 and the third magnet part 723 are formed in directions from the first and second inner surfaces 721_a_ and 722_a_ toward the third facing surface 723_a_.

Further, main magnetic fields M.M.F formed between the first and second magnet parts 721 and 722 and the fourth magnet part 724 are formed in directions from the first and second inner surfaces 721*a* and 722*a* toward the fourth facing surface 724*a*.

Furthermore, main magnetic fields M.M.F formed between the first and second magnet parts 721 and 722 and the fifth magnet part 725 are formed in directions from the first and second inner surfaces 721*a* and 722*a* toward the fifth opposing surface 725*b*.

In this case, the first magnet part 721 forms a sub magnetic field S.M.F in a direction from the first inner surface 721*a* toward the first outer surface 721*b*. The second magnet part 722 forms a sub magnetic field S.M.F in a direction from the second inner surface 722*a* toward the second outer surface 722*b*.

Further, the third and fourth magnet parts 723 and 724 form sub magnetic fields S.M.F in directions from the opposing surfaces 723*b* and 724*b* toward the facing surfaces 723*a* and 724*a*, respectively.

Furthermore, the fifth magnet part 725 forms a sub magnetic field S.M.F in a direction from the fifth facing surface 725*a* toward the fifth opposing surface 725*b*.

By the formed main magnetic fields M.M.F and sub magnetic fields S.M.F, in the embodiment illustrated in FIG. 48A, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 48B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Figure 49:
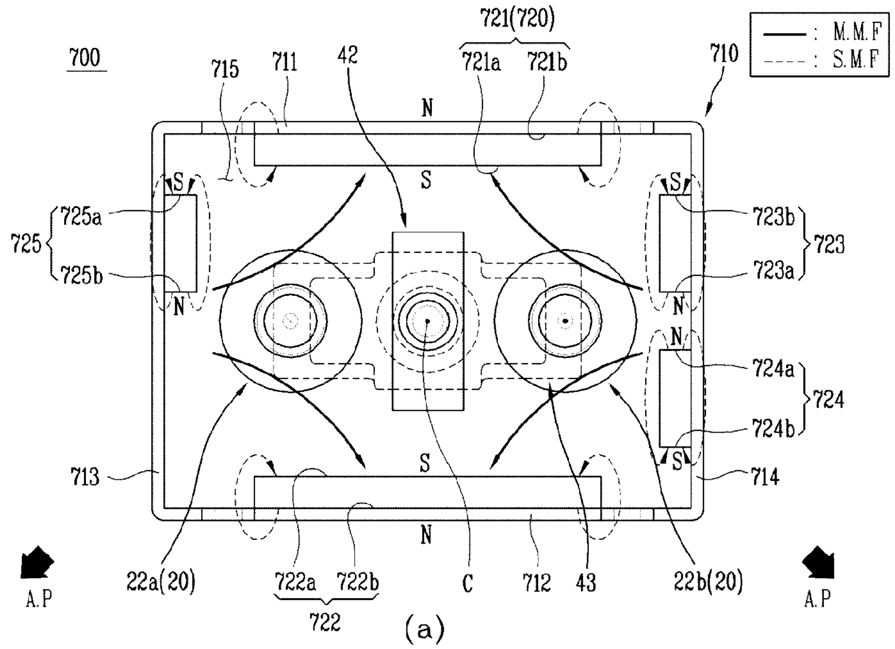
Figure 49:
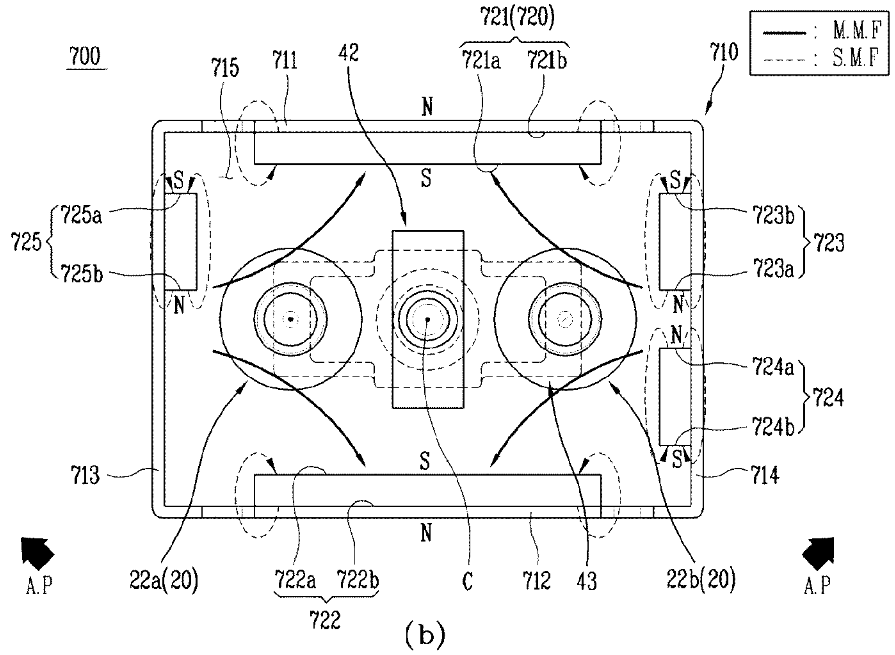

Referring to FIG. 49, the first inner surface 721*a* and the second inner surface 722*a* are magnetized to S pole. In addition, the third facing surface 723*a*, the fourth facing surface 724*a*, and the fifth opposing surface 725*b* are magnetized to N poles.

Accordingly, main magnetic fields M.M.F formed between the first and second magnet parts 721 and 722 and the third magnet part 723 are formed in directions from the third facing surface 723*a* toward the first and second inner surfaces 721*a* and 722*a*.

Further, main magnetic fields M.M.F formed between the first and second magnet parts 721 and 722 and the fourth magnet part 724 are formed in directions from the fourth facing surface 724*a* toward the first and second inner surfaces 721*a* and 722*a*.

Furthermore, main magnetic fields M.M.F formed between the first and second magnet parts 721 and 722 and the fifth magnet part 725 are formed in directions from the fifth opposing surface 725*b* toward the first and second inner surfaces 721*a* and 722*a*.

In this case, the first magnet part 721 forms a sub magnetic field S.M.F in a direction from the first outer surface 721*b* toward the first inner surface 721*a*. The second magnet part 722 forms a sub magnetic field S.M.F in a direction from the second outer surface 722*b* toward the second inner surface 722*a*.

Further, the third and fourth magnet parts 723 and 724 form sub magnetic fields S.M.F in directions from the facing surfaces 723*a* and 724*a* toward the opposing surfaces 723*b* and 724*b*, respectively.

Furthermore, the fifth magnet part 725 forms a sub magnetic field S.M.F in a direction from the fifth opposing surface 725*b* toward the fifth facing surface 725*a*.

By the formed main magnetic fields M.M.F and sub magnetic fields S.M.F, in the embodiment illustrated in FIG. 49A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 49B, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Figure 50:
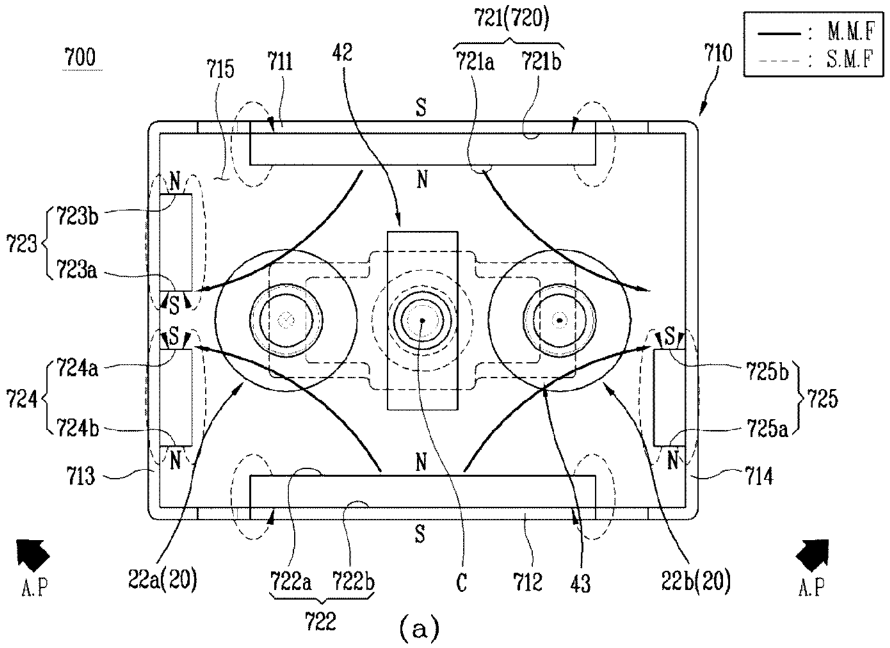
FIGS. 50 and 51 are conceptual views illustrating arc paths formed by the arc path formation unit of FIG. 42.
Figure 50:
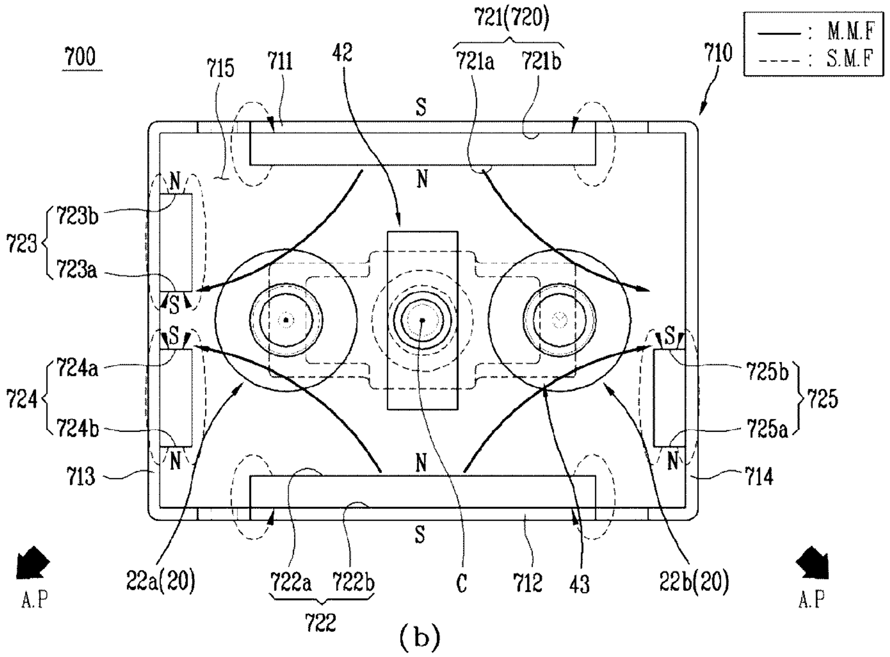

Referring to FIG. 50, the first inner surface 721*a* and the second inner surface 722*a* are magnetized to N poles. In addition, the third facing surface 723*a*, the fourth facing surface 724*a*, and the fifth opposing surface 725*b* are magnetized to S poles.

Accordingly, main magnetic fields M.M.F formed between the first and second magnet parts 721 and 722 and the third magnet part 723 are formed in directions from the first and second inner surfaces 721*a* and 722*a* toward the third facing surface 723*a*.

Further, main magnetic fields M.M.F formed between the first and second magnet parts 721 and 722 and the fourth magnet part 724 are formed in directions from the first and second inner surfaces 721*a* and 722*a* toward the fourth facing surface 724*a*.

Furthermore, main magnetic fields M.M.F formed between the first and second magnet parts 721 and 722 and the fifth magnet part 725 are formed in directions from the first and second inner surfaces 721*a* and 722*a* toward the fifth opposing surface 725*b*.

In this case, the first magnet part 721 forms a sub magnetic field S.M.F in a direction from the first inner surface 721*a* toward the first outer surface 721*b*. The second magnet part 722 forms a sub magnetic field S.M.F in a direction from the second inner surface 722*a* toward the second outer surface 722*b*.

Further, the third and fourth magnet parts 723 and 724 form sub magnetic fields S.M.F in directions from the opposing surfaces 723*b* and 724*b* toward the facing surfaces 723*a* and 724*a*, respectively.

Furthermore, the fifth magnet part 725 forms a sub magnetic field S.M.F in a direction from the fifth facing surface 725*a* toward the fifth opposing surface 725*b*.

By the formed main magnetic fields M.M.F and sub magnetic fields S.M.F, in the embodiment illustrated in FIG. 50A, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 50B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Figure 51:
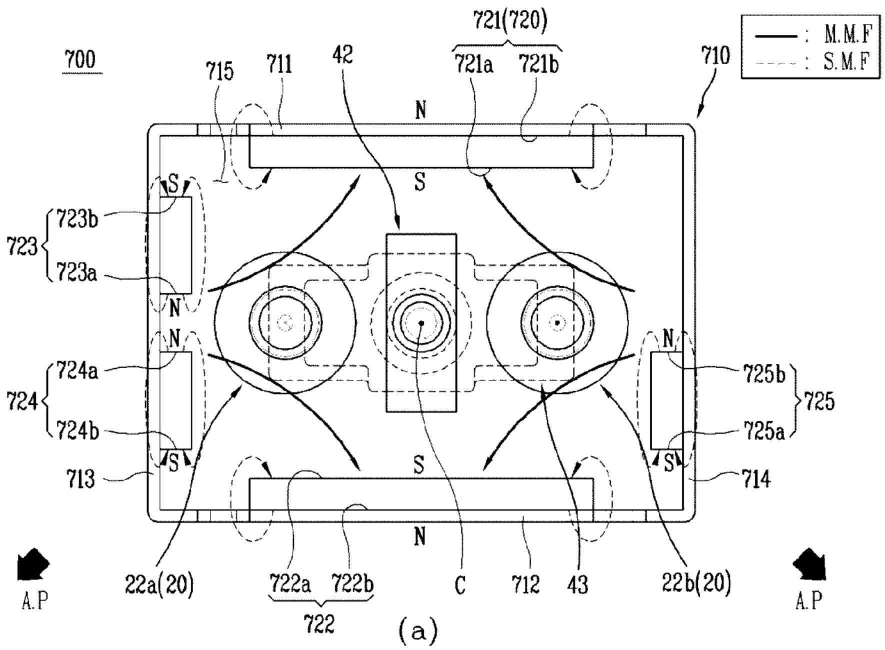
Figure 51:
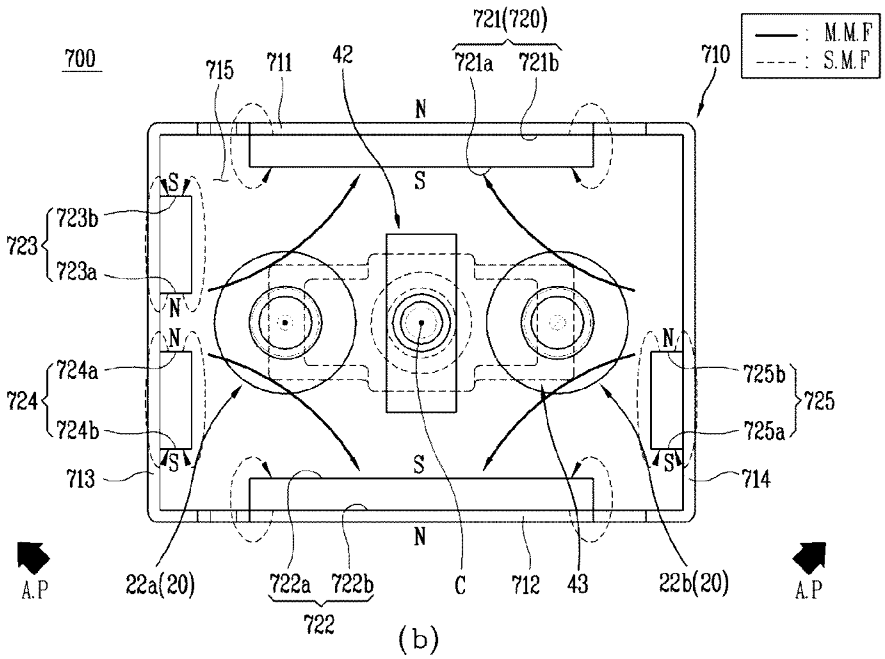

Referring to FIG. 51, the first inner surface 721*a* and the second inner surface 722*a* are magnetized to S poles. In addition, the third facing surface 723*a*, the fourth facing surface 724*a*, and the fifth opposing surface 725*b* are magnetized to N poles.

Accordingly, main magnetic fields M.M.F formed between the first and second magnet parts 721 and 722 and the third magnet part 723 are formed in directions from the third facing surface 723*a* toward the first and second inner surfaces 721*a* and 722*a*.

Further, main magnetic fields M.M.F formed between the first and second magnet parts 721 and 722 and the fourth magnet part 724 are formed in directions from the fourth facing surface 724*a* toward the first and second inner surfaces 721*a* and 722*a*.

Furthermore, main magnetic fields M.M.F formed between the first and second magnet parts 721 and 722 and the fifth magnet part 725 are formed in directions from the fifth opposing surface 725*b* toward the first and second inner surfaces 721*a* and 722*a*.

In this case, the first magnet part 721 forms a sub magnetic field S.M.F in a direction from the first outer surface 721*b* toward the first inner surface 721*a*. The second magnet part 722 forms a sub magnetic field S.M.F in a direction from the second outer surface 722*b* toward the second inner surface 722*a*.

Further, the third and fourth magnet parts 723 and 724 form sub magnetic fields S.M.F in directions from the facing surfaces 723*a* and 724*a* toward the facing surfaces 723*b* and 724*b*, respectively.

Furthermore, the fifth magnet part 725 forms a sub magnetic field S.M.F in a direction from the fifth opposing surface 725*b* toward the fifth facing surface 725*a*.

By the formed main magnetic fields M.M.F and sub magnetic fields S.M.F, in the embodiment illustrated in FIG. 51A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 51B, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Figure 52:
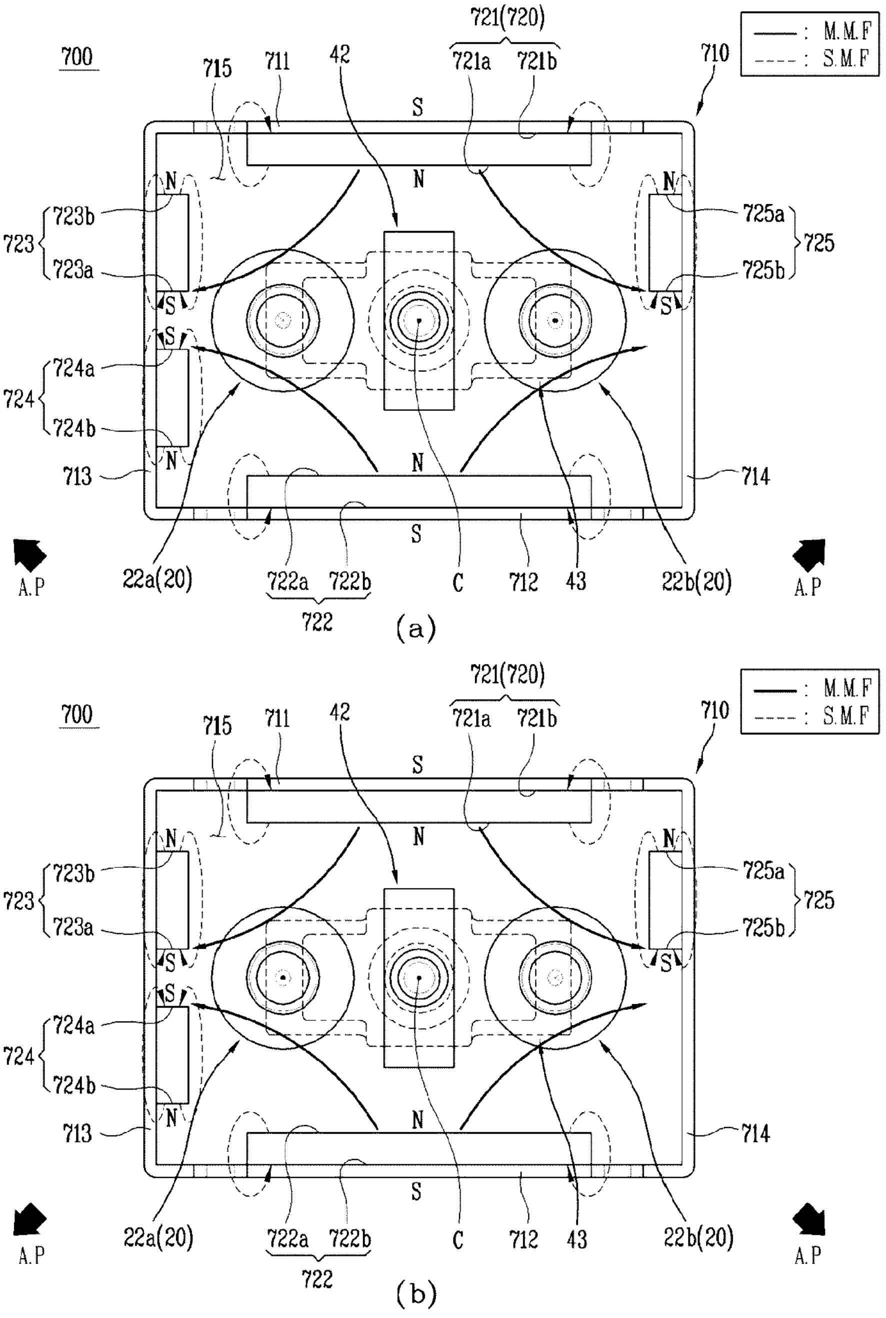
FIGS. 52 and 53 are conceptual views illustrating arc paths formed by the arc path formation unit of FIG. 43.

Referring to FIG. 52, the first inner surface 721*a* and the second inner surface 722*a* are magnetized to N poles. In addition, the third facing surface 723*a*, the fourth facing surface 724*a*, and the fifth opposing surface 725*b* are magnetized to S poles.

Accordingly, magnetic fields M.M.F. formed between the first and second magnet parts 721 and 722 and the third magnet part 723 are formed in directions from the first and second inner surfaces 721*a* and 722*a* toward the third facing surface 723*a*.

Further, main magnetic fields M.M.F formed between the first and second magnet parts 721 and 722 and the fourth magnet part 724 are formed in directions from the first and second inner surfaces 721*a* and 722*a* toward the fourth facing surface 724*a*.

Furthermore, main magnetic fields M.M.F formed between the first and second magnet parts 721 and 722 and the fifth magnet part 725 are formed in directions from the first and second inner surfaces 721*a* and 722*a* toward the fifth opposing surface 725*b*.

In this case, the first magnet part 721 forms a sub magnetic field S.M.F in a direction from the first inner surface 721*a* toward the first outer surface 721*b*. The second magnet part 722 forms a sub magnetic field S.M.F in a direction from the second inner surface 722*a* toward the second outer surface 722*b*.

Further, the third and fourth magnet parts 723 and 724 form sub magnetic fields S.M.F in directions from the opposing surfaces 723*b* and 724*b* toward the facing surfaces 723*a* and 724*a*, respectively.

Furthermore, the fifth magnet part 725 forms a sub magnetic field S.M.F in a direction from the fifth facing surface 725*a* toward the fifth opposing surface 725*b*.

By the formed main magnetic fields M.M.F and sub magnetic fields S.M.F, in the embodiment illustrated in FIG. 52A, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 52B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Figure 53:
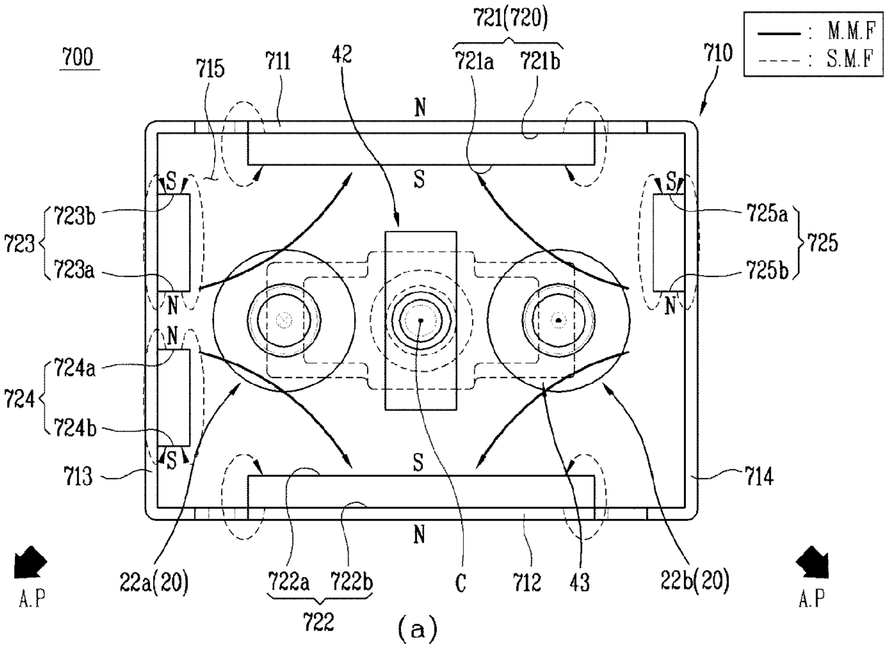
Figure 53:
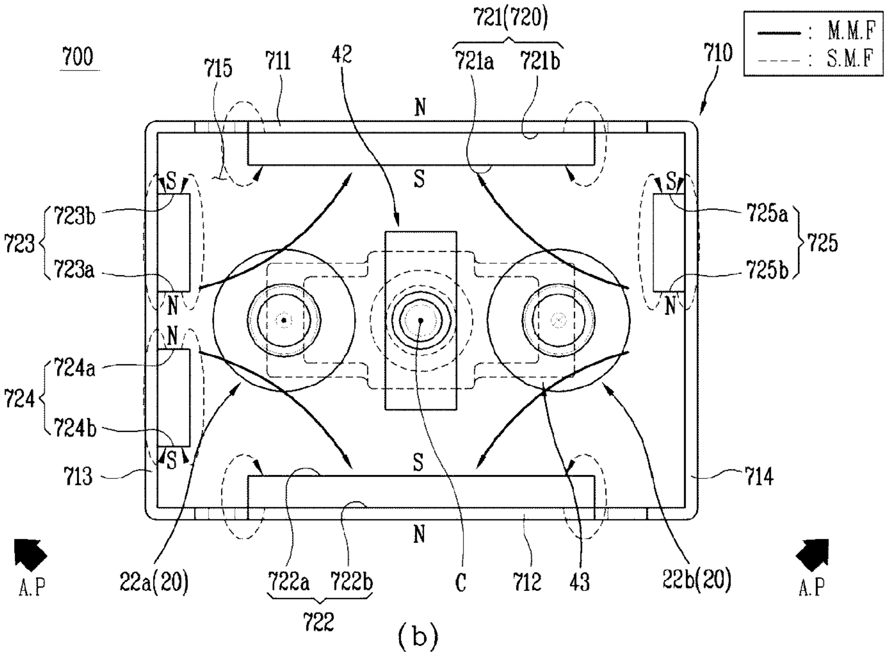

Referring to FIG. 53, the first inner surface 721*a* and the second inner surface 722*a* are magnetized to S poles. In addition, the third facing surface 723*a*, the fourth facing surface 724*a*, and the fifth opposing surface 725*b* are magnetized to N poles.

Accordingly, main magnetic fields M.M.F formed between the first and second magnet parts 721 and 722 and the third magnet part 723 are formed in directions from the third facing surface 723*a* toward the first and second inner surfaces 721*a* and 722*a*.

Further, main magnetic fields M.M.F formed between the first and second magnet parts 721 and 722 and the fourth magnet part 724 are formed in directions from the fourth facing surface 724*a* toward the first and second inner surfaces 721*a* and 722*a*.

Furthermore, main magnetic fields M.M.F formed between the first and second magnet parts 721 and 722 and the fifth magnet part 725 are formed in directions from the fifth opposing surface 725*b* toward the first and second inner surfaces 721*a* and 722*a*.

In this case, the first magnet part 721 forms a sub magnetic field S.M.F in a direction from the first outer surface 721*b* toward the first inner surface 721*a*. The second magnet part 722 forms a sub magnetic field S.M.F in a direction from the second outer surface 722*b* toward the second inner surface 722*a*.

Further, the third and fourth magnet parts 723 and 724 form sub magnetic fields S.M.F in directions from the facing surfaces 723*a* and 724*a* toward the opposing surfaces 723*b* and 724*b*, respectively.

Furthermore, the fifth magnet part 725 forms a sub magnetic field S.M.F in a direction from the fifth opposing surface 725*b* toward the fifth facing surface 725*a*.

By the formed main magnetic fields M.M.F and sub magnetic fields S.M.F, in the embodiment illustrated in FIG. 53A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 53B, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Figure 54:
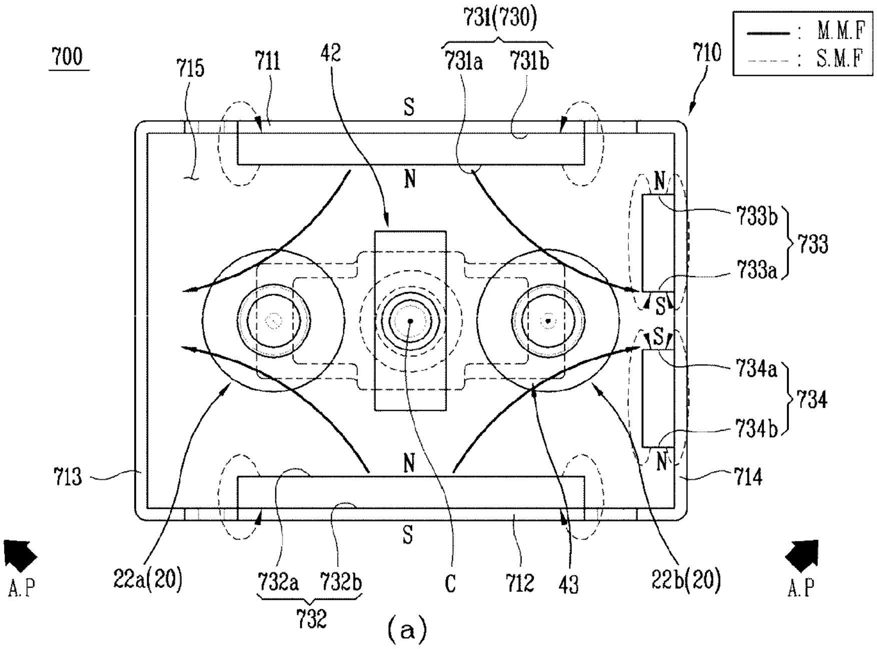
FIGS. 54 and 55 are conceptual views illustrating arc paths formed by the arc path formation unit of FIG. 44.
Figure 54:
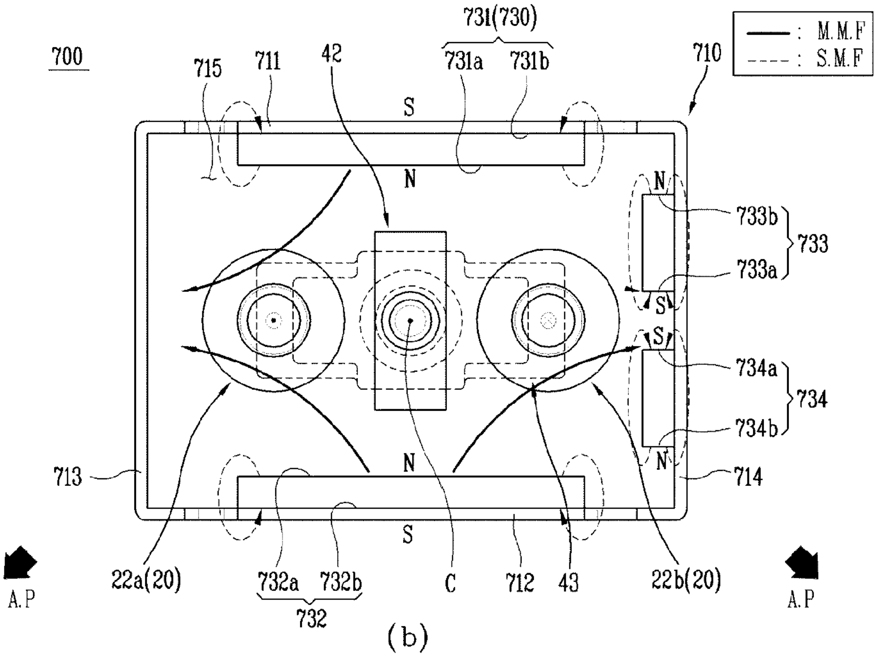

Referring to FIG. 54, a first inner surface 731*a* and a second inner surface 732*a* are magnetized to N poles. In addition, a third facing surface 733*a* and a fourth facing surface 734*a* are magnetized to S poles.

Accordingly, main magnetic fields M.M.F formed between the first and second magnet parts 731 and 732 and the third magnet part 733 are formed in directions from the first and second inner surfaces 731*a* and 732*a* toward the third facing surface 733*a*.

Further, main magnetic fields M.M.F formed between the first and second magnet parts 731 and 732 and the fourth magnet part 734 are formed in directions from the first and second inner surfaces 731*a* and 732*a* toward the fourth facing surface 734*a*.

In this case, the first magnet part 731 forms a sub magnetic field S.M.F in a direction from the first inner surface 731*a* toward a first outer surface 731*b*. The second magnet part 732 forms a sub magnetic field S.M.F in a direction from the second inner surface 732*a* toward the second outer surface 732*b*.

Further, the third and fourth magnet parts 733 and 734 form sub magnetic fields S.M.F in directions from the opposing surfaces 733*b* and 734*b* toward the facing surfaces 733*a* and 734*a*, respectively.

By the formed main magnetic fields M.M.F and sub magnetic fields S.M.F, in the embodiment illustrated in FIG. 54A, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 54B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Figure 55:
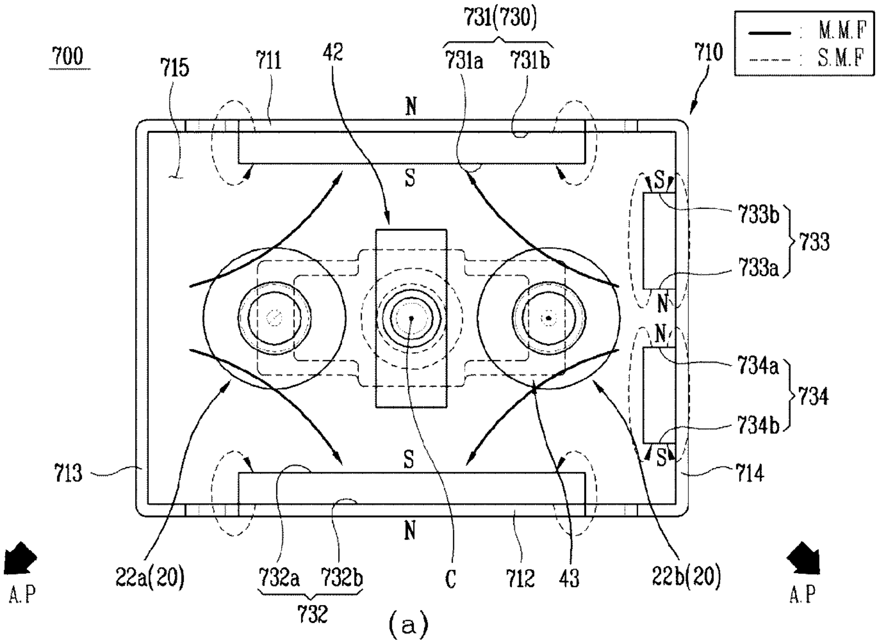
Figure 55:
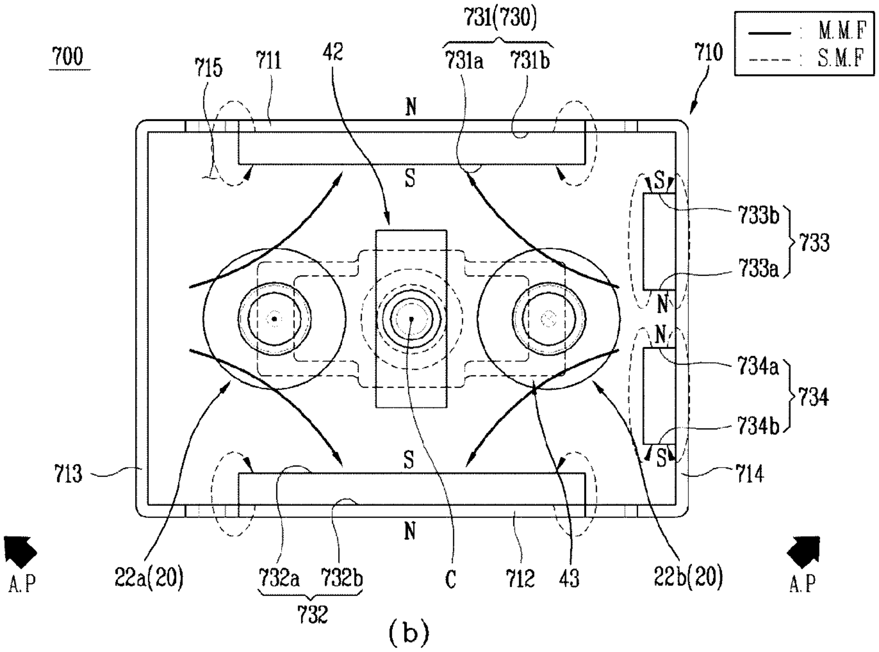

Referring to FIG. 55, the first inner surface 731*a* and the second inner surface 732*a* are magnetized to S poles. In addition, the third facing surface 733*a* and the fourth facing surface 734*a* are magnetized to N poles.

Accordingly, magnetic fields M.M.F. formed between the first and second magnet parts 731 and 732 and the third magnet part 733 are formed in directions from the third facing surface 733*a* toward the first and second inner surfaces 731*a* and 732*a*.

Further, main magnetic fields M.M.F formed between the first and second magnet parts 731 and 732 and the fourth magnet part 734 are formed in directions from the fourth facing surface 734*a* toward the first and second inner surfaces 731*a* and 732*a*.

In this case, the first magnet part 731 forms a sub magnetic field S.M.F in a direction from the first outer surface 731*b* toward the first inner surface 731*a*. The second magnet part 732 forms a sub magnetic field S.M.F in a direction from the second outer surface 732*b* toward the second inner surface 732*a*.

Further, the third and fourth magnet parts 733 and 734 form sub magnetic fields S.M.F in directions from the facing surfaces 733*a* and 734*a* toward the opposing surfaces 733*b* and 734*b*, respectively.

By the formed main magnetic fields M.M.F and sub magnetic fields S.M.F, in the embodiment illustrated in FIG. 55A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 55B, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Figure 56:
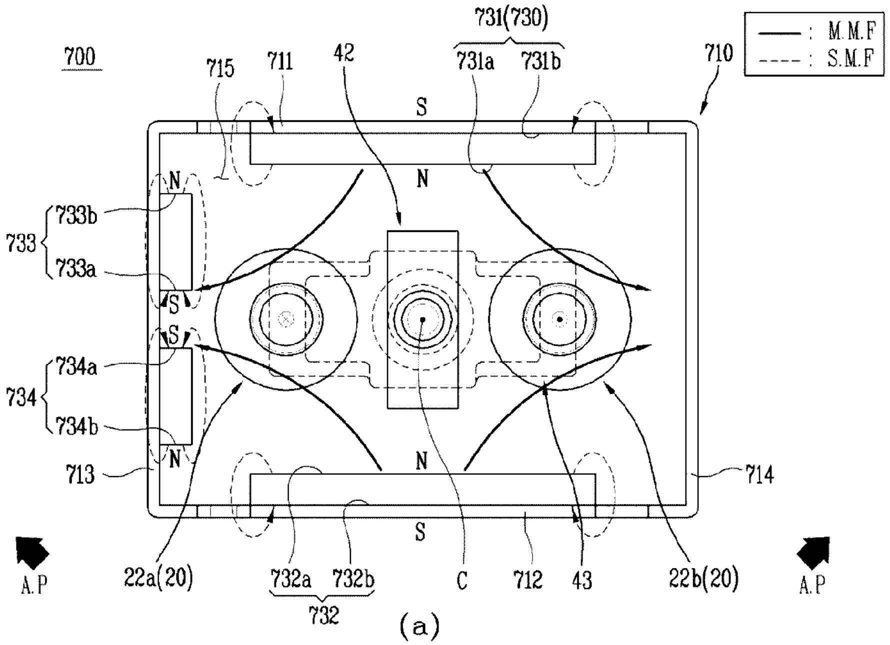
FIGS. 56 and 57 are conceptual views illustrating arc paths formed by the arc path formation unit of FIG. 45.
Figure 56:
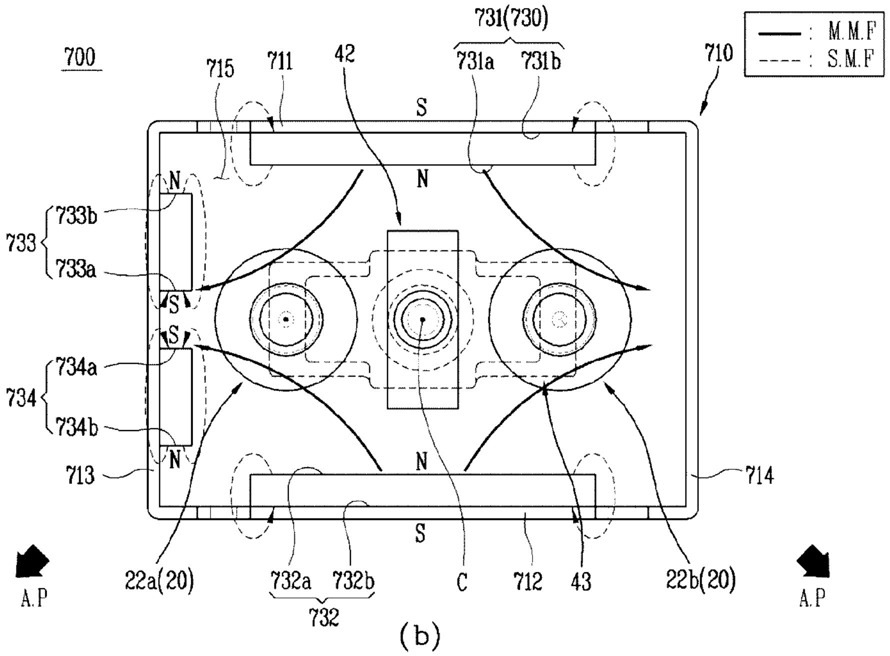

Referring to FIG. 56, the first inner surface 731*a* and the second inner surface 732*a* are magnetized to N poles. In addition, a third facing surface 733*a* and a fourth facing surface 734*a* are magnetized to S poles.

Accordingly, main magnetic fields M.M.F formed between the first and second magnet parts 731 and 732 and the third magnet part 733 are formed in directions from the first and second inner surfaces 731*a* and 732*a* toward the third facing surface 733*a*.

Further, main magnetic fields M.M.F formed between the first and second magnet parts 731 and 732 and the fourth magnet part 734 are formed in directions from the first and second inner surfaces 731*a* and 732*a* toward the fourth facing surface 734*a*.

In this case, the first magnet part 731 forms a sub magnetic field S.M.F in a direction from the first inner surface 731*a* toward a first outer surface 731*b*. The second magnet part 732 forms a sub magnetic field S.M.F in a direction from the second inner surface 732*a* toward the second outer surface 732*b*.

Further, the third and fourth magnet parts 733 and 734 form sub magnetic fields S.M.F in directions from the opposing surfaces 733*b* and 734*b* toward the facing surfaces 733*a* and 734*a*, respectively.

By the formed main magnetic fields M.M.F and sub magnetic fields S.M.F, in the embodiment illustrated in FIG. 56A, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

Similarly, in the embodiment illustrated in FIG. 56B, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Figure 57:
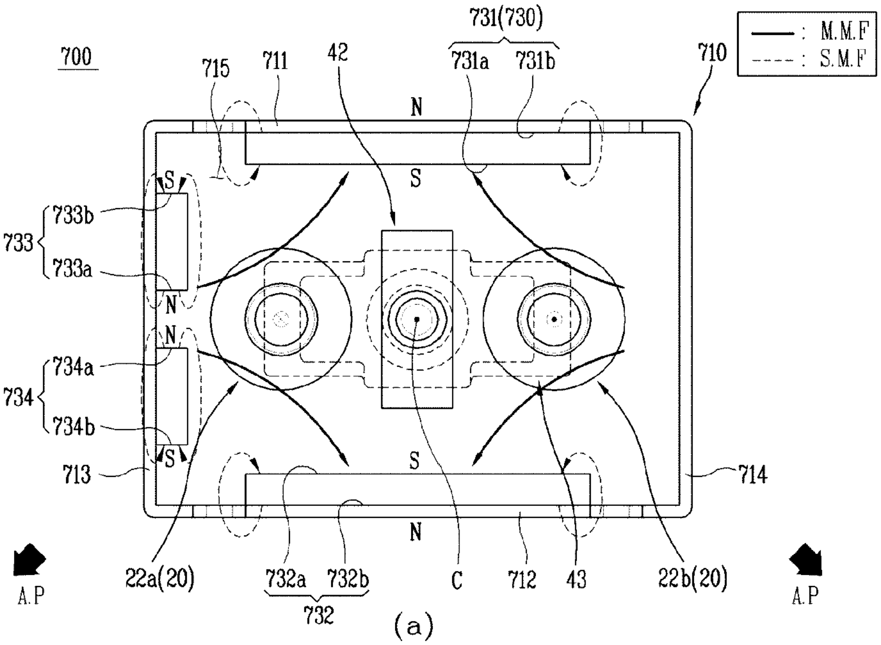
Figure 57:
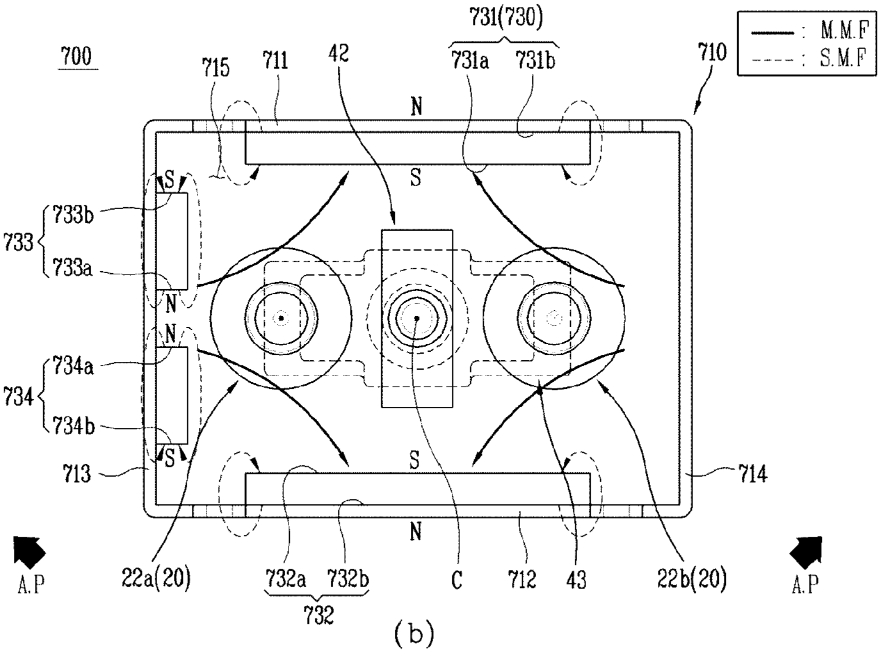

Referring to FIG. 57, the first inner surface 731*a* and the second inner surface 732*a* are magnetized to S poles. In addition, a third facing surface 733*a* and a fourth facing surface 734*a* are magnetized to N poles.

Accordingly, main magnetic fields M.M.F formed between the first and second magnet parts 731 and 732 and the third magnet part 733 are formed in directions from the third facing surface 733*a* toward the first and second inner surfaces 731*a* and 732*a*.

Further, main magnetic fields M.M.F formed between the first and second magnet parts 731 and 732 and the fourth magnet part 734 are formed in directions from the fourth facing surface 734*a* toward the first and second inner surfaces 731*a* and 732*a*.

In this case, the first magnet part 731 forms a sub magnetic field S.M.F in a direction from the first outer surface 731*b* toward the first inner surface 731*a*. The second magnet part 732 forms a sub magnetic field S.M.F in a direction from the second outer surface 732*b* toward the second inner surface 732*a*.

Further, the third and fourth magnet parts 733 and 734 form sub magnetic fields S.M.F in directions from the facing surfaces 733*a* and 734*a* toward the opposing surfaces 733*b* and 734*b*, respectively.

By the formed main magnetic fields M.M.F and sub magnetic fields S.M.F, in the embodiment illustrated in FIG. 57A, an electromagnetic force in a direction toward the front left side is generated in the vicinity of the first fixed contactor 22*a*. An arc path A.P is formed toward the front left side along the direction of the electromagnetic force.

Further, an electromagnetic force in a direction toward the front right side is generated in the vicinity of the second fixed contactor 22*b*. An arc path A.P is formed toward the front right side along the direction of the electromagnetic force.

Similarly, in the embodiment illustrated in FIG. 57B, an electromagnetic force in a direction toward the rear left side is generated in the vicinity of the first fixed contactor 22*a*. An arc path A.P is formed toward the rear left side along the direction of the electromagnetic force.

Further, an electromagnetic force in a direction toward the rear right side is generated in the vicinity of the second fixed contactor 22*b*. An arc path A.P is formed toward the rear right side along the direction of the electromagnetic force.

In the present embodiment, the arc path A.P formed by the arc path formation unit 700 does not extend toward the central portion C. Accordingly, damage to constituent elements disposed in the central portion C can be prevented.

Each of the arc path formation units 500, 600, and 700 according to various embodiments of the present disclosure described above forms a magnetic field inside the arc chamber 21. The formed magnetic field forms an electromagnetic force in various directions depending on a direction of current flowing through the direct current relay 1.

In this case, the electromagnetic force formed in the vicinity of each of the fixed contactors 220*a* and 220*b* is formed in a direction away from the central portion C. Accordingly, an arc path A.P of an arc formed due to the formed electromagnetic force is also formed in the direction away from the central portion C.

Accordingly, even when the direction of the current flowing through the direct current relay 1 is changed, the generated arc propagates in the direction opposite to the central portion C. Accordingly, damage to various constituent elements located at the central portion C of the direct current relay 1 can be prevented.

Furthermore, each of the magnet parts 520, 620, 630, 720, and 730 forms a main magnetic field M.M.F and a sub magnetic field S.M.F. The sub magnetic field S.M.F formed by the single magnet is formed in the same direction as the main magnetic fields M.M.F formed between a plurality of magnets. That is, the sub magnetic field S.M.F is formed in a direction in which the main magnetic fields M.M.F are enhanced.

Accordingly, the strength of the magnetic field formed by each of the arc path formation units 500, 600, and 700 and the strength of the electromagnetic force generated thereby are enhanced. As a result, the arc path A.P of the generated arc can be more effectively formed.

Although it has been described above with reference to preferred embodiments of the present disclosure, it will be understood that those skilled in the art are able to variously modify and change the present disclosure without departing from the spirit and scope of the disclosure described in the claims below.

1: direct current relay
10: frame part
11: upper frame
12: lower frame
13: insulating plate
14: supporting plate
20: opening/closing part
21: arc chamber
22: fixed contactor

22*a*: first fixed contactor
22*b*: second fixed contactor
23: sealing member
30: core part
31: fixed core
32: movable core
33: york
34: bobbin
35: coil
36: return spring
37: cylinder
40: movable contactor part
41: housing
42: cover
43: movable contactor
44: shaft
45: elastic portion
100: arc path formation unit according to first embodiment of present disclosure
110: magnet frame
111: first surface
112: second surface
113: third surface
114: fourth surface
115: space portion
120: first magnet part
121: first facing surface
122: first opposing surface
130: second magnet part
131: second facing surface
132: second opposing surface
140: third magnet part
141: third facing surface
142: third opposing surface
150: fourth magnet part
151: fourth facing surface
152: fourth opposing surface
160: fifth magnet part
161: fifth facing surface
162: fifth opposing surface
170: sixth magnet part
171: sixth facing surface
172: sixth opposing surface
200: arc path formation unit according to second embodiment of present disclosure
210: magnet frame
211: first surface
212: second surface
213: third surface
214: fourth surface
215: space portion
220: first magnet part
221: first facing surface
222: first opposing surface
230: second magnet part
231: second facing surface
232: second opposing surface
240: third magnet part
241: third facing surface
242: third opposing surface
250: fourth magnet part
251: fourth facing surface
252: fourth opposing surface
300: arc path formation unit according to third embodiment of present disclosure
310: magnet frame
311: first surface
312: second surface
313: third surface
314: fourth surface
315: space portion
320: first magnet part
321: first facing surface
322: first opposing surface
330: second magnet part
331: second facing surface
332: second opposing surface
340: third magnet part
341: third facing surface
342: third opposing surface
350: fourth magnet part
351: fourth facing surface
352: fourth opposing surface
360: fifth magnet part
361: fifth facing surface
362: fifth opposing surface
500: arc path formation unit according to fourth embodiment of present disclosure
510: magnet frame
511: first surface
512: second surface
513: third surface
514: fourth surface
515: space portion
520: magnet part
521: first magnet part
521*a*: first inner surface
521*b*: first outer surface
522: second magnet part
522*a*: second inner surface
522*b*: second outer surface
523: third magnet part
523*a*: third facing surface
523*b*: third opposing surface
524: fourth magnet part
524*a*: fourth facing surface
524*b*: fourth opposing surface
525: fifth magnet part
525*a*: fifth facing surface
525*b*: fifth opposing surface
526: sixth magnet part
526*a*: sixth facing surface
526*b*: sixth opposing surface
600: arc path formation unit according to fifth embodiment of present disclosure
610: magnet frame
611: first surface
612: second surface
613: third surface
614: fourth surface
615: space portion
620: magnet part
621: first magnet part
621*a*: first inner surface
621*b*: first outer surface
622: second magnet part
622*a*: second inner surface
622*b*: second outer surface
623: third magnet part
623*a*: third facing surface
623*b*: third opposing surface
624: fourth magnet part
624*a*: fourth facing surface
624*b*: fourth opposing surface

630: magnet part according to modified example
631: first magnet part
631*a*: first inner surface
631*b*: first outer surface
632: second magnet part
632*a*: second inner surface
632*b*: second outer surface
633: third magnet part
633*a*: third facing surface
633*b*: third opposing surface
634: fourth magnet part
634*a*: fourth facing surface
634*b*: fourth opposing surface
700: arc path formation unit according to sixth embodiment of present disclosure
710: magnet frame
711: first surface
712: second surface
713: third surface
714: fourth surface
715: space portion
720: magnet part
721: first magnet part
721*a*: first inner surface
721*b*: first outer surface
722: second magnet part
722*a*: second inner surface
722*b*: second outer surface
723: third magnet part
723*a*: third facing surface
723*b*: third opposing surface
724: fourth magnet part
724*a*: fourth facing surface
724*b*: fourth opposing surface
725: fifth magnet part
725*a*: fifth facing surface
725*b*: fifth opposing surface
730: magnet part according to modified example
731: first magnet part
731*a*: first inner surface
731*b*: first outer surface
732: second magnet part
732*a*: second inner surface
732*b*: second outer surface
733: third magnet part
733*a*: third facing surface
733*b*: third opposing surface
734: fourth magnet part
734*a*: fourth facing surface
734*b*: fourth opposing surface
1000: direct current relay according to related art
1100: fixed contact according to related art
1200: movable contact according to related art
1300: permanent magnet according to related art
1310: first permanent magnet according to related art
1320: second permanent magnet according to related art
C: central portion of each of space portions 115, 215, 315, 515, 615, and 715
M.M.F: main magnetic field
S.M.F: sub magnetic field
A.P: arc path

The invention claimed is:

1. An arc path formation unit comprising:
a magnet frame having a space formed therein and including a plurality of surfaces surrounding the space; and
a magnet part accommodated in the space and configured to form a magnetic field in the space,
wherein the plurality of surfaces include:
a first surface formed to extend in one direction;
a second surface disposed to face the first surface and formed to extend in the one direction; and
a third surface and a fourth surface that are continuous with the first surface and the second surface, respectively, extend in the other direction, and are disposed to face each other, and
the magnet part includes:
a first magnet part located adjacent to the first surface;
a second magnet part located adjacent to the second surface and disposed to face the first magnet part;
a third magnet part and a fourth magnet part that are located adjacent to the third surface and disposed in parallel in the other direction in which the third surface extends; and
a fifth magnet part and a sixth magnet part that are located adjacent to the fourth surface and disposed in parallel in the other direction in which the fourth surface extends,
wherein one surfaces of the first magnet part and the second magnet part facing each other are each magnetized to one of an S pole and an N pole, and
one surfaces of the third magnet part and the fourth magnet part facing each other and one surfaces of the fifth magnet part and the sixth magnet part facing each other are each magnetized to the other one of the S pole and the N pole.

2. The arc path formation unit of claim 1, wherein the space accommodates a fixed contactor formed to extend in the one direction and a movable contactor configured to be brought into contact with or separated from the fixed contactor,
wherein the fixed contactor includes a first fixed contactor and a second fixed contactor that are located to be spaced apart from each other, and
the first magnet part and the second magnet part are disposed such that a virtual line connecting the first magnet part and the second magnet part intersects a virtual line connecting the first fixed contactor and the second fixed contactor.

3. The arc path formation unit of claim 1, wherein
the space accommodates a fixed contactor formed to extend in the one direction and a movable contactor configured to be brought into contact with or separated from the fixed contactor, and
the one surfaces of the third magnet part and the fourth magnet part facing each other are disposed to face each other with a virtual straight line extending from the fixed contactor therebetween.

4. The arc path formation unit of claim 1, wherein
the space accommodates a fixed contactor formed to extend in the one direction and a movable contactor configured to be brought into contact with or separated from the fixed contactor, and
the one surfaces of the fifth magnet part and the sixth magnet part facing each other are disposed to face each other with a virtual straight line extending from the fixed contactor therebetween.

5. A direct current relay comprising:
a fixed contactor formed to extend in one direction;
a movable contactor configured to be brought into contact with or separated from the fixed contactor; and
an arc path formation unit having a space portion, in which the fixed contactor and the movable contactor are accommodated, formed therein and configured to form a magnetic field that induces an arc, which is generated as the fixed contactor and the movable contactor are separated from each other, in the space portion, wherein the arc path formation unit includes:

a magnet frame having the space portion formed therein and including a plurality of surfaces surrounding the space portion; and a magnet part accommodated in the space portion and configured to form the magnetic field, wherein the plurality of surfaces include:

a first surface formed to extend in the one direction;

a second surface disposed to face the first surface with the space portion therebetween and formed to extend in the one direction; and a third surface and a fourth surface that are continuous with the first surface and the second surface, respectively, extend in the other direction, and are disposed to face each other with the space portion therebetween, and the magnet part includes:

a first magnet part located adjacent to the first surface and extending in the one direction;

a second magnet part located adjacent to the second surface, extending in the one direction, and disposed to face the first magnet part;

a third magnet part located adjacent to the third surface, extending in the other direction, and located to be biased to the first surface;

a fourth magnet part located adjacent to the third surface, extending in the other direction, and located to be biased to the second surface;

a fifth magnet part located adjacent to the fourth surface, extending in the other direction, and located to be biased to the first surface; and a sixth magnet part located adjacent to the fourth surface, extending in the other direction, and located to be biased to the second surface, wherein one surfaces of the first magnet part and the second magnet part facing each other are each magnetized to one of an S pole and an N pole, and one surfaces of the third magnet part and the fourth magnet part facing each other and one surfaces of the fifth magnet part and the sixth magnet part facing each other are each magnetized to the other one of the S pole and the N pole.

6. An arc path formation unit comprising:

a magnet frame having a space formed therein and including a plurality of surfaces surrounding the space; and a magnet part accommodated in the space and configured to form a magnetic field in the space, wherein the plurality of surfaces include:

a first surface formed to extend in one direction;

a second surface disposed to face the first surface and formed to extend in the one direction; and a third surface and a fourth surface that are continuous with the first surface and the second surface, respectively, extend in the other direction, and are disposed to face each other, and the magnet part includes:

a first magnet part located adjacent to the first surface;

a second magnet part located adjacent to the second surface and disposed to face the first magnet part;

a third magnet part located adjacent to the third surface, and located to be biased to any one surface of the first surface and the second surface; and a fourth magnet part located adjacent to the fourth surface, and located to be biased to the other surface of the first surface and the second surface, wherein one surfaces of the first magnet part and the second magnet part facing each other are each magnetized to one of an S pole and an N pole, and one surface of the third magnet part facing the other surface and one surface of the fourth magnet part facing the any one surface are each magnetized to the other one of the S pole and the N pole.

7. The arc path formation unit of claim 6, wherein the space accommodates a fixed contactor formed to extend in the one direction and a movable contactor configured to be brought into contact with or separated from the fixed contactor, and the one surface of the third magnet part is located between a virtual straight line extending from the fixed contactor and the any one surface.

8. The arc path formation unit of claim 6, wherein the space accommodates a fixed contactor formed to extend in the one direction and a movable contactor configured to be brought into contact with or separated from the fixed contactor, and the one surface of the fourth magnet part is located between a virtual straight line extending from the fixed contactor and the other surface.

9. A direct current relay comprising:

a fixed contactor formed to extend in one direction;

a movable contactor configured to be brought into contact with or separated from the fixed contactor; and an arc path formation unit having a space portion, in which the fixed contactor and the movable contactor are accommodated, formed therein and configured to form a magnetic field that induces an arc, which is generated as the fixed contactor and the movable contactor are separated from each other, in the space portion, wherein the arc path formation unit includes:

a magnet frame having the space portion formed therein and including a plurality of surfaces surrounding the space portion; and a magnet part accommodated in the space portion and configured to form the magnetic field, wherein the plurality of surfaces include:

a first surface formed to extend in the one direction;

a second surface disposed to face the first surface and formed to extend in the one direction; and a third surface and a fourth surface that are continuous with the first surface and the second surface, respectively, extend in the other direction, and are disposed to face each other, and the magnet part includes:

a first magnet part located adjacent to the first surface and extending in the one direction;

a second magnet part located adjacent to the second surface, extending in the one direction, and disposed to face the first magnet part with the fixed contactor therebetween;

a third magnet part located adjacent to the third surface, extending in the other direction, and located to be biased to any one surface of the first surface and the second surface; and a fourth magnet part located adjacent to the fourth surface, extending in the other direction, and located to be biased to the other surface of the first surface and the second surface, wherein one surfaces of the first magnet part and the second magnet part facing each other are each magnetized to one of an S pole and an N pole, and one surface of the third magnet part facing the other surface and one surface of the fourth magnet part facing the any one surface are each magnetized to the other one of the S pole and the N pole.

10. An arc path formation unit comprising:

a magnet frame having a space formed therein and including a plurality of surfaces surrounding the space; and a magnet part accommodated in the space and configured to form a magnetic field in the space, wherein the plurality of surfaces include:

a first surface formed to extend in one direction;

a second surface disposed to face the first surface and formed to extend in the one direction; and a third surface and a fourth surface that are continuous with the first surface and the second surface, respectively, extend in the other direction, and are disposed to face each other, and the magnet part includes:

a first magnet part located adjacent to the first surface;

a second magnet part located adjacent to the second surface and disposed to face the first magnet part; and a third magnet part located adjacent to one of the third surface and the fourth surface, and located to be biased to any one surface of the first surface and the second surface, wherein one surfaces of the first magnet part and the second magnet part facing each other and one surface of the third magnet part facing the any one surface are magnetized to the same polarity.

11. The arc path formation unit of claim 10, wherein the first magnet part and the second magnet part are formed to extend in the one direction, and the third magnet part is formed to extend in the other direction.

12. An arc path formation unit comprising:

a magnet frame having a space formed therein and including a plurality of surfaces surrounding the space; and a magnet part accommodated in the space and configured to form a magnetic field in the space, wherein the plurality of surfaces include:

a first surface formed to extend in one direction;

a second surface disposed to face the first surface and formed to extend in the one direction; and a third surface and a fourth surface that are continuous with the first surface and the second surface, respectively, extend in the other direction, and are disposed to face each other, and the magnet part includes:

a first magnet part located adjacent to the first surface;

a second magnet part located adjacent to the second surface and disposed to face the first magnet part;

a third magnet part and a fourth magnet part located adjacent to any one surface of the third surface and the fourth surface and disposed in parallel; and a fifth magnet part located adjacent to the other surface of the third surface and the fourth surface, disposed to face the third magnet part and the fourth magnet part, and located to be biased to any one surface of the first surface and the second surface, wherein one surfaces of the first magnet part and the second magnet part facing each other are each magnetized to one of an S pole and an N pole, one surfaces of the third magnet part and the fourth magnet part facing each other are each magnetized to the other one of the N pole and the S pole, and one surface of the fifth magnet part facing the any one surface of the first surface and the second surface is magnetized to the one of the N pole and the S pole.

13. The arc path formation unit of claim 12, wherein the third magnet part, the fourth magnet part, and the fifth magnet part are formed to extend in the other direction, and the fifth magnet part is disposed to overlap one of the third magnet part and the fourth magnet part in the other direction.

14. The arc path formation unit of claim 12, wherein the space accommodates a fixed contactor formed to extend in the one direction and a movable contactor configured to be brought into contact with or separated from the fixed contactor, and the one surfaces of the third magnet part and the fourth magnet part facing each other are disposed to face each other with a virtual straight line extending from the fixed contactor therebetween.

15. The arc path formation unit of claim 12, wherein the space accommodates a fixed contactor extending in the one direction and a movable contactor configured to be brought into contact with or separated from the fixed contactor, and the other surface of the fifth magnet part facing the other surface of the first surface and the second surface is located between a virtual straight line extending from the fixed contactor and the any one surface of the first surface and the second surface.

16. A direct current relay comprising:

a fixed contactor formed to extend in one direction;

a movable contactor configured to be brought into contact with or separated from the fixed contactor; and an arc path formation unit having a space portion, in which the fixed contactor and the movable contactor are accommodated, formed therein and configured to form a magnetic field that induces an arc, which is generated as the fixed contactor and the movable contactor are separated from each other, in the space portion, wherein the arc path formation unit includes:

a magnet frame having the space portion formed therein and including a plurality of surfaces surrounding the space portion; and a magnet part accommodated in the space portion and configured to form the magnetic field, wherein the plurality of surfaces include:

a first surface formed to extend in the one direction;

a second surface disposed to face the first surface and formed to extend in the one direction; and a third surface and a fourth surface that are continuous with the first surface and the second surface, respectively, extend in the other direction, and are disposed to face each other, and the magnet part includes:

a first magnet part located adjacent to the first surface and formed to extend in the one direction;

a second magnet part located adjacent to the second surface, formed to extend in the one direction, and disposed to face the first magnet part;

a third magnet part and a fourth magnet part located adjacent to any one surface of the third surface and the fourth surface, disposed in parallel to each other, and each formed to extend in the other direction; and a fifth magnet part located adjacent to the other surface of the third surface and the fourth surface, disposed to face the third magnet part and the fourth magnet part, located to be biased to any one surface of the first surface and the second surface, and formed to extend in the other direction, wherein one surfaces of the first magnet part and the second magnet part facing each other are each magnetized to one of an S pole and an N pole, one surfaces of the third magnet part and the fourth magnet part facing each other are each magnetized to the other one of the N pole and the S pole, and one surface of the fifth magnet part facing the any one surface of the first surface and the second surface is magnetized to the one of the N pole and the S pole.

17. An arc path formation unit comprising:

a magnet frame having a space formed therein and including a plurality of surfaces surrounding the space; and a magnet part accommodated in the space and configured to form a magnetic field in the space, wherein the plurality of surfaces include:

a first surface formed to extend in one direction;

a second surface disposed to face the first surface and formed to extend in the one direction; and a third surface and a fourth surface that are continuous with the first surface and the second surface, respectively, extend in the other direction, and are disposed to face each other, and the magnet part includes:

a first magnet part located adjacent to the first surface;

a second magnet part located adjacent to the second surface and disposed to face the first magnet part; and a third magnet part and a fourth magnet part located adjacent to any one surface of the third surface and the fourth surface and disposed in parallel to each other, wherein one surfaces of the first magnet part and the second magnet part facing each other are each magnetized to one of an S pole and an N pole, and one surfaces of the third magnet part and the fourth magnet part facing each other are each magnetized to the other one of the N pole and the S pole.

18. The arc path formation unit of claim 17, wherein the space accommodates a fixed contactor formed to extend in the one direction and a movable contactor configured to be brought into contact with or separated from the fixed contactor, and the one surfaces of the third magnet part and the fourth magnet part facing each other are disposed to face each other with a virtual straight line extending from the fixed contactor therebetween.

19. The arc path formation unit of claim 17, wherein the first magnet part and the second magnet part are formed to extend in the one direction, and each of the third magnet part and the fourth magnet part is formed to extend in the other direction by a length by which each of the third magnet part and the fourth magnet part is shorter than each of the first magnet part and the second magnet part.

20. A direct current relay comprising:

a fixed contactor formed to extend in one direction;

a movable contactor configured to be brought into contact with or separated from the fixed contactor; and an arc path formation unit having a space portion, in which the fixed contactor and the movable contactor are accommodated, formed therein and configured to form a magnetic field that induces an arc, which is generated as the fixed contactor and the movable contactor are separated from each other, in the space portion, wherein the arc path formation unit includes:

a magnet frame having the space portion formed therein and including a plurality of surfaces surrounding the space portion; and a magnet part accommodated in the space portion and configured to form the magnetic field, wherein the plurality of surfaces include:

a first surface formed to extend in the one direction;

a second surface disposed to face the first surface and formed to extend in the one direction; and a third surface and a fourth surface that are continuous with the first surface and the second surface, respectively, extend in the other direction, and are disposed to face each other, and the magnet part includes:

a first magnet part located adjacent to the first surface and formed to extend in the one direction;

a second magnet part located adjacent to the second surface, formed to extend in the one direction, and disposed to face the first magnet part; and a third magnet part and a fourth magnet part located adjacent to any one surface of the third surface and the fourth surface, disposed in parallel to each other, and each formed to extend in the other direction, wherein one surfaces of the first magnet part and the second magnet part facing each other are each magnetized to one of an S pole and an N pole, and one surfaces of the third magnet part and the fourth magnet part facing each other are each magnetized to the other one of the N pole and the S pole.

21. An arc path formation unit comprising:

a magnet frame having a space portion, in which a fixed contactor and a movable contactor are accommodated, formed therein; and a plurality of magnet parts located in the space portion of the magnet frame and configured to form a magnetic field in the space portion, wherein a length of the space portion in one direction is formed to be greater than a length thereof in the other direction, the magnet frame includes:

a first surface and a second surface extending in the one direction, disposed to face each other, and configured to surround a portion of the space portion; and a third surface and a fourth surface which extend in the other direction, are continuous with the first surface and the second surface, respectively, are disposed to face each other, and are configured to surround a remaining portion of the space portion, and the plurality of magnet parts include:

a first magnet part located adjacent to any one surface of the third surface and the fourth surface;

a second magnet part located adjacent to the other surface of the third surface and the fourth surface, and disposed to face the first magnet part with the space portion therebetween;

a third magnet part located adjacent to any one surface of the first surface and the second surface, and located to be biased to the any one surface of the third surface and the fourth surface; and a fourth magnet part located adjacent to the other surface of the first surface and the second surface, and located to be biased to the other surface of the third surface and the fourth surface.

22. The arc path formation unit of claim 21, wherein a surface of the first magnet part facing the space portion and a surface of the second magnet part facing the space portion are magnetized to the same polarity, and a surface of the third magnet part facing the other surface of the third surface and the fourth surface, and a surface of the fourth magnet part facing the any one surface of the third surface and the fourth surface are each magnetized to a polarity different from the polarity.

23. The arc path formation unit of claim 21, wherein the fixed contactor includes a first fixed contactor and a second fixed contactor disposed to be spaced apart from each other in the one direction, the third magnet part is located to overlap one of the first fixed contactor and the second fixed contactor in the other direction, and the fourth magnet part is disposed to overlap the other one of the first fixed contactor and the second fixed contactor in the other direction.

24. The arc path formation unit of claim 21, wherein the plurality of magnet parts include:

a fifth magnet part located adjacent to the any one surface of the first surface and the second surface, and located to be biased to the other surface of the third surface and the fourth surface.

25. The arc path formation unit of claim 24, wherein a surface of the first magnet part facing the space portion and a surface of the second magnet part facing the space portion are magnetized to the same polarity, and a surface of the third magnet part facing the other surface of the third surface and the fourth surface, and surfaces of the fourth magnet part and the fifth magnet part facing each other are each magnetized to a polarity different from the polarity.

26. The arc path formation unit of claim 24, wherein the fixed contactor includes a first fixed contactor and a second fixed contactor disposed to be spaced apart from each other in the one direction, the third magnet part is located to overlap the fourth magnet part and one of the first fixed contactor and the second fixed contactor in the other direction, and the fifth magnet part is disposed to overlap the other one of the first fixed contactor and the second fixed contactor in the other direction.

27. The arc path formation unit of claim 21, wherein the plurality of magnet parts include:

a fifth magnet part located adjacent to the other surface of the first surface and the second surface, and located to be biased to the any one surface of the third surface and the fourth surface; and a sixth magnet part located adjacent to the other surface of the first surface and the second surface, and located to be biased to the other surface of the third surface and the fourth surface.

28. The arc path formation unit of claim 27, wherein a surface of the first magnet part facing the space portion and a surface of the second magnet part facing the space portion are magnetized to the same polarity, and one surfaces of the third magnet part and the fourth magnet part facing each other and one surfaces of the fifth magnet part and the sixth magnet part facing each other are each magnetized to a polarity different from the polarity.

29. The arc path formation unit of claim 27, wherein the fixed contactor includes a first fixed contactor and a second fixed contactor disposed to be spaced apart from each other in the one direction, the third magnet part is located to overlap the fifth magnet part and one of the first fixed contactor and the second fixed contactor in the other direction, and the fourth magnet part is located to overlap the sixth magnet part and the other one of the first fixed contactor and the second fixed contactor in the other direction.

30. A direct current relay comprising:

a plurality of fixed contactors located to be spaced apart from each other in one direction;

a movable contactor configured to be brought into contact with or separated from the fixed contactors;

a magnet frame having a space portion, in which the fixed contactors and the movable contactor are accommodated, formed therein; and a plurality of magnet parts located in the space portion of the magnet frame and configured to form a magnetic field in the space portion, wherein a length of the space portion in the one direction is formed to be greater than a length thereof in the other direction, the magnet frame includes:

a first surface and a second surface extending in the one direction, disposed to face each other, and configured to surround a portion of the space portion; and a third surface and a fourth surface which extend in the other direction, are continuous with the first surface and the second surface, respectively, are disposed to face each other, and are configured to surround a remaining portion of the space portion, and the plurality of magnet parts include:

a first magnet part located adjacent to any one surface of the third surface and the fourth surface; and a second magnet part located adjacent to the other surface of the third surface and the fourth surface, and disposed to face the first magnet part with the space portion therebetween.

31. The direct current relay of claim 30, wherein the plurality of magnet parts include:

a third magnet part located adjacent to any one surface of the first surface and the second surface, and located to be biased to the any one surface of the third surface and the fourth surface; and a fourth magnet part located adjacent to the other surface of the first surface and the second surface, and located to be biased to the other surface of the third surface and the fourth surface, wherein the third magnet part is disposed to overlap any one of the plurality of fixed contactors in the other direction, and the fourth magnet part is disposed to overlap the other one of the plurality of fixed contactors in the other direction.

32. The direct current relay of claim 31, wherein a surface of the first magnet part facing the space portion and a surface of the second magnet part facing the space portion are magnetized to the same polarity, and a surface of the third magnet part facing the other surface of the third surface and the fourth surface, and a surface of the fourth magnet part facing the any one surface of the third surface and the fourth surface are each magnetized to a polarity different from the polarity.

33. The direct current relay of claim 30, wherein the plurality of magnet parts include:

a third magnet part located adjacent to any one surface of the first surface and the second surface, and located to be biased to the any one surface of the third surface and the fourth surface;

a fourth magnet part located adjacent to the other surface of the first surface and the second surface, and located to be biased to the any one surface of the third surface and the fourth surface; and a fifth magnet part located adjacent to the any one surface of the first surface and the second surface, and located to be biased to the other surface of the third surface and the fourth surface, wherein the third magnet part is disposed to overlap the fourth magnet part and any one of the plurality of fixed contactors in the other direction, and the fifth magnet part is disposed to overlap the other one of the plurality of fixed contactors in the other direction.

34. The direct current relay of claim 33, wherein a surface of the first magnet part facing the space portion and a surface of the second magnet part facing the space portion are magnetized to the same polarity, and a surface of the third magnet part facing the other surface of the third surface and the fourth surface and surfaces of the fourth magnet part and the fifth magnet part facing each other are each magnetized to a polarity different from the polarity.

35. The direct current relay of claim 30, wherein the plurality of magnet parts include:

a third magnet part located adjacent to any one surface of the first surface and the second surface, and located to be biased to the any one surface of the third surface and the fourth surface;

a fourth magnet part located adjacent to the any one surface of the first surface and the second surface, and located to be biased to the other surface of the third surface and the fourth surface;

a fifth magnet part located adjacent to the other surface of the first surface and the second surface, and located to be biased to the any one surface of the third surface and the fourth surface; and a sixth magnet part located adjacent to the other surface of the first surface and the second surface, and located to be biased to the other surface of the third surface and the fourth surface, wherein the third magnet part is disposed to overlap the fifth magnet part and any one of the plurality of fixed contactors in the other direction, and the fourth magnet part is disposed to overlap the sixth magnet part and the other one of the plurality of fixed contactors in the other direction.

36. The direct current relay of claim 35, wherein a surface of the first magnet part facing the space portion and a surface of the second magnet part facing the space portion are magnetized to the same polarity, and one surfaces of the third magnet part and the fourth magnet part facing each other and one surfaces of the fifth magnet part and the sixth magnet part facing each other are each magnetized to a polarity different from the polarity.

* * * * *